US005854693A

United States Patent [19]
Yoshiura et al.

[11] Patent Number: 5,854,693
[45] Date of Patent: Dec. 29, 1998

[54] IMAGE FORMING SYSTEM

[75] Inventors: Syoichiro Yoshiura, Tenri; Hidetomo Nishiyama, Yamatokoriyama; Yasuhiro Nakai, Soraku-gun, all of Japan

[73] Assignee: Sharp Kabushiki Kaisha, Osaka, Japan

[21] Appl. No.: 779,387

[22] Filed: Jan. 7, 1997

[30] Foreign Application Priority Data

Feb. 7, 1996 [JP] Japan .................................. 8-021458
Mar. 5, 1996 [JP] Japan .................................. 8-047397

[51] Int. Cl.⁶ ............................ H04N 1/21; H04N 1/32; B41B 15/00; B41J 15/00
[52] U.S. Cl. ...................... 358/468; 358/296; 358/442; 395/101; 395/114
[58] Field of Search .................................. 358/296, 400, 358/404, 443, 448, 444, 442, 468; 395/101, 114; 399/130

[56] References Cited

U.S. PATENT DOCUMENTS

| 4,797,706 | 1/1989 | Sugishima et al. | 358/448 |
| 5,247,623 | 9/1993 | Sun | 395/114 |
| 5,611,046 | 3/1997 | Russell et al. | 395/115 |

FOREIGN PATENT DOCUMENTS 53116834A  10/1978  Japan .

OTHER PUBLICATIONS

U.S. Patent Application No. 08/423,980, Filed Apr. 18, 1995.
U.S. Patent Application No. 08/779,850, Filed Jan. 7, 1997.
U.S. Patent Application No. 08/779,722, Filed Jan. 7, 1997.

Primary Examiner—Kim Yen Vu
Assistant Examiner—Kimberly A. Williams
Attorney, Agent, or Firm—Dike, Bronstein, Roberts & Cushman; David G. Conlin; Brian L. Michaelis

[57] ABSTRACT

An image forming system is arranged such that when a designated machine is not provided with the image processing function requested by an operator, a plurality of image forming apparatuses which are capable of performing the requested image processing function are selected. Then, the image data are respectively transferred to the selected plurality of image forming apparatuses through a transmission apparatus to be processed. When the image data has been processed with a requested image processing function, the processed image data are returned to the image forming apparatus of the requesting end. Then, the image forming apparatus of the requesting end realigns a plurality of processed image data. As a result, even if a predetermined processing function is not provided in the designated image forming apparatus, a plurality of image data are transmitted to other image forming apparatus to be processed, thereby obtaining a visible image efficiently.

42 Claims, 40 Drawing Sheets

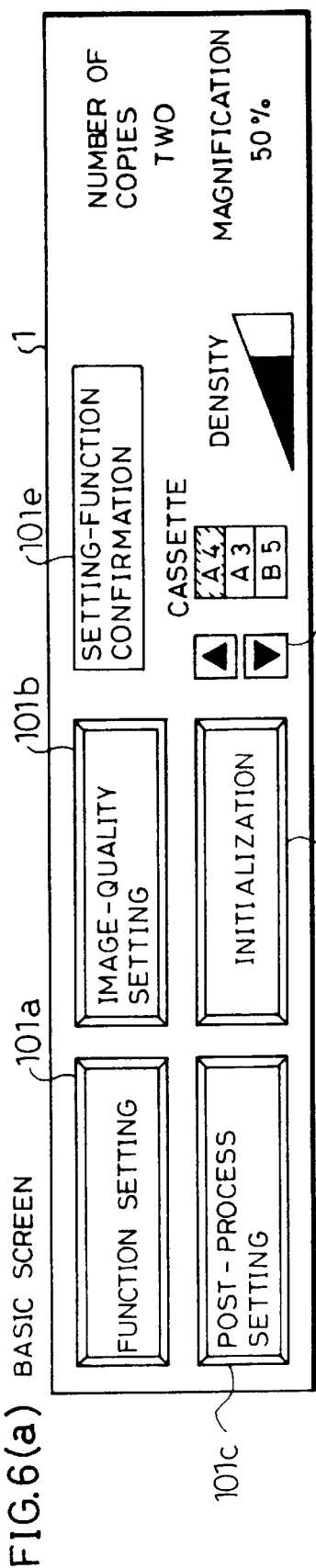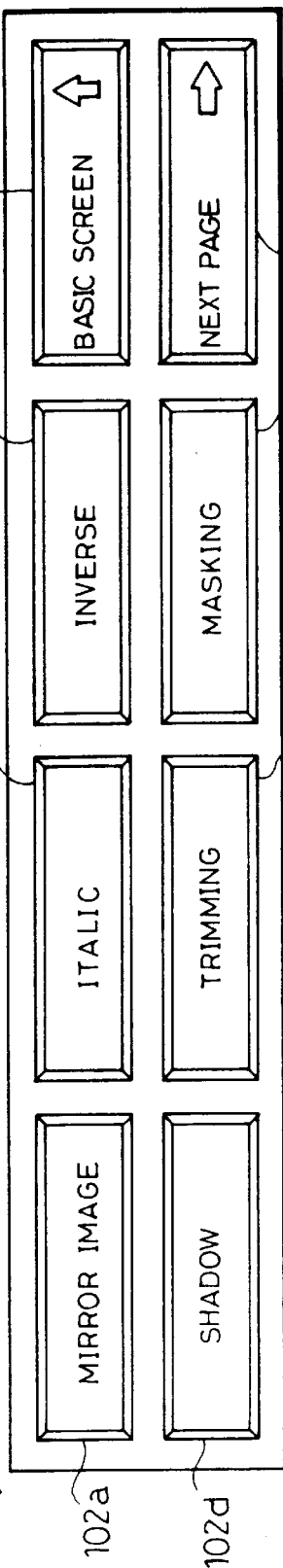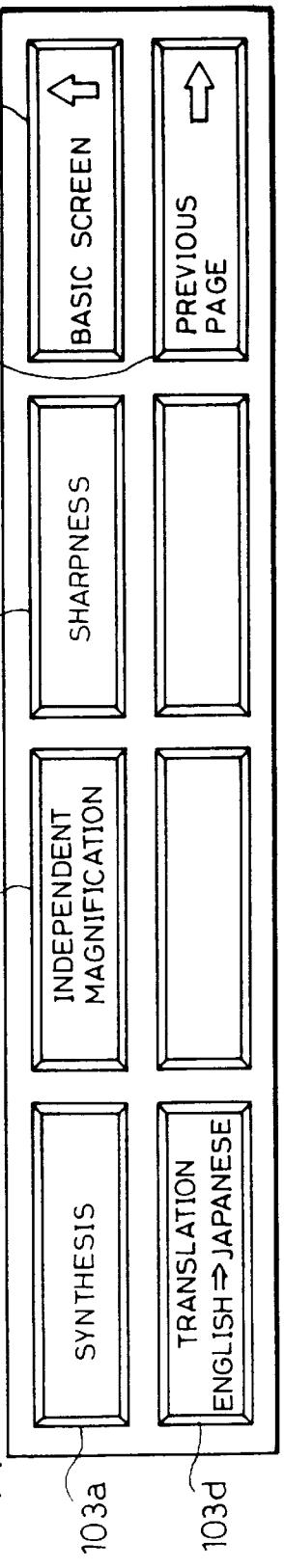
FIG.6(a) BASIC SCREEN
FIG.6(b) FIRST-FUNCTION SETTING SCREEN
FIG.6(c) SECOND-FUNCTION SETTING SCREEN

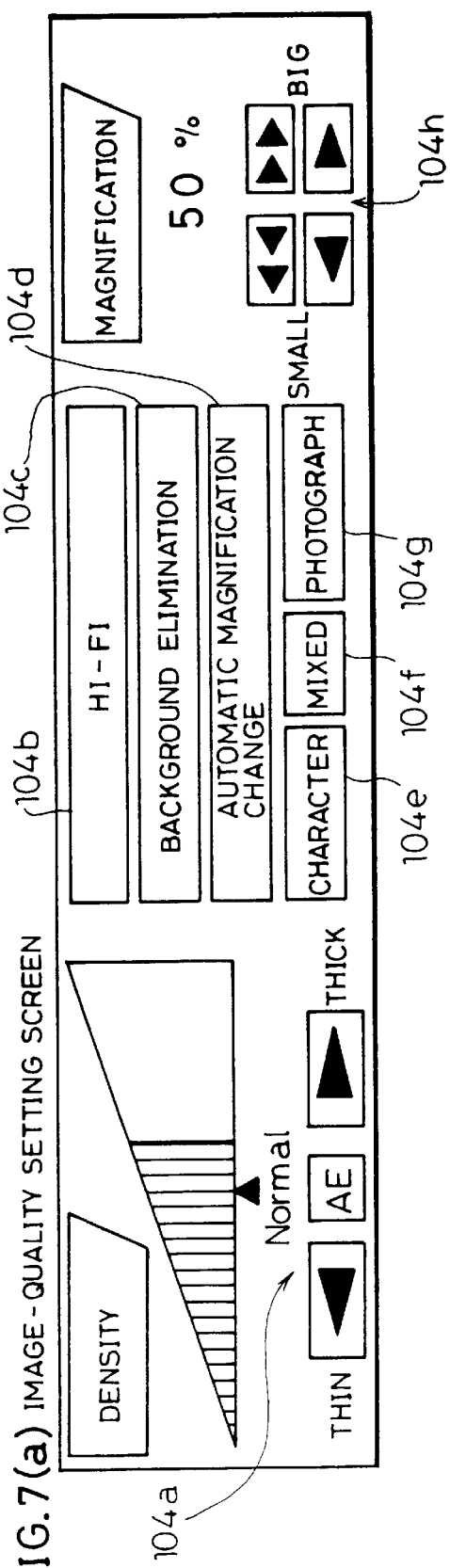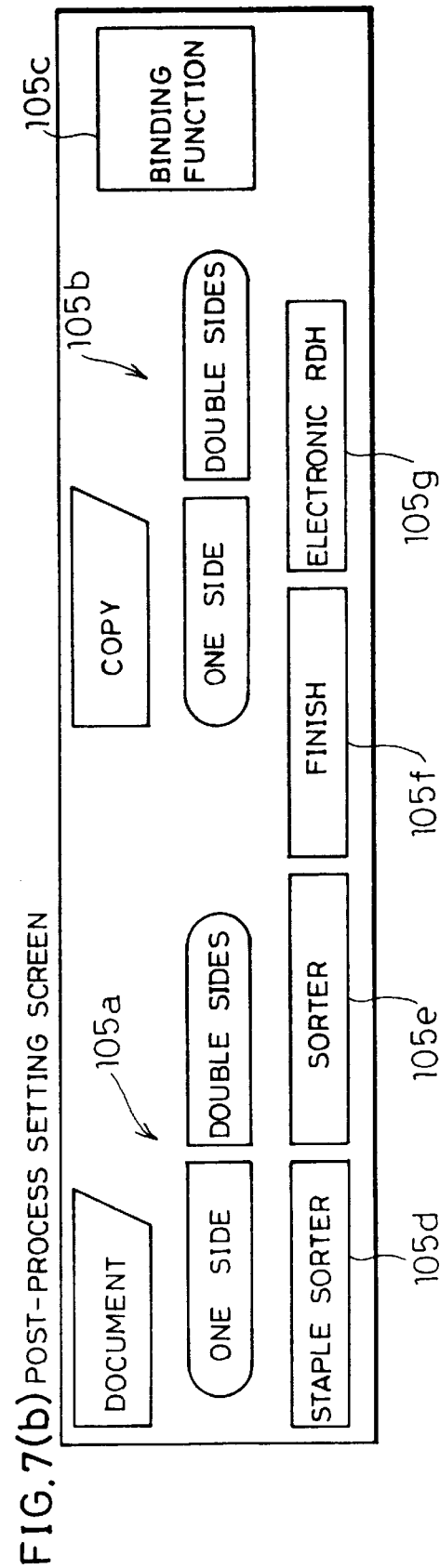
FIG.7(a) IMAGE-QUALITY SETTING SCREEN
FIG.7(b) POST-PROCESS SETTING SCREEN

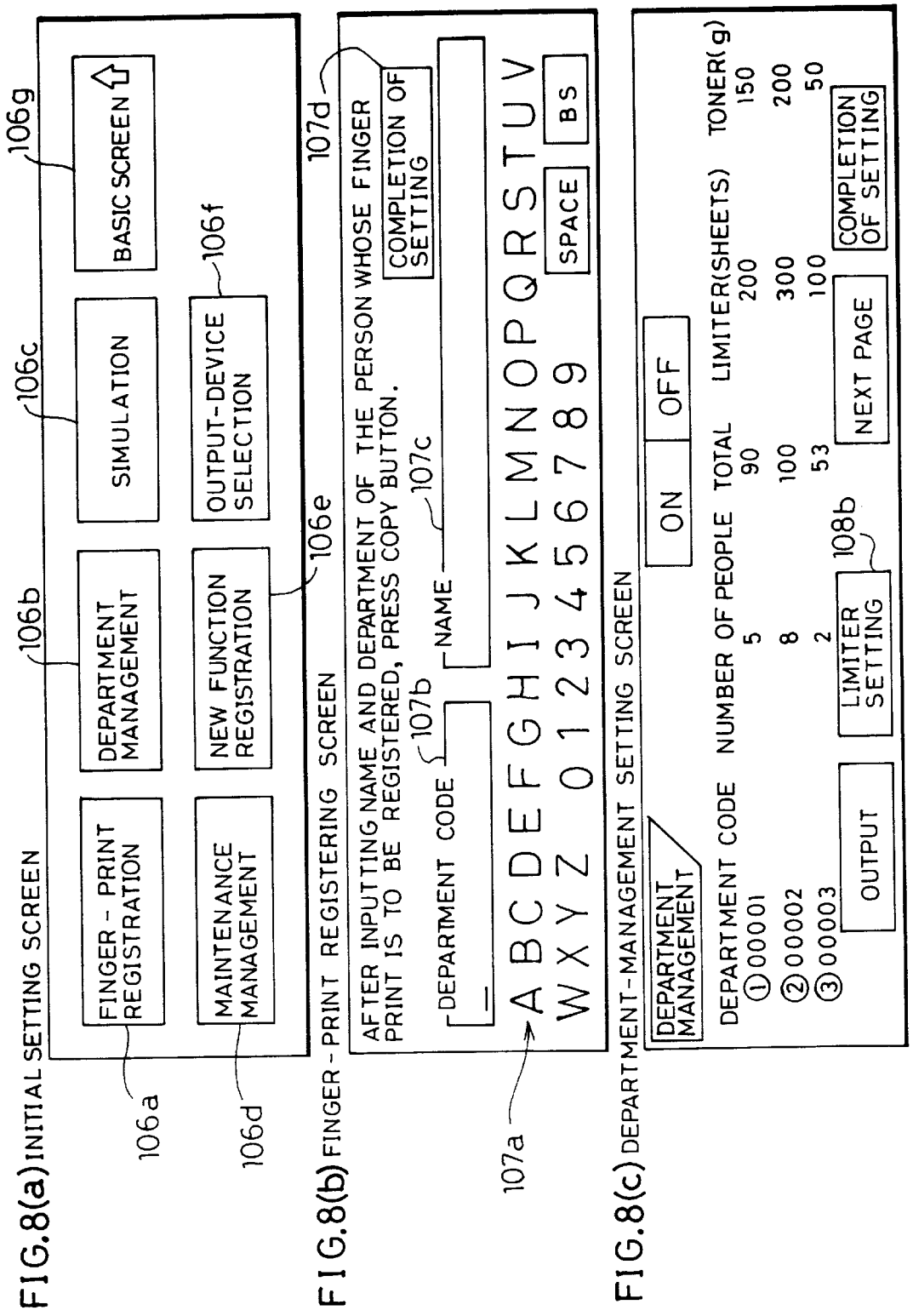

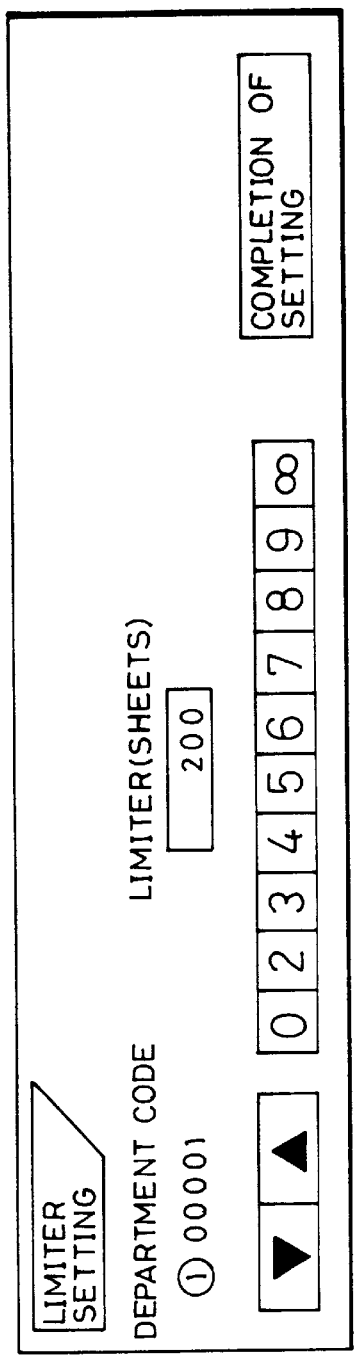
FIG.9(a) LIMITER SETTING SCREEN
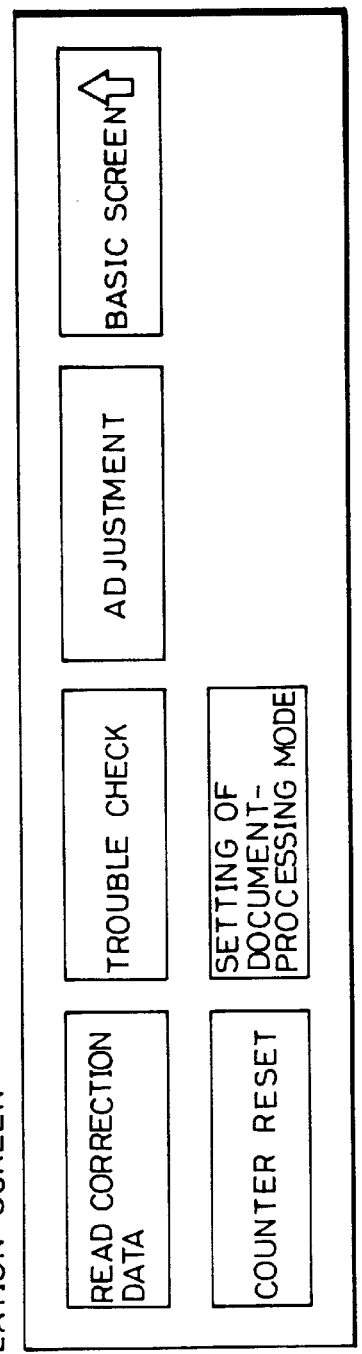
FIG.9(b) SIMULATION SCREEN

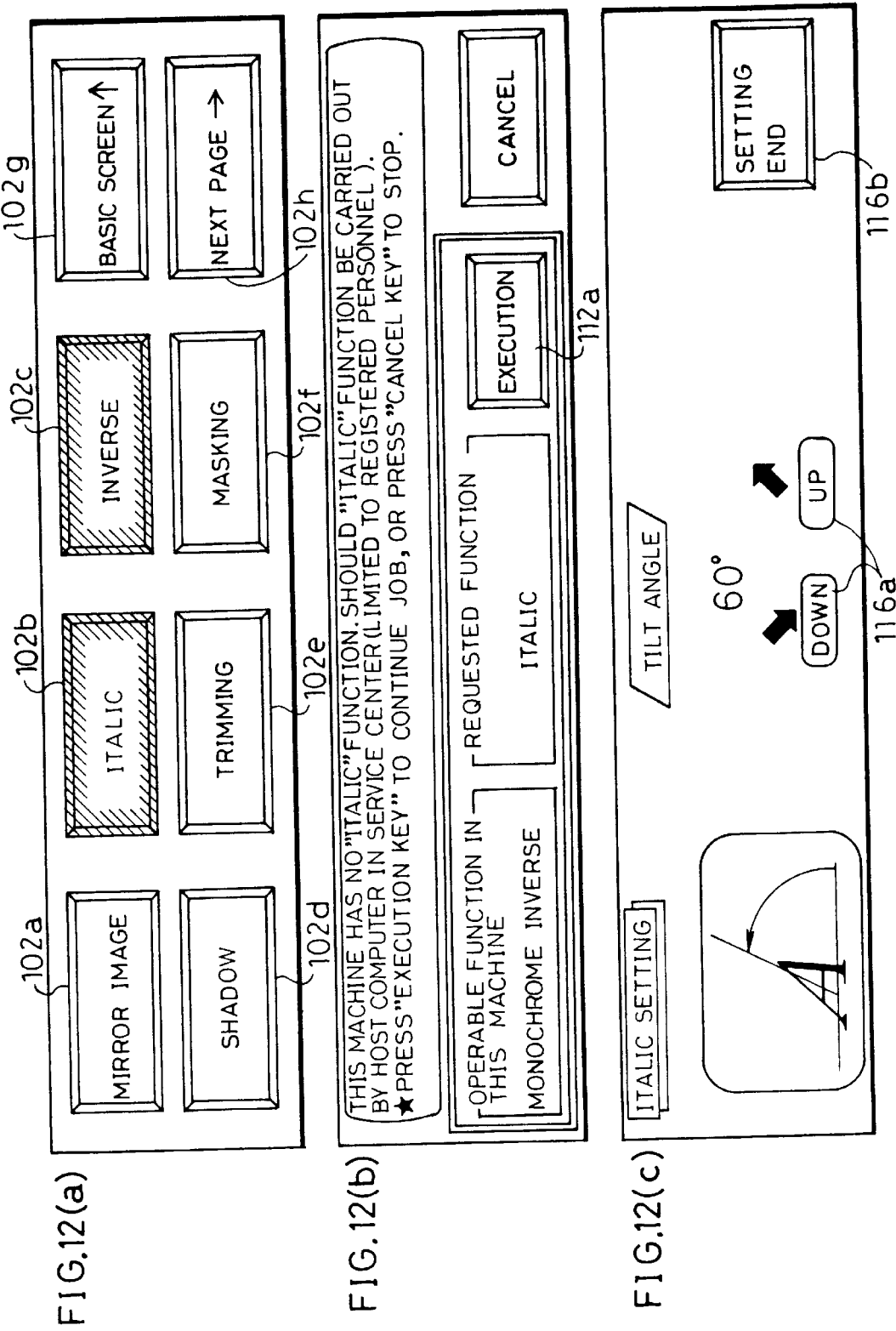

FIG. 27

(HELP KEY ON)

NEW-FUNCTION REGISTERING SCREEN ——— ADDITION OF NEW FUNCTIONS IN THE SERVICE CENTER. FOR REGISTRAION AS ADDITIONAL FUNCTIONS, PRESS THE FUNCTION NAME. THEREBY REVERSING THE DISPLAY. IF "OK", PRESS "START KEY". FOR CANCELLATION, PRESS "CANCEL KEY".

NEWLY ADDED FUNCTIONS (EXPLANATION)

TRANSLATION ENGLISH TO JAPANESE : EXTRACT LETTERS AND TRANSLATE INTO JAPANESE ON A SENTENCE BASIS.

TRANSLATION JAPANESE TO ENGLISH : EXTRACT WORDS AND TRANSLATE INTO ENGLISH ON A SENTENCE BASIS.

→

ITEM NAMES ONLY ~113d

HOST ALL FUNCTIONS

UP
DOWN ~113e

START ~113a

CANCEL ~113b

FIG. 28

(HOST ALL FUNCTIONS)

NEW-FUNCTION REGISTERING SCREEN —
ADDITION OF NEW FUNCTIONS IN THE SERVICE CENTER.
FOR REGISTRAION AS ADDITIONAL FUNCTIONS, PRESS THE FUNCTION NAME,
THEREBY REVERSING THE DISPLAY. IF "OK", PRESS "START KEY".
FOR CANCELLATION. PRESS "CANCEL KEY".

NEWLY ADDED FUNCTIONS

| TRANSLATION ENGLISH TO JAPANESE | DICTIONARY FUNCTION "KOJIEN" | LINE ARRANGMENT |
| TRANSLATION JAPANESE TO ENGLISH | | |

→

HELP    NEWLY ADDED FUNCTIONS    — 113c

UP
DOWN — 113e

START — 113a
CANCEL — 113b

FIG. 32 (a)
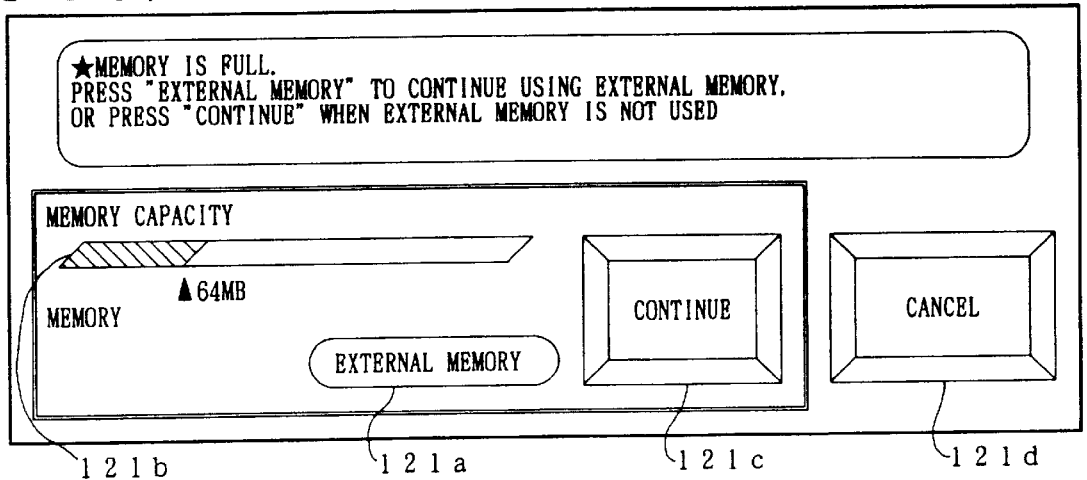
FIG. 32 (b) (WHEN EXTERNAL MEMORY SELECTION KEY IS PRESSED)
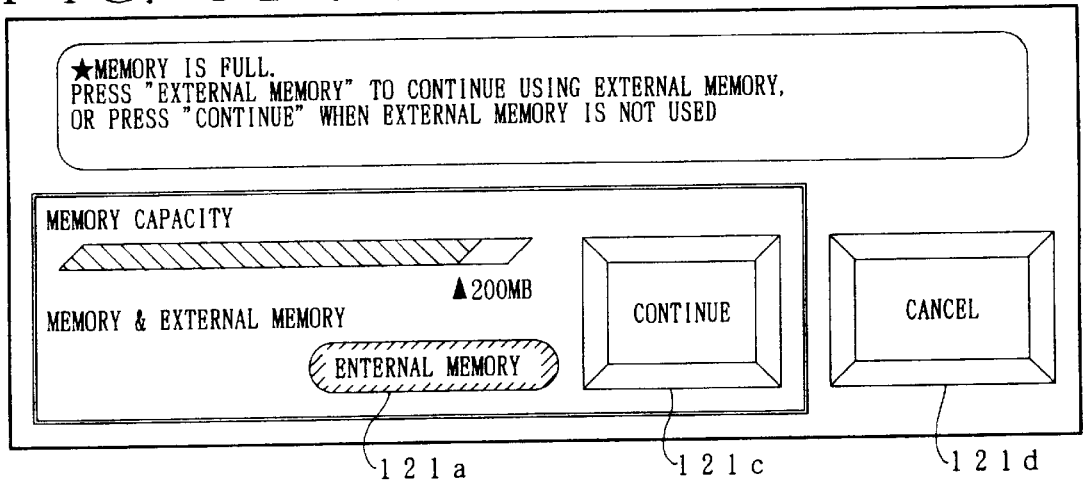
FIG. 32 (c) (WHEN CONTINUE KEY IS PRESSED)
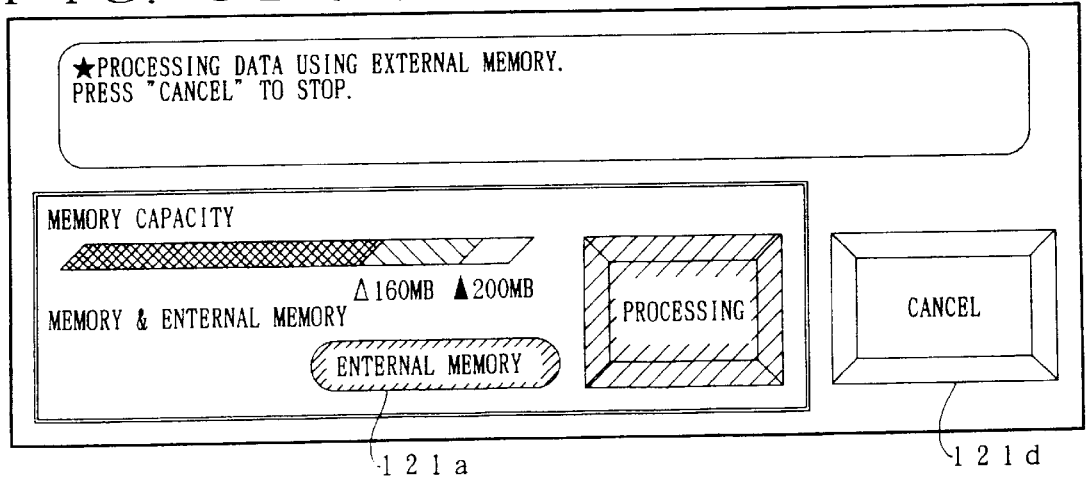

FIG. 40 (a)
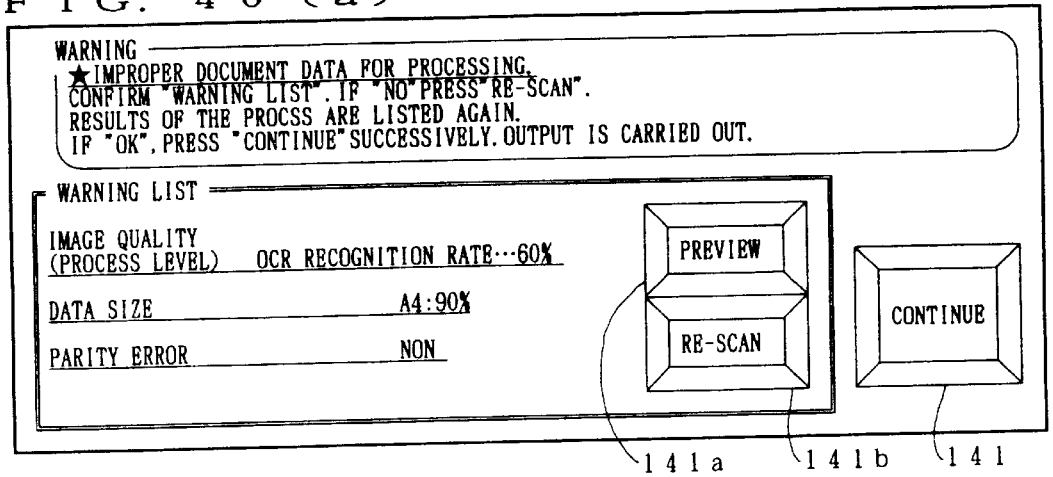
FIG. 40 (b) (RE-SCAN KEY ON)
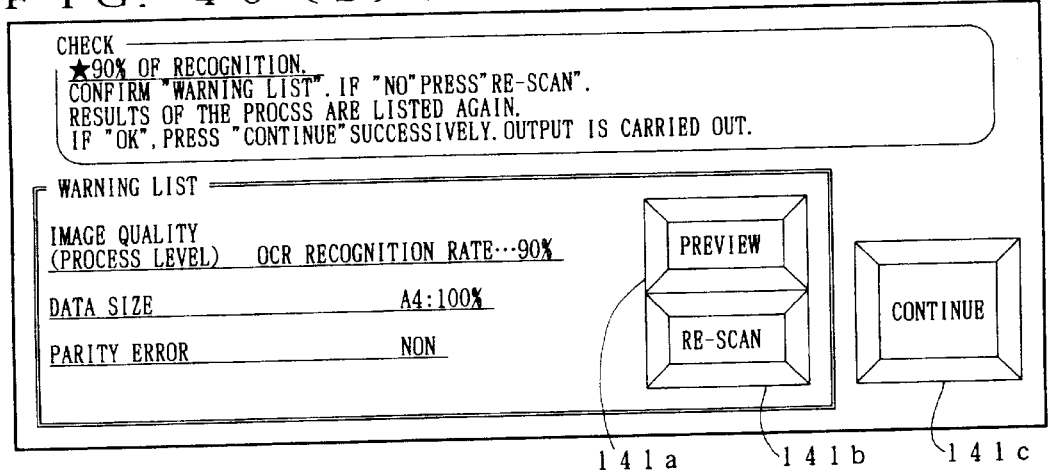
FIG. 40 (c) (PREVIEW ON)
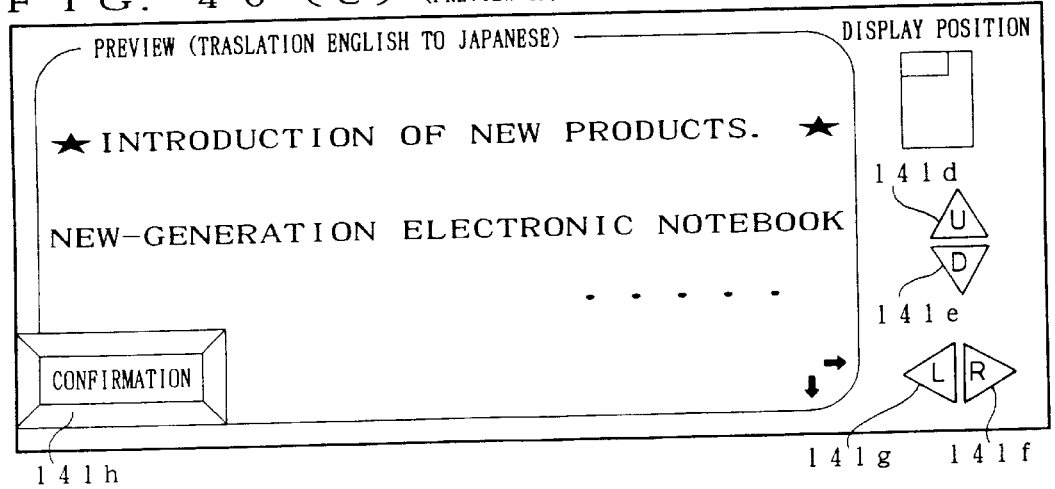

IMAGE FORMING SYSTEM

FIELD OF THE INVENTION

The present invention relates to an image forming system including a plurality of image forming apparatus, such as digital copying machines, etc., interconnected through a transmission equipment. The present invention also relates to an image forming system including a plurality of image forming apparatuses such as digital copying machines, etc., and a plurality of image post-processing units such as host computers, etc., interconnected through the transmission equipment.

BACKGROUND OF THE INVENTION

Image forming apparatuses such as digital copying machines have entered the market. A digital copying machine, an example commercialized image forming apparatus produces a copy of an original image in the following manner. First, the original image is read by means of an image reading section. Then, the resulting read image is stored in an image memory section as image data. Here, if an equivalent multiple copy is selected, the resulting image data are printed out by means of a recording section as a copy image. On the other hand, if image processing such as editing, enlargement, etc., are specified, a specified image processing is applied to the image data by means of an image processing section. Then, the image data having gone through the image processing is printed out by a recording section.

Thus, the digital copying machine of this type produces an image on a sheet using only the image processing functions pre-installed therein. Moreover, in the described digital copying machine, the read document is once stored in the image memory section as temporal image data, and this permits a multiple copying operation by performing a scanning operation only once. Therefore, the described digital copying machine permits a higher speed copying as compared to the conventional analog copying machine.

On the other hand, an idea of forming a network by interconnecting a plurality of image recording apparatuses or the like has been proposed. For example, Japanese Laid-Open Patent Application No. 116834/1978 (Tokukaisho 53-116834) discloses an arrangement to interconnect a plurality of image reading apparatuses and a plurality of image recording apparatuses through a single control section.

This arrangement enables each image recording apparatus to output a copy of an original image read by any of the above interconnected image reading apparatuses. This arrangement permits a shorter stand-by time of the image-reading apparatus that is caused by processes, such as an exchanging process of original document in the image-reading apparatuses.

Also, Japanese Examined Patent Publication No. 36592/1995 (Tokukouhei 7-36592) discloses an image forming system including a plurality of copying machines interconnected through a single control device, and each copying machine is furnished with an image read section and an image record section. In this system, image signals are distributed to a plurality of copying machines to be recorded according to the set original copy mode, so that those who received the image signals can carry out the copying operation in parallel.

However, the described conventional image forming systems have the following drawbacks.

For example, various image-processing functions in the digital copying machine are dependent upon software. Thus, the image processing function is upgraded in a short period and new models with additional functions have been steadily commercialized. Consequently, for example, a digital copying machine having desired image-processing functions which has the highest image-processing functions at the time of the purchase will soon become obsolete with relatively low functions in a short period of time.

As described, the digital copying machine permits a plurality sets of copies to be produced at high speed by repeating an image forming process by scanning only once. However, in this case, the larger is the number of pages to be copied, the larger is the memory capacity required. Additionally, depending on the image processing function applied, an amount of the processed image data may become greater than that of the original image data. Therefore, new memory of a larger capacity may be required depending on the image processing function to be applied to the image data.

Needless to mention, each digital copying machine has an option with regard to the memory. Therefore, by adding the option, the capacity of the memory can be increased. In this case, an additional cost will be incurred for the option. As there exists a possibility of requiring an additional memory capacity, the problem of memory shortage remains unsolved.

In this case, it is impossible for the purchased digital copying machine to obtain upper grade functions than those originally installed. When requiring upper grade functions or most update functions, it is inevitable to purchase a new copying machine to replace the older one. This tends to impose a big burden on operators on an economic basis, and also to present an inherent problem for manufactures that try to provide consumers with new merchandises.

The described problems have led to the need for development of a desirable image forming system which eliminates the need of repurchasing the copying machine. Namely, when any of the copying machines reads a document image, other copying machine applies an image process to the read document image. Here, the processed image data obtained by other copying machine is returned again to the copying machine which reads the document image. Then, the copying machine outputs the image processing data.

However, in the image forming system, the copying machine which performs an image process can printout the image processing data. The copying machine, etc., which applies the image processing data can be printed out. However, the copying machine, etc., which reads the document image cannot print out the returned image processing data.

Additionally, all the copying machines interconnected in the image forming system are provided with the basic image processing function, and the image forming system can utilize only the image forming means.

Therefore, in the case where only one copying machine is provided with a desired image processing function, it is required for the requester to physically go to the copying machine provided with that function. As a result, a desired image cannot be obtained in a short period of time. As a result of processing an image by a certain copying machine, if the amount of processed image data increased, it will not be possible for only the copying machine to apply the processed image data.

In the case where a large number of image data to be processed, the image data are distributed to respective copying machines to be processed, an overall time required for processing an image can be reduced, thereby achieving an improved efficiency. However, with the existing technique, it is not possible to distribute the job to be processed.

SUMMARY OF THE INVENTION

It is therefore an object of the present invention to provide an image forming system which permits a visible image to be achieved as desired in a short period of time in the case of performing an image processing function requested by the operator by a combined use of a designated image forming apparatus and other image forming apparatuses or image processing apparatus by utilizing a network in which respective apparatuses are interconnected to enable the function requested by the operator to be performed in the network even though the function is not provided in the designated apparatus.

In order to achieve the above object, an image forming system is characterized by including: a plurality of image forming apparatuses; and a transmission apparatus for interconnecting the plurality of image forming apparatuses to allow them to communicate each other by transmitting and receiving image data, wherein at least one of the plurality of image forming apparatuses serves as the first image forming apparatus which includes: an image recording section for forming a visible image based on the image data; an input section for inputting an instruction with regard to the image processing function to be performed by the first image forming apparatus; and a transmission-side control section for storing function data indicative of types of image processing functions provided in each of the plurality of image forming apparatuses, selecting a plurality of image forming apparatuses provided with the selected function based on an instruction from the input section for requesting a predetermined image processing function to be applied to the image data and the function data so as to distribute thereto the image data to be processed, and transferring the image data to the selected plurality of image forming apparatuses through the transmission apparatus, and further realigning a plurality of processed image data returned from other image forming apparatus to the image recording section; and some of the plurality of image forming apparatuses excluding the first image forming apparatus serve as second image forming apparatuses, each second image forming apparatus including: a processing section for processing the image data with a predetermined image processing function; and a processing-side control section for supplying the image data inputted through the transmission apparatus to the processing section and returning the image data processed by the processing section to the first image forming apparatus through the transmission apparatus.

According to the described arrangement of the image forming system, in the first image forming apparatus, image data are obtained, for example, by reading the image on the original document by a scanner provided with the image forming apparatus.

For example, the following case is possibly occur: the image data are, for example, composed of a plurality of pages, and an image processing function is not provided in the first image forming apparatus as desired.

In this case, by operating the input section by the operator, an instruction of requesting a predetermined image processing function to be applied to the image data is inputted through the input section. Then, the transmission-side control section selects an image forming apparatus which can perform the requested image processing function based on the function data. Furthermore, the transmission-side control section transfers the image data through the transmission equipment to a selected plurality of image forming apparatuses by operator's input operation of the input section.

In the processing section of the second image forming apparatus which received a request for processing the image processing function, the image processing function is applied to the image data. Then, the processed image data are returned to the first image forming apparatus of the requesting end through the transmission apparatus. In the first image forming apparatus which received the processed image data, the processed image data of a plurality of pages are realigned into a proper page order, thereby outputting the image data as a visible image by the image recording section.

As described, in the described image forming system, for example, even in the case where the image processing function requested by the operator desired is not provided with the first image forming system which is to be used by the operator, a plurality of image data can be distributed to the second image forming apparatus (es) which is (are) interconnected by the transmission apparatus to be processed. Therefore, it is not necessarily that respective image forming apparatuses which are interconnected in the image forming system are provided with respective image processing functions. As a result, the economical burden of the operator which uses the first image forming apparatus can be reduced. Additionally, as the image data are distributed into a plurality of second image forming apparatuses to be processed, the image data of a plurality of documents can be processed efficiently in a short period of time.

Additionally, the described image forming system of the present invention offers the following functions and effects when adopting such arrangement that the first image forming apparatus includes a processing section for applying a predetermined image processing function to the image data.

For example, assumed here that the image data composed of a plurality of pages are distributed, and that a processing function such as an image processing function is provided in the first image forming apparatus (designated machine).

In this case, upon inputting an instruction for requesting a predetermined image processing function to be applied to the image data through the input section by operating the input section by the operator, the transmission-side control section selects a plurality of the image forming apparatuses (including the first image forming apparatus) which can perform the requested image processing function, the first image forming apparatus based on the function data. Furthermore, the transmission-side control section transfers the image data respectively to the processing section of the selected first image forming apparatus and the second image forming apparatus through the transmission apparatus.

In the second image forming apparatus which receives the request, the requested image processing function is applied to the image data by the processing section. The processed image data are returned to the first image forming apparatus of the requesting end through the transmission apparatus by the processing side control section of the second image forming apparatus.

On the other hand, in the first image forming apparatus, the returned processed image data and the processed image data by itself (first image forming apparatus) are realigned into a proper page order, and the processed image data of a plurality of pages are outputted by the image recording section as a visible image.

As described, according to the image forming system of the present invention, in the case where, the processing function, for example, the image processing function, requested by the operator is provided in the first image processing apparatus, a plurality of image data can be distributed into the designated machine and the second image forming apparatus to be processed.

As the described arrangement permits a plurality of image data to be distributed to be processed by the use of the processing section provided in the designated apparatus, the image data of a plurality of documents can be processed efficiently in a shorter period of time.

Another image forming system is characterized by including at least one image forming apparatus; at least one image processing apparatus; and a transmission apparatus for allowing them to communicate each other by transmitting and receiving data, wherein each image processing apparatus includes: a first memory section for storing image data inputted through the transmission apparatus, and each image processing apparatus includes: image take-in section for taking-in an original document image as image data; a second memory section for storing the image data taken in; an input section for inputting an instruction with regard to the image processing function to be performed by an image forming apparatus; a processing section for processing the image data with a predetermined image processing function; an image recording section for forming a visible image based on the processed image data; and a control section for controlling a memory capacity of the second memory section, the control section controlling such that when an amount of image data to be inputted exceeds the memory capacity of the second memory section, image data in an excess amount of the memory capacity are transferred to other image forming apparatus or image processing apparatus through the transmission apparatus.

According to the described arrangement, the image of the original document is read by the image reading section to be stored in the second memory section as image data. Further, if the amount of image data to be inputted exceeds the memory capacity of the second memory section, the control section transmits the image data in an amount exceeding the memory capacity to other image forming apparatus or image processing apparatus through the transmission apparatus.

Therefore, not only the second memory section mounted in the image forming apparatus, but also the memory section of other image forming apparatus or image processing apparatus, which stores the image data can be used effectively.

The described image forming system offers the following functions and effects when adopting such arrangement that when the amount of image data to be inputted exceeds the memory capacity of the second memory section, the control section selects the image data to be transferred in accordance with the object specified by the operator, and transfers the selected image data to other image forming apparatus or image processing apparatus through the transmission apparatus.

Namely, according to the described arrangement, as the image data to be transferred is selected by the control section according to the object specified by the operator, it is possible to reflect the operator's wishes in the image forming process. Here, by preparing a plurality of selection conditions for the image data to be transferred to the image processing apparatus, an optimal section of the image data to be transferred for the operator can be achieved.

A still another image forming system in accordance with the present invention is characterized by including: at least one image forming apparatus; at least one image processing apparatus; and a transmission apparatus for allowing them to communicate each other by transmitting and receiving data, wherein each image forming apparatus includes: a first memory section for storing image data inputted through the transmission apparatus, and each image forming apparatus includes: an image take-in section for taking in an original document image as image data; a second memory section for storing the image data taken in by the image take-in section; an input section for inputting an instruction with regard to the image processing function to be performed by the image forming apparatus; a processing section for processing the image data with a predetermined image process; an image recording section for forming a visible image based on the processed image data; and a control section for controlling a memory capacity of the second memory section, the control section controlling such that when an amount of image data to be inputted exceeds the memory capacity of the second memory section, other image forming apparatus or image processing apparatus is selected in accordance with an object specified by the operator, and a predetermined image data are transferred to the selected apparatus through the transmission apparatus.

According to the described arrangement, the image of the original document is read by the image reading section to be stored in the second memory section as image data. Further, if the amount of image data to be inputted exceeds the memory capacity of the second memory section, the control section selects other image forming apparatus or the image processing apparatus according to the object to be specified by the operator and transferred a predetermined image data to the selected apparatus through the transmission apparatus.

Namely, in the described arrangement, the image data are transferred to the image forming apparatus or image processing apparatus in accordance with the operator's wishes, thereby enabling the operator's wishes to be reflected. Here, by preparing a plurality of selection conditions for the image forming apparatus or image processing apparatus, an optimal selection of the image forming apparatus or image processing apparatus of receiving end of the transferred image data for the operator can be achieved.

For a fuller understanding of the nature and advantages of the invention, reference should be made to the ensuing detailed description taken in conjunction with the accompanying drawings.

BRIEF DESCRIPTION OF THE DRAWINGS

FIG. 6(a) is a front view showing a basic screen of a liquid crystal display apparatus on the operation panel;

FIG. 6(b) is a front view showing the first function setting screen of the liquid crystal display apparatus;

FIG. 6(c) is a front view showing the second function setting screen of the liquid crystal display apparatus of FIG. 6(a);

FIG. 7(a) is a front view showing an imagequality setting screen of the liquid crystal display apparatus on the operation panel;

FIG. 7(b) is a front view showing display contents of a post-process setting screen of the liquid crystal display apparatus;

FIG. 8(a) is a front view showing an initial setting screen of the liquid crystal display apparatus on the operation panel;

FIG. 8(b) is a front view showing a finger print registration screen of the liquid crystal display apparatus on the operation panel;

FIG. 8(c) is a front view showing a department management setting screen of the liquid crystal display apparatus;

FIG. 9(a) is a front view showing a limiter setting screen of the liquid crystal display apparatus on the operation panel;

FIG. 9(b) is a front view showing a simulation screen of the liquid crystal display apparatus;

FIG. 12(a) is a front view of the first function setting screen of the liquid crystal display apparatus of FIG. 6(b) when an "italic" function and an "inverse" function are selected;

FIG. 12(b) is a front view of the display screen of the liquid crystal display apparatus corresponding to an "italic" function selecting operation;

FIG. 12(c) is a front view of an italic setting screen of the liquid crystal display apparatus;

FIG. 27 is a front view showing the display screen of the liquid crystal display apparatus when a kelp key shown in FIG. 26 is set ON;

FIG. 28 is a front view showing a display screen of the liquid crystal display apparatus when an all host function display key shown in FIG. 26 is set ON;

FIG. 32(a) is a front view showing display contents of the display screen of the liquid crystal display apparatus when a memory of the digital copying machine is full when an operation shown in FIG. 30 is carried out;

FIG. 32(b) is a front view showing a display screen of the liquid crystal display apparatus when an external memory selection key shown in FIG. 32(a) is set ON;

FIG. 32(c) is a front view showing display contents of the display screen of the liquid crystal display apparatus when an execution key is set ON;

FIG. 40(a) is a front view showing a display screen of the liquid crystal display apparats when S171 of FIG. 39 is carried out;

FIG. 40(b) is a front view showing a display screen the liquid crystal display apparatus when the re-scan key shown in FIG. 40(a) is set ON; and FIG. 40(c) is a front view showing a display screen of a liquid crystal display apparatus when the preview key is set ON.

DESCRIPTION OF THE EMBODIMENTS

Embodiment 1

Referring to FIGS. 1 through 14, the following description will describe one embodiment of the present invention. An image forming system of the present embodiment is composed of a plurality of digital copying machines serving as image forming apparatuses interconnected through a transmission equipment.

Figure 2:
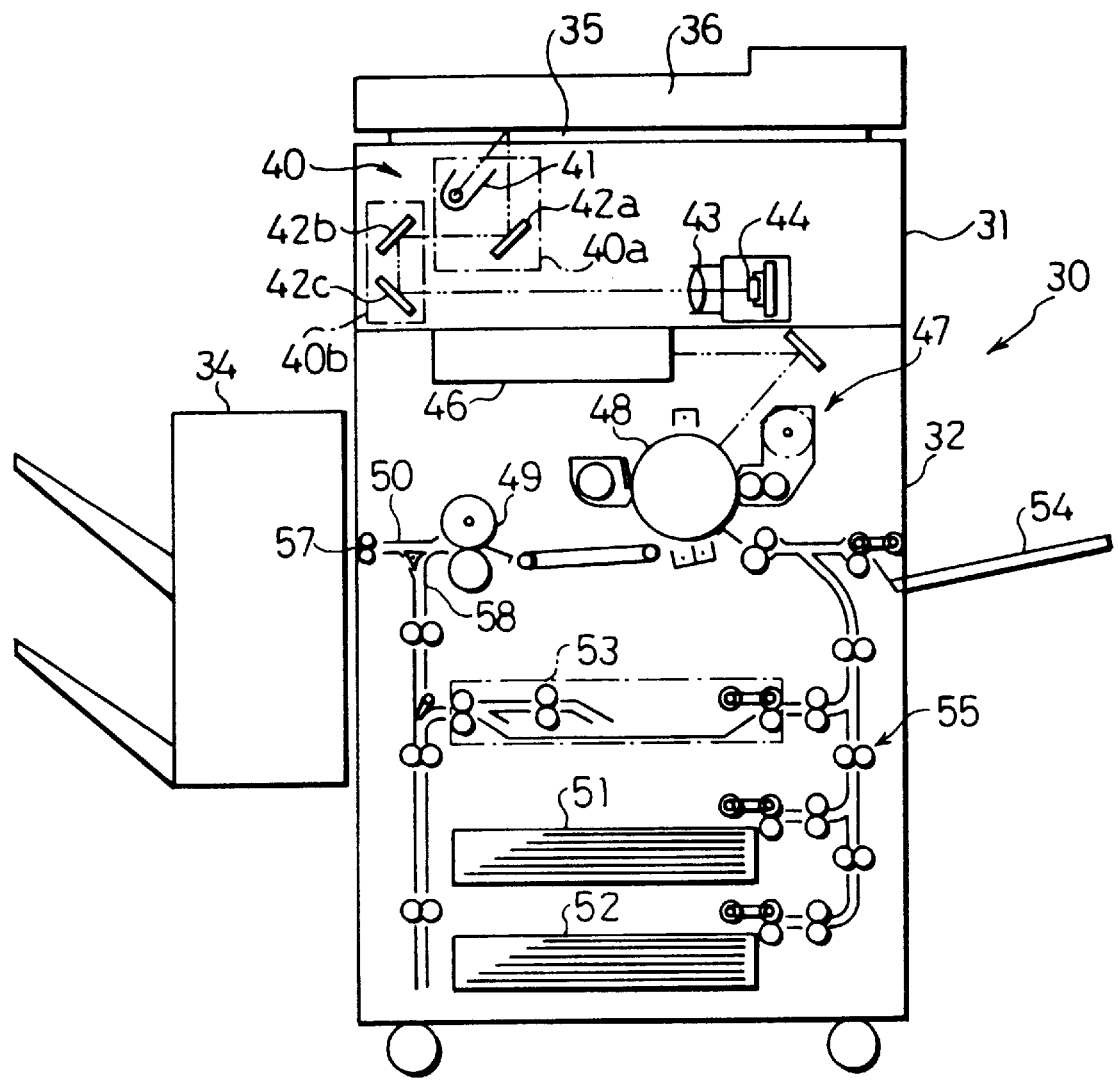
FIG. 2 is a longitudinal sectional view showing a schematic structure of a digital copying machine provided in the image forming system.

FIG. 2 is a cross sectional view showing an entire structure of a digital copying machine 30 as an example of the above digital copying machine. As shown therein, the digital copying machine 30 includes a scanner section 31, a laser printer section 32 serving as an image recording section, and a postprocessing device 34 having a sorter.

The scanner section 31 includes a document platen 35 made of transparent glass, an RADF (Recirculating Automatic Document Feeder) 36, and a scanner unit 40.

The RADF 36 is provided for automatically feeding a document set on a predetermined document tray to the document platen 35 sheet by sheet. On the document tray, the document set of a plurality of sheets is set in one time. The RADF 36 includes a transportation path for a one-side document and a transportation path for a double-side document as well as a transportation path switching mechanism, so that the scanner unit 40 can read either side or both sides of the document at the operator's choice.

The scanner unit 40 is an original image read unit for reading an original image of a document set on the document platen 35 by scanning. The scanner unit 40 includes a first scanning unit 40a, a second scanning unit 40b, an optical lens body 43, and a CCD (Charge Coupled Device) 44.

The first scanning unit 40a is composed of a lamp reflector assembly 41 and a first reflecting mirror 42a. The lamp reflector assembly 41 is provided for scanning a document on the document platen 35 by irradiating light on the document surface. The second scanning unit 40b is composed of a second reflecting mirror 42b and a third reflecting mirror 42c. The first through third reflecting mirrors 42a–42c are provided for guiding light reflected from the document to the CCD 44. The optical lens body 43 forms an image on the CCD 44 by converging the reflected light thereon. The CCD 44 is an element which converts an image formed by reflected light into an electric image signal.

The scanner section 31 reads the original image to convert the same into image data by the link-up operation of the RADF 36 and the scanner unit 40. To be more specific, while the RADF 36 steadily feeds documents onto the document platen 35, the scanner unit 40 reads the original image on each document sheet by moving back and forth along the bottom surface of the document platen 35.

The original image read by the scanning unit 40 is set to an image processing section (to be described layer) as image information (image data). Then, a predetermined image processing is applied to the image data by the image processing section.

The processed image data are temporary stored in a memory 73 (see FIG. 3) of the image processing section (to be described later in detail). Then, the image data are sent to the laser printer section 32 in accordance with an output command, and are recorded on a sheet in the form of an image.

The laser printer section 32 includes a laser writing unit 46 and an electrophotographic processing section 47 for forming an image in its upper part, and a sheet storing/transporting section 55 in its lower part.

The laser writing unit 46 includes a semiconductor laser, a polygon mirror, a f-θ lens, etc. The semiconductor laser is a light source for emitting a laser beam in response to the image data read from the memory 73. The polygon mirror is provided for deflecting the laser beam at constant angular velocity. The f-θ lens is provided for correcting the above deflected laser beam to be deflected at constant velocity on a photoreceptor drum 48 of the electrophotographic processing section 47, etc.

The electrophotographic processing section 47 is arranged in a known manner, that is, the same includes the photoreceptor drum 48, and around which a charger, a developer, a transferring device, a separator, a cleaner, a operator 49, etc. are provided. A transportation path 50 is formed in the downstream side of the operator 49 with respect to a direction in which a sheet is transported to have an image formed thereon. The transportation path 50 branches into two paths: a transportation path 57 and a transportation path 58 that communicate with the postprocessing device 34 and sheet storing/transporting section 55, respectively.

The sheet storing/transporting section 55 includes a first cassette 51, a second cassette 52, a double-side copying unit 53, and a multi-manual document tray 54. The first and second cassettes 51 and 52 contain piles of sheets of different sizes, respectively. When the operator selects either cassette containing the sheets of the desired size, the sheets are steadily fed to the electrophotographic processing section 47 sheet by sheet from the top of the pile in the selected cassette. The double-side copying unit 53 supplies the sheet having formed thereon an image by the electrophotographic processing section 47 to the electrophotographic processing section 47 again, either directly or after turning the sheet over.

In the laser printer section 32, the image data retrieved from the memory 73 are outputted from the laser writing unit 46 in the form of a laser beam to form an electrostatic latent image on the surface of the photoreceptor drum 48 in the electrophotographic processing unit 47. The electrostatic latent image is turned into a visible toner image, which is electrostatically transferred onto the sheet transported from the sheet storing/transporting section 55 and fused thereon by the operator 49.

After the image is formed thereon, the sheet is sent to the postprocessing device 34 from the operator 49 through the transportation path 50, or supplied again to the electrophotographic processing section 47 through the transportation paths 50 and 58 and double-side copying unit 53.

Figure 3:
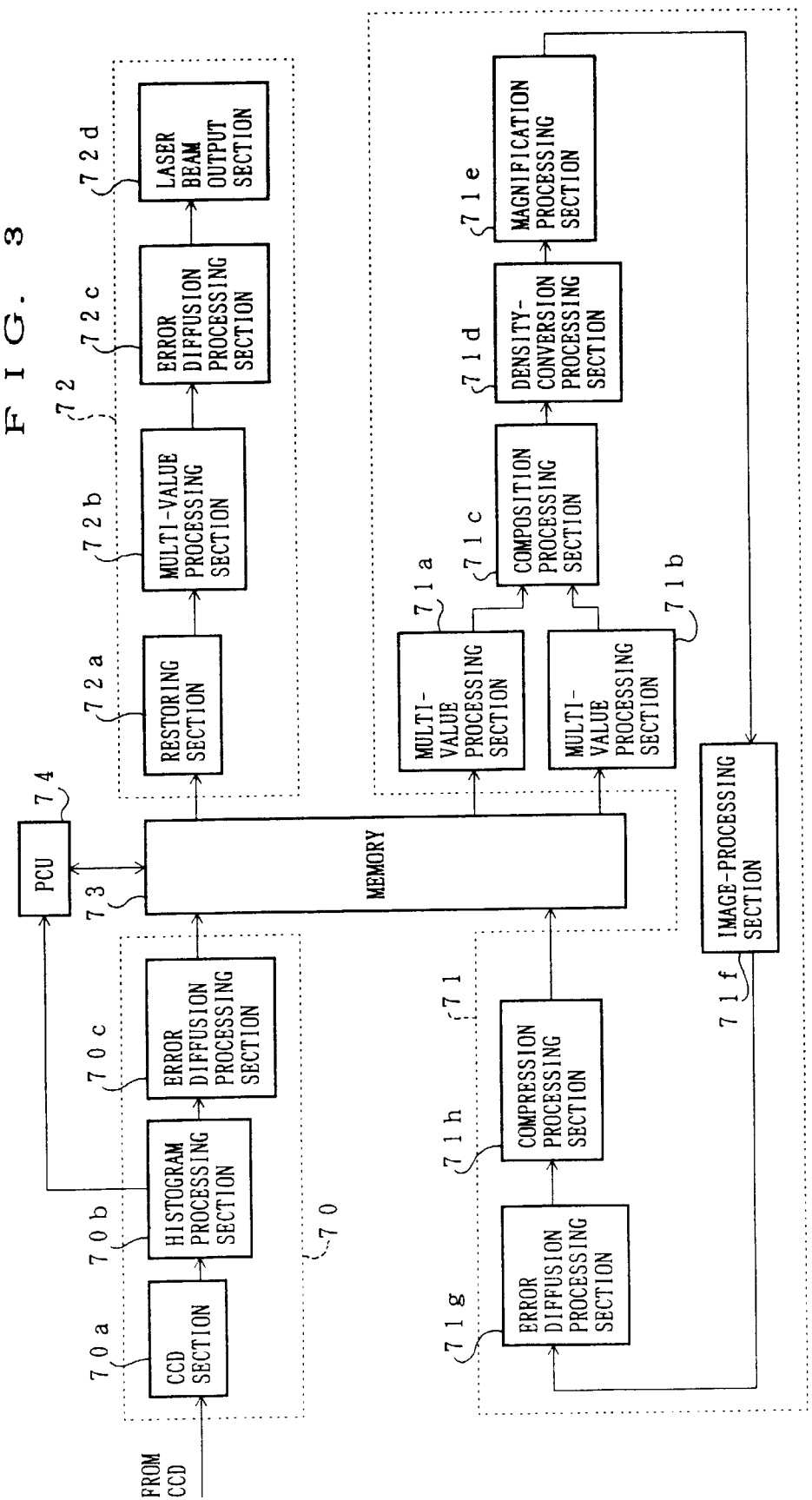
FIG. 3 is a block diagram showing a structure of an image processing section in the digital copying machine.

Next, the image processing section of the digital copying machine 30 will be explained. The image processing section processes the image data of the document sent from the scanner unit 31. As shown in FIG. 3, the image processing section includes an image-data input section 70, an image data processing section 71, an image data output section 72, a memory 73, and a print control unit (hereinafter referred to as PCU) 74 serving as a transmission-side control section and a processing-side control section.

The digital copying machine 30 is under the control of the PCU 74, which is composed of a CPU (Central Processing Unit). The memory 73 is composed of a RAM (Random Access Memory), a hard disk, etc., and stores the image data.

The image-data input section 70 includes a CCD section 70*a*, a histogram processing section 70*b*, and an error diffusion processing section 70*c*. The image data input section 70 converts the image data of the original image read by the CCD 44 into binary data, and makes a histogram of digital amount of the binary data to process the image data through the error diffusion method, and stores the resulting image data in the memory 73 temporarily.

The CCD section 70*a* converts an analog signal representing the contrast of each pixel in the image data into a digital signal, and subsequently carries out an MTF (Modulation Transfer Function) correction, a black-and-white correction, or a gamma correction on the digital signal. Then, the CCD section 70*a* outputs the resulting 256 gray scales (8-bit) digital signal to the histogram processing section 70*b*.

The histogram processing section 70*b* produces density data (histogram data) by adding up the digital signal outputted from the CCD section 70*a* separately in the 256 gray scales pixel contrast. The histogram data thus obtained are sent to the error diffusion processing section 70*c* as pixel data, or to the PCU 74 when occasion demands.

The error diffusion processing section 70*c* employs the error diffusion method known as a method of pseudo-halftone processing. To be more specific, an 8-bit/pixel digital signal outputted from the CCD section 70*a* is converted into 1-bit (binary data) digital signal and a redistribution computation is carried out to realize a copy image rendering density as true as to the document in any specific region. In the error diffusion method, an error caused by conversion into binary data is reflected when converting the adjacent pixels into binary data.

The image data processing section 71 includes a multi-value processing sections 71*a* and 71*b*, a composition processing section 71*c*, a density conversion processing section 71*d*, a magnification processing section 71*e*, an image processing section 71*f*, and an error diffusion processing section 71*g*, and a compression processing section 71*h*. The image data processing section 71 is a processing section that converts input image data into image data as desired by the operator. Thus, the input image data are processed by the image data processing section 71 until the final output image data are stored in the memory 73. Note that, however, the aforementioned processing sections in the image data processing section 71 do not operate always, and they operate independently only when occasion demands.

The multi-value processing sections 71*a* and 71*b* convert the binary image data from the error diffusion processing section 70*c* into 256 gray scale data again. The composition processing section 71*c* carries out a logical computation for every pixel, in other words, it selectively computes an OR, an AND, and an exclusive-OR. The data subject to the logical computation are the pixel data stored in the memory 73 and bit data from a pattern generator (PG).

The density conversion processing section 71*d* sets an arbitrary relationship between the input contrast and output contrast for the 256-level data based on a predetermined level converting table. The magnification processing section 71*e* carries out interpolation processing for a designated magnification based on the known input data to compute the pixel data (contrast value) of the subject pixel after the magnification. Subsequently, the image data are magnified in the sub-scanning direction first, and thence in the main scanning direction based on pixel data thus computed.

The image processing section 71*f* processes the input image data in various manners, and collects data related to data array to extract the feature and the like. The error diffusion processing section 71*g* operates in the same manner as the error diffusion processing section 70*c* in the image-data input section 70. The compression processing section 71*h* compresses the binary data by a coding method known as a run-length. The image data are compressed in the last processing loop after the final output image data have been produced.

The image-data output section 72 includes a restoring section 72*a*, a multi-value processing section 72*b*, an error diffusion processing section 72*c*, and a laser beam output section 72*d*. The image-data output section 72 restores the compressed image data stored in the memory 73 to the 256-level data, and diffuses the error in quaternary data which, when formed into an image, renders a smoother half-tone representation than the one formed by the binary data, to transfer the resulting data to the laser beam output section 72*d*.

The restoring section 72*a* restores the data compressed by the compression processing section 71*h*. The multi-value processing section 72*b* operates in the same manner as the multi-value processing sections 71*a* and 71*b* in the image-data processing section 71. The error diffusion processing section 72*c* operates in the same manner as the error diffusion processing section 70*c* in the image-data input section 70.

The laser beam output section 72*d* converts the digital image data into a laser ON/OFF signal based on a control signal from a sequence controller (not shown). The semiconductor laser in the laser writing unit 46 comes on or goes off based on the above ON/OFF signal to write in an electrostatic latent image on the photoreceptor drum 48.

The data that enter into the image-data input section 70 and come out from the image data output section 72 are, as a general rule, stored in the memory 73 in the form of binary data to reduce an occupied space in the memory 73. However, the data may be stored in the form of quatanary data to maintain the quality of the image data.

Figure 4:
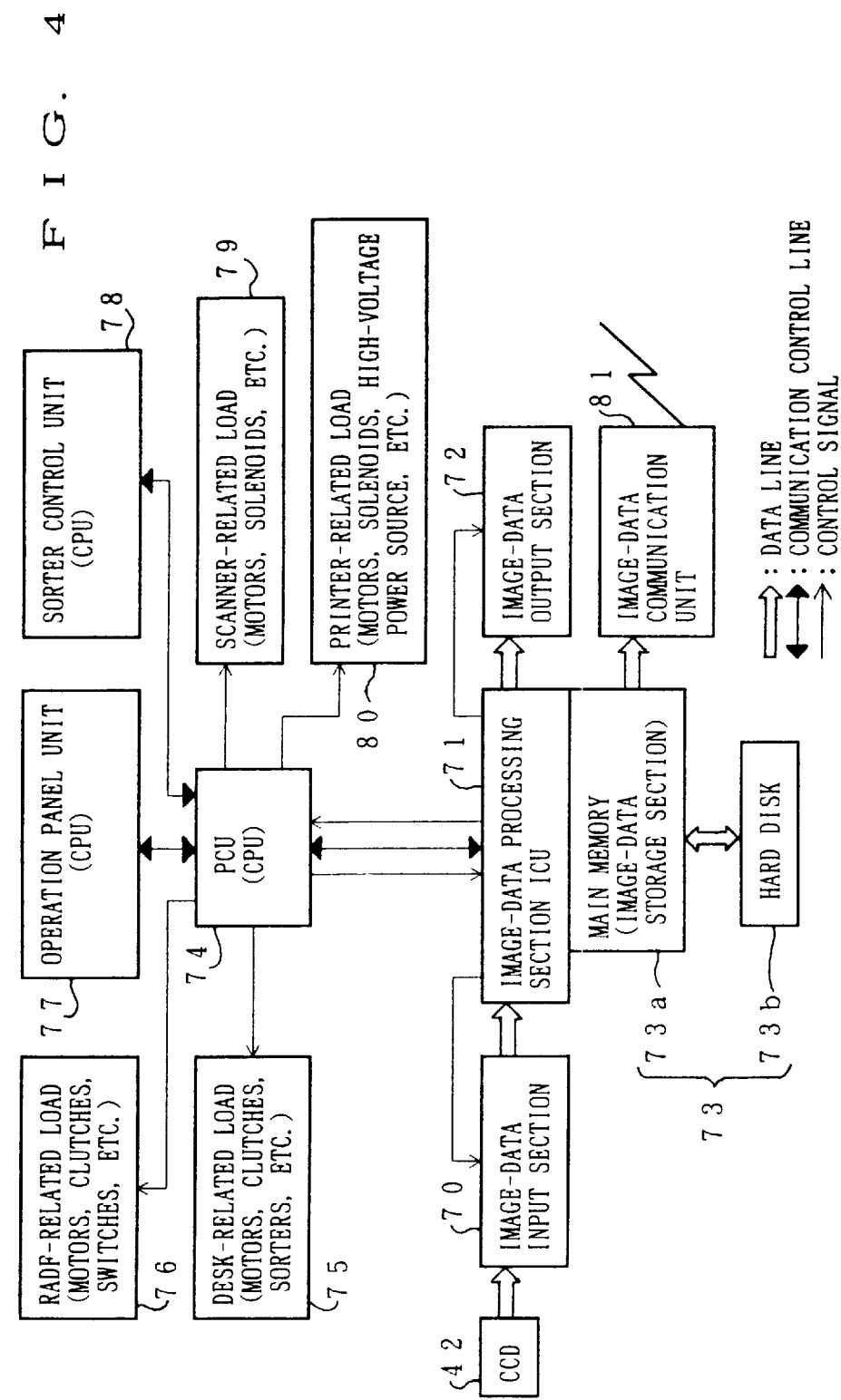
FIG. 4 is a block diagram showing a structure of a control system in the digital copying machine.

The PCU 74 controls the overall operation of the digital copying machine 30, and the control mechanism in the PCU 74 is illustrated in FIG. 4.

As shown in FIG. 4, the PCU 74 is connected to a disk-related load 75, an RADF-related load 76, a operation panel unit 77, a sorter control unit 78, a scanner-related load 79, a printer-related load 80, and the image-data processing section 71.

The PCU 74 manages the foregoing components separately using the sequence control by outputting a control signal to each. The disk-related load 75 is a load of the components other than the digital copying machine main body, that is, a load of the motor, clutch, etc., of the sorter in the postprocessing device 34. The RADF-related load 76 is a load of the motor, clutch, switch, etc., of the RADF 36. The sorter control unit 78 includes a CPU and controls the operation of the sorter based on the control signal from the PCU 74. The scanner-related load 79 is a load of the motor, solenoid, etc., of the scanner unit 40. The printer-related load 80 is a load of the motor, solenoid, high-voltage power source, etc., of the electrophotographic processing section 47.

The control substrate unit 77 is an input section including a CPU, through which the operator sets functions such as a copying mode, etc., and enters a command in the digital copying machine 30. The control substrate unit 77 transfers the control signal to the PCU 74 in response to a mode set by the operator's input manipulation, for example, a copying mode. The PCU 74 controls the digital copying machine 30 to operate in the set mode using the control signal. On the other hand, the PCU 74 transfers the control signal indicating the operating condition of the digital copying machine 30 to the control substrate unit 77. The control substrate unit 77 displays the current operating condition of the digital copy machine 30 on the display section in response to the control signal to inform the same to the operator.

The memory 73, connected to the image-data processing section 71, is composed of a main memory 73a made of, for example, a semiconductor memory, and a hard disk 73b. An image-data communication unit 81, connected to the main memory 73a, is provided to enable communication of image data, image control signal, and the like with the other digital data apparatuses. The image-data communication unit 81 corresponds to, for example, an interface 93a and a communication line 99 in a digital copying machine 93 of FIG. 11.

Figure 5:
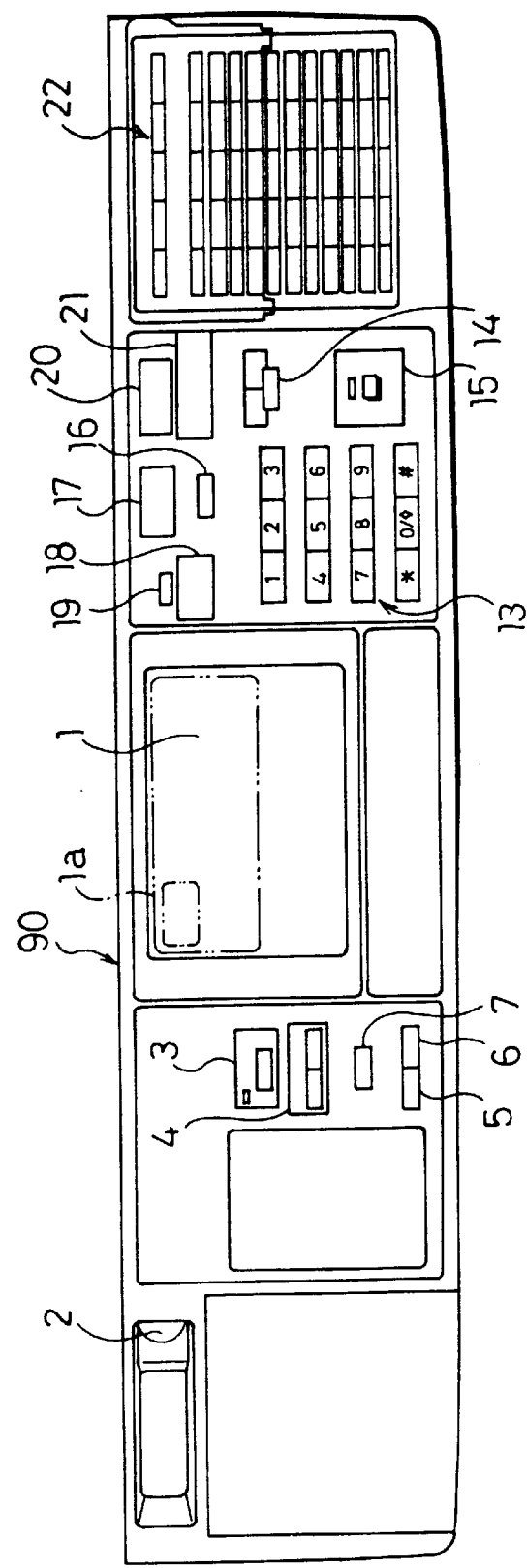
FIG. 5 is a front view of an operational panel attached to the digital copying machine.

The control substrate unit 77 includes a control panel 90 of FIG. 5 as an input section. The control panel 90 includes a touch panel type display section at the center as a liquid crystal display apparatus 1. A screen switch command area 1a is formed in a section of the screen on the liquid crystal display apparatus 1. The screen switch command area 1a is provided to enable the operator to input a command to switch a display screen to a screen for selecting an image edit function. As will be described below, when the operator directly presses the screen switch command area 1a with his finger, a list of edit functions is displayed on the screen of the liquid crystal display apparatus 1 to enable the operator to select his desired edit function. Thus, the operator can set his desired edit function only by pressing the corresponding region on the display area with his finger.

As shown in FIG. 5, the control panel 90 includes a dial 2 at the left edge for controlling the contrast of the screen on the liquid crystal display apparatus 1. A magnification auto-setting key 3, a zoom key 4, fixed magnification keys 5 and 6, and an equal magnification key 7 are provided between the dial 2 and the liquid crystal display apparatus 1. The operator presses the magnification auto-setting key 3 when he wishes to set a mode in which a copy magnification is automatically selected, and the zoom key 4 when he wishes to increase or decrease a copy magnification per 1 percent. The operator presses the fixed magnification key 5 or 6 when he wishes to select a fixed magnification, and the equal magnification key 7 when he wishes to reset a current copy magnification to the standard magnification (equal magnification).

Also as shown in FIG. 5, the liquid crystal display apparatus 1 includes on its right-hand position, a number setting key 13, a clear key 14, a start key 15, an all clear key 16, an interruption key 17, an operation guide key 18, a message forwarding key 19, a memory transmitting mode key 20, a copy/facsimile switching key 21, and an one-touch dial key 22a.

The number setting key 13 is used for setting the number of copies, and the clear key 14 when he wishes to rest the copy quantity or suspend the continuous copying operation. The operator presses the start key 15 to start the copying operation, and the all clear key 16 when he wishes to reset all the set modes to standard. The operator presses the interruption key 17 when he wishes to make a copy during the continuous copying operation, and the manipulation guide key 18 when he needs some help in manipulating the digital copying machine 30. When the manipulation guide key 18 is pressed, the manipulation instructions of the digital copying machine 30 are displayed on the liquid crystal display apparatus 1. The operator presses the message advancing key 19 when he wishes to advance the messages displayed after the manipulation guide key 18 is pressed.

The memory transmission mode key 20, copy/facsimile mode switching key 21, and one-touch dial keys 22 are the set keys related to a facsimile mode. The operator presses the memory transmission mode key 20 when he wishes to send the document data after the document data are once stored in the memory. The operator presses the copy/facsimile mode switching key 21 when he wishes to switch the digital copying machine 30 from the copy mode to the facsimile mode and vice versa. Each one-touch dial key 22 is arranged to remember a telephone number, so that the operator can make a phone call to a desired correspondent by a one-touch manipulation.

The above arrangement of the control panel 90 as to the kinds and alignment of the keys is explained as an example, and each control panel 90 may be arranged differently depending on the models of the digital copying machines 30.

The above liquid crystal display apparatus 1 can display, for example, a basic screen, various function setting screens, an image quality setting screen, a postprocessing setting screen, an initialization screen, a finger print registration screen, a department management setting screen, a limiter setting screen, a simulation screen, a maintenance management setting screen as well as the screens explained below.

As shown in FIG. 6(a), the basic screen includes display keys for setting various editing functions: a function setting key 101a, an image quality setting key 101b, a post-process setting key 101c, an initialization key 101d, a set function confirmation key 101e and a cassette setting key 101f. On the basic screen, the set cassettes, contrast, number of copies and magnification, etc., are displayed. For example, when the set function confirmation key 101e is pressed, the function set in the image forming system of the present invention is displayed on the display screen of the liquid crystal display apparatus 1.

As shown in FIG. 6(b), keys for setting respective editing functions are displayed on the first function setting screen: a mirror image key 102a, an italic key 102b, an inverse key 102c, a shadow key 102d, a trimming key 102e, a masking key 102f, a basic screen transition key 102g for switching to the basic screen, and a next page key 102h for switching to the next screen. When the next page key 102h is pressed, the second function setting screen is displayed.

As shown in FIG. 6(c), keys for setting various functions are displayed on the second function setting screen: a composition key 103a, an independent magnification key 103b, a sharpness setting key 103c for setting a sharpness function for emphasizing the image, a translation key 103d for setting a English to Japanese translation function, a basic screen switch key 103g for switching to the basic screen, a previous screen switch key 103h for switching to the previous screen. For example, when the independent magnification setting key 103b is pressed, respective magnifications in lateral direction and a longitudinal direction of the original document image are set independently.

As shown in FIG. 7(a), various set keys are displayed on the image quality setting screen: a contrast key 104a, a HI-FI (high quality copy mode) key 104b, a background eliminating key 104c, auto-magnification key 104d, a text mode key 104e, a text-picture mixed mode key 104f, a picture mode key 104g, and a magnification key 104h. Further, the image quality setting screen displays the set contrast and magnification.

As shown in FIG. 7(b), various set keys are displayed on the postprocessing setting screen: A document input key 105a for specifying one-sided document or both-sided document, a copy input key 105b for specifying one-sided copy or both-sided copy, a binding key 105c are displayed. Further, in the postprocessing screen, various keys for setting the postprocessing functions are displayed. The postprocessing setting screen displays various keys: staple sorter key 105d, a sorter key 105e, a finish key 105f and an electronic RDH (Recycle Document Handler) key 105g.

When the electric RDH key 105g is pressed, for example, the image data of the document of 10 pages are temporarily stored in the memory 73. Then, the image data are read from the memory 73 page by page to carrying out a copying operation a set by a set. In this case, a copying operation is repeated as many times as required to obtain desired sets of document.

As shown in FIG. 8(a), keys for setting respective modes are displayed on the initialization setting screen: a finger print registration key 106a, a department control key 106b, a simulation key 106c, a maintenance control key 106d, a new function registration key 106e, and a output-device selection key 106f for selecting an output device and a basic screen switch key 106g for switching to the basic screen.

When the finger print register key 106a is pressed, as shown in FIG. 8(b), the finger print register screen is displayed on the display screen of the liquid crystal display apparatus 1. The finger print register screen includes an input area 107a for a department code and individual's name, and display areas 107b and 107c for inputted department code and name, and a set completion key 107d. The set completion key 107d is a key to be pressed upon completion of the inputs of the department code and name.

On the other hand, when the department control key 106b is pressed by the initialization screen, as shown in FIG. 8(c), the department control screen is displayed on the display screen of the liquid crystal display apparatus 1. In the department control setting screen, the input department code and the number of staff members are displayed in the above areas, respectively.

On the department control setting screen, when the limiter setting key 108b is pressed, as shown in FIG. 9(a), the limiter setting screen is displayed. In the initialization screen, when the simulation key 106c is pressed, a simulation screen is displayed as shown in FIG. 9(b).

Figure 10:
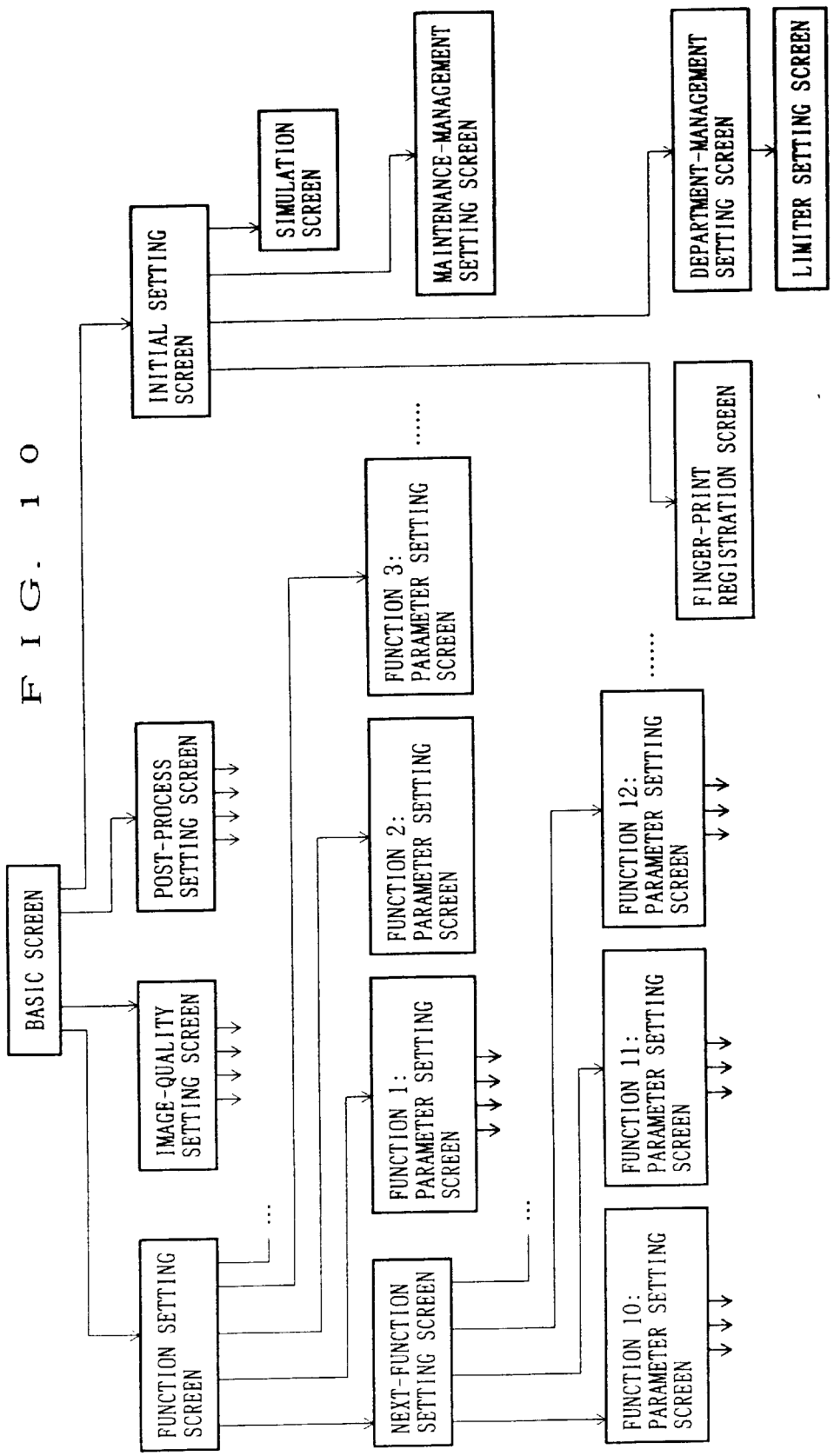
FIG. 10 is an explanatory view showing processes in which respective screens transfer to other screens in the liquid crystal display apparatus on the operation panel.

The foregoing screens switch as shown in FIG. 10. To begin with, the liquid crystal display apparatus 1 displays the basic screen, and as soon as the operator presses any of the function setting key, the function setting key 101a, the image quality setting key 101b, the post-process setting key 101c or the initialization key 101d, the display screen is switched to the screen corresponding to the key.

For example, when the function setting key 101a is pressed, the first function setting screen is displayed. In this screen, when the next page key 102h is pressed, the current screen is switched to the second function setting screen (NEXT function setting screen). On the other hand, when the basic screen transition key 102g is pressed, the current screen is switched to the basic screen.

Further, for example, on the first function setting screen, when the italic key 102b and the inverse key 102c are pressed, as shown in FIG. 12(a), the respective display areas of the italic key 102b and the inverse key 102c are pressed on the first function setting screen, both the "italic" function setting area and inverse function setting area are displayed with the reversed background as shown in FIG. 12(a), and then, the first function setting screen switches to the one illustrated in FIG. 12(b).

When the operator presses an execution key on the screen of FIG. 12(b), the screen switches to the italic setting screen illustrated in FIG. 12(c). The italic setting screen includes a tilt angle input key 106a as a tiling angle setting area, and a setting end key 106b as a setting end input area. Further, the italic setting screen displays a tilt angle.

As soon as the operator presses a predetermined function setting key in the first and second function setting screens, the screen switches to a corresponding parameter setting screen, such as the above italic setting screen.

Here, example image edit functions made available by manipulating the setting areas as explained above in the present image forming system and the operation for each are set forth in Table 1 below. The image edit functions are not limited to the examples specified below, and a function for making fair copies of hand written characters and images is a possible option.

TABLE 1

| IMAGE EDIT FUNCTION | OPERATION |
|---|---|
| INDEPENDENT MAGNIFICATION | SET MAGNIFICATION IN LATERAL AND LONGITUDINAL DIRECTION INDEPENDENTLY |
| SHARPNESS | ADJUST IMAGE QUALITY OF A COPY |
| BINDING MARGIN | LEAVE AN ARBITRARY BINDING MARGIN |
| FRAME ELIMINATION | ELIMINATE FRAME IN A COPY |
| CENTERING | BALANCING A COPY AT THE CENTER |
| 1-SET-2-COPY | MAKE A COPY OF A BOOK |
| ADDRESSED COPY | ATTACH AN ADDRESS TO A COPY |
| MULTI-SHOT | COMBINE MULTI-PAGES IN ONE COPY |
| TRIMMING | COPY A DESIGNATED AREA ALONE |
| MASKING | LEAVE OUT A DESIGNATED AREA |
| MOVE | MOVE AN ORIGINAL DOCUMENT TO AN ARBITRARY POSITION |
| COMPOSITION | COMPOSITE MORE THAN ONE PAGE OF A COPY |
| MONOCHROME INVERSE | INVERSE NEGATIVE/POSITIVE |
| NET | IMPOSE A NET |
| SHADOW | ADD SHADOW |
| OUTLINE | BORDER AN IMAGE |
| ITALIC | TILT AN IMAGE |
| MIRROR IMAGE | REVERSE AN IMAGE AS A MIRROR DOES |
| REPEAT COPY | MAKE MULTI-COPY OF AN IMAGE IN ONE PAGE |
| 2-IN-1-COPY | MAKE ONE COPY IN EVERY TWO ORIGINAL DOCUMENTS |
| DATED COPY | ATTACH THE DATE TO A COPY |
| CENTER MARK | ATTACH A CENTER MARK TO A COPY |
| ENLARGE/DIVIDE OUTPUT | DIVIDE AN ENLARGED COPY INTO A NUMBER OF SHEETS |
| TRANSLATION | TRANSLATE AN ORIGINAL DOCUMENT |
| HIGH-GRADE IMAGE | MAKE A HIGH-GRADE IMAGE |

Figure 11:
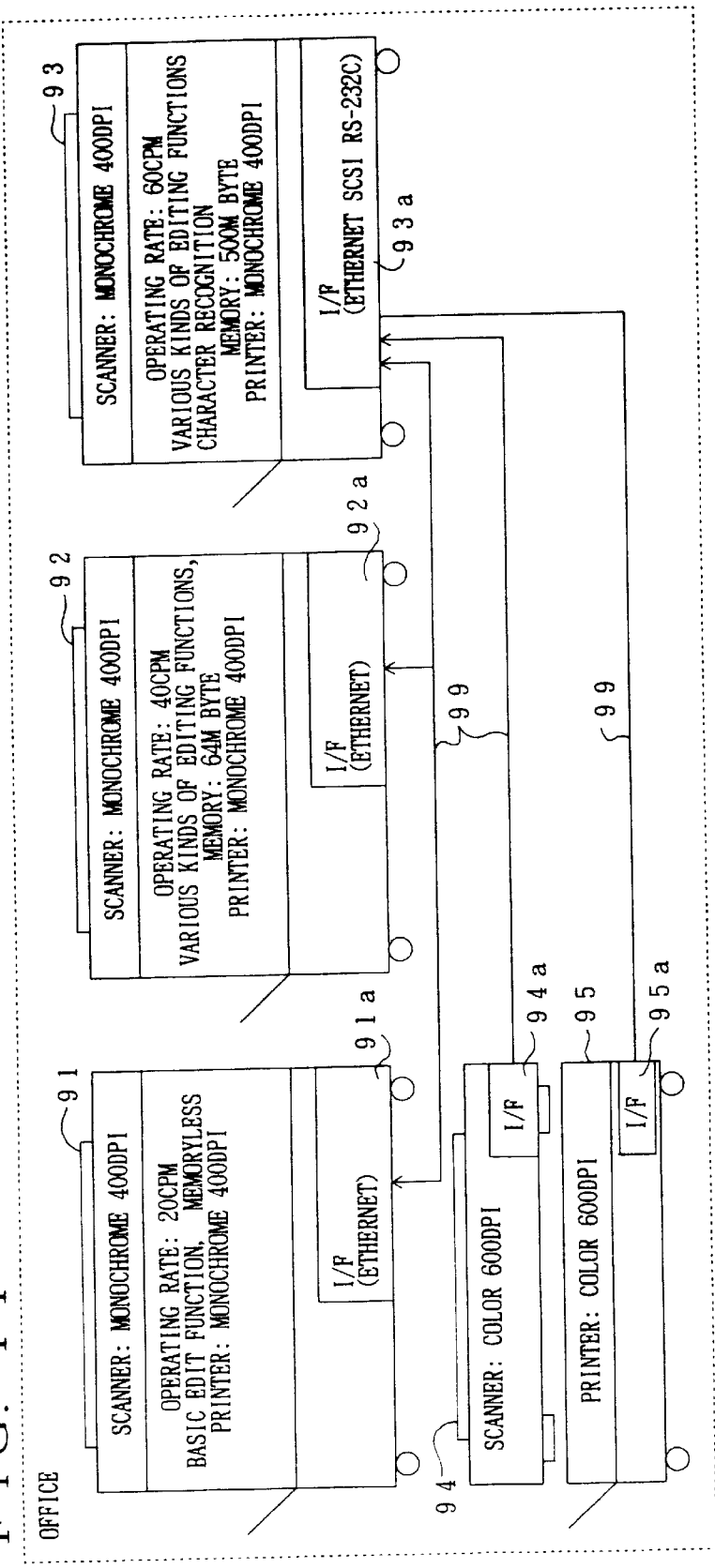
FIG. 11 is an explanatory view showing a schematic structure of the image forming system.

As shown in FIG. 11, the present image forming system is composed of digital data machines installed in a typical office, and includes three image forming apparatuses respectively denoted as digital copying machines 91 through 93, a scanner 94, and a printer 95.

The digital copying machine 91 is an inexpensive, low-grade, "memoryless" model furnished with basic edit functions only. "Memoryless" referred herein means that the machine does not include a page memory capable of storing a great volume of image data, but at least a line memory sufficiently large enough to operate as a normal digital copying machine. Also, the basic edit functions means, for example, the monochrome inverse function, "italic" function and the mirror function that can be carried out without using a page memory.

The digital copying machine 91 includes the scanner unit 40 of FIG. 2 with the resolution of 400DPI (Dot Per Inch) in monochrome. The digital copying machine 91 has a relatively low operating rate of 20CPM (20 copies Per Minute). The laser printer section 32 of the digital copying machine 91 has also resolution of 400DPI in monochrome, and includes an interface (I/F) 91a.

The digital copying machine 92 serving as second image forming apparatus is a middle class model with its scanner's and printer's resolutions at 400DPI in monochrome, respectively, and an operating rate of 40CPM. The digital copying machine 92 includes various kinds of edit functions, a page memory, and an interface 92a. The various edit functions include a "synthesis" function, a "repeat" function, etc., in addition to basic edit functions. The page memory is a 64M-byte memory (capable of storing up to four Japanese Standard A4 size papers at the resolution of 400DPI and 8-bit/pixel). The above memory corresponds to the main memory 73a of FIG. 4.

The digital copying machine 93 serving as second image forming apparatus is a high-grade model with its scanner's and printer's resolution at 400DPI in monochrome, respectively and an operating rate as high as 60CPM.

Further, the digital copying machine 93 has various kinds of edit functions, a character recognition function, a bit data coding function, and a page memory of a capacity as large as 500M byte (capable of storing up to 100 pages of Japanese standard A4 size papers at the resolution of 400 DPI and 8-bit/pixel and compression ratio of 1/4). Thus, the digital copying machine 93 can change the page order of the input image data, or store the document data in many different formats in addition to the edit functions of the digital copying machine 92. The above memory corresponds to the main memory 73a and hard disk 73b of FIG. 4 in combination. The digital copying machine 93 also includes an interface 93a.

The scanner 94 can read a color image at a resolution of 600 DPI. The printer 95 can produce a color image copy at a recording density of 600 DPI. The scanner 94 and the printer 95 include interfaces 94a and 95a, respectively.

The digital copying machines 91 through 93, scanner 94, and printer 95 are interconnected through their interfaces 91a through 95a and the communication line 99, thereby enabling bi-directional data transmission. Thus, the interfaces 91a through 95a, the communication line 99, and the PCU 74 constitute the transmitting apparatus.

The transmitting apparatus handles bit data (for example, level data per pixel unit: 8 bits; 256 gray scales) as image data, command data, and the like. The transmitting apparatus can transmit a high-level image as well, such as a landscape, at high definition. Also, the transmitting apparatus can reduce a volume of text data, namely, characters data, by coding the read data and send the coded data at a high speed. In particular, the image data, such as a landscape having different levels, are generally transmitted after reducing the data volume by one of the area gray scale methods, for example, the Dither method or error diffusing method. In case of the error diffusing method, each machine processes the image data in advance.

Also, each of the digital copying machines 91 through 93 converts the transmission data into the data in a format the printer 95 can output. Thus, when any of the above copying machines 91 through 93 receives the image data and outputs the same onto a sheet, the machine inputs the received image data into the laser printer section 32 and converts the same into a writing data array by means of the image processing section before it outputs the image data.

Each of the interfaces 91a through 95a is defined by their own prescribed protocols and transmission rates, and an adequate rate is selected based on the content of the transmission data, such as a volume thereof, and the position of each machine in relation with the others, such as a distance. Further, in the present image forming system, the machines are connected in one-to-one relationship, while at the same, some of the machines may be connected to the common communication line 99 like a daisy chain. For this reason, each machine has its address, so that each of the interfaces 91a through 95a can identify a corresponding machine to which the data are addressed. The interfaces 91a–95a are ethernets, which is in effect a network enabling high-speed image data transmission. Further, the interfaces 91a–95a are SCSI (Small Computer System Interface) or RS-232C enabling data transmission at moderate rates.

Each of the digital copying machines 91–93 includes a facsimile function, so that each can transmit data through telephone line. Also, each of the digital copying machines 91–93 includes a printer mode, so that each can print out document data sent from a personal computer or word processor.

The functions of the digital copying machine depends on its price, memory capacity, and the like, and every office has different purpose and demand. In consideration of the propose of use and the requested grate, various digital copying machines exist in offices. Thus, the digital copying machines are not limited to the above example digital copying machines 91 through 93, and a great line-up of various models are available.

Here, example image edit functions of the above digital copying machines 91–93 of the present invention are tabulated for ready comparison in Table 2 below.

TABLE 2

| IMAGE EDIT FUNCTION | COPYING MACHINE 91 | COPYING MACHINE 92 | COPYING MACHINE 93 |
|---|---|---|---|
| INDEPENDENT MAGNIFICATION | ○ | ○ | ○ |
| SHARPNESS |  | ○ | ○ |
| BINDING MARGIN | ○ | ○ | ○ |
| FRAME ELIMINATION | ○ | ○ | ○ |
| CENTERING |  | ○ | ○ |
| 1-SET-2-COPY |  | ○ | ○ |
| ADDRESSED COPY |  |  | ○ |
| MULTI-SHOT |  | ○ | ○ |
| TRIMMING-MASKING |  | ○ | ○ |
| MOVING FUNCTION |  | ○ | ○ |
| COMPOSITION FUNCTION |  |  | ○ |
| MONOCHROME INVERSION/ NETTING | ○ | ○ | ○ |
| SHADOW/OUTLINE |  |  | ○ |
| ITALIC/MIRROR IMAGE |  |  | ○ |
| REPEAT COPY | ○ | ○ | ○ |
| 2-IN-1-COPY |  |  | ○ |
| DATE/CENTER MARK |  |  | ○ |

TABLE 2-continued

| IMAGE EDIT FUNCTION | COPYING MACHINE 91 | COPYING MACHINE 92 | COPYING MACHINE 93 |
|---|---|---|---|
| ENLARGED & DIVIDED OUTPUT | | | ○ |
| TRANSLATION | | | ○ |
| HIGH GRADE QUALITY | | | ○ |

The data related to these functions are stored in the memory 73 of each of the digital copying machines 91–93, and the PCU 74 of each machine refers these data when necessary.

In the image forming system of the present embodiment, as shown in Table 2, the digital copying machine 93 has the greatest number of image processing functions and the memory 73 of the largest memory capacity. Namely, the digital copying machine 93 constitutes a main digital copying machine. To the digital copying machine 93, connected are other digital copying machines 91 and 92, the scanner 94 and the printer 95. This arrangement enables the copying machines 91 and 92 to share the image processing functions and memory 73 of the digital copying machine 93.

For example, in the case where the copying machine 91 uses the image processing functions of the digital copying machine 93, the digital copying machine 91 sends the image data to the digital copying machine 93. Then, the digital copying machine 93 processes the received image data in an adequate manner, and returns the processed image data to the digital copying machine 91. Subsequently, the digital copying machine 91 outputs the returned image data in the form of an image on a sheet.

In case where the copying machine 91 uses the memory 73 of the digital copying machine 93, the image data are sent to the digital copying machine 93 from the digital copying machine 91, and the digital copying machine 93 stores the same into its own memory 73, and returns the same to the digital copying machine 91 that has sent the original image data at its request.

The image processing operation of the image forming system arranged as above will be detailed with reference to the flowchart of FIG. 1. Assume that in the digital copying machine 91 (first image forming apparatus), the operator selects the sharpness function to highlight an image in every certain number of pages, and the image data are distributed to the digital copying machines 92 and 93 (second image forming apparatuses) to be processed. Here, in the digital copying machines 91 and 92, on the function setting screen of the liquid crystal display apparatus 1, the functions provided in the digital copying machine 93 are displayed.

Figure 13A:
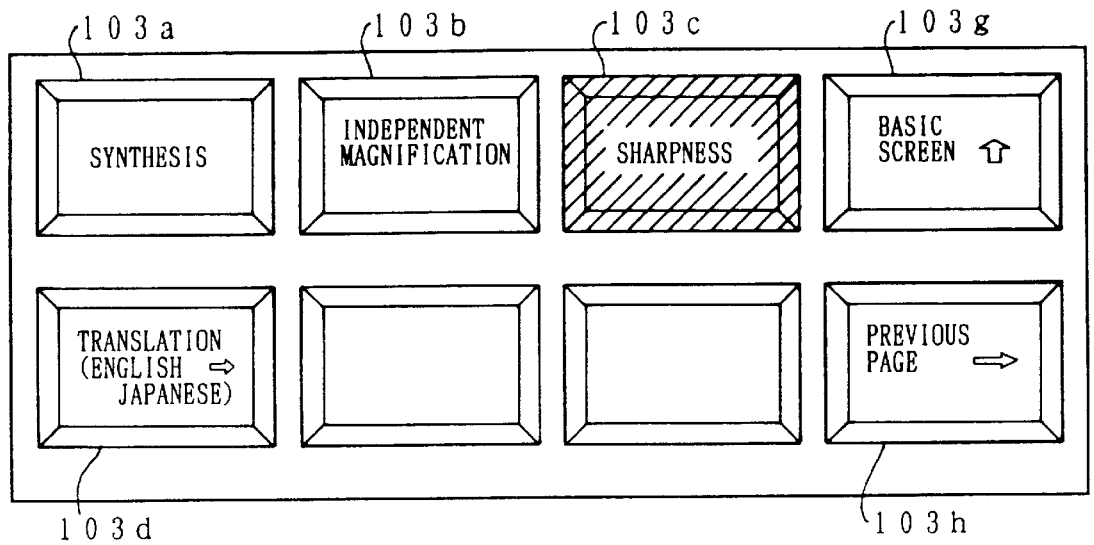
FIG. 13(a) is a front view of the second function setting screen of the liquid crystal display apparatus in the control panel of FIG. 6(b) when a sharpness function is selected.

As soon as the operator presses the function setting key 101a in the basic screen on the liquid crystal display apparatus 1 of FIG. 6(a), the screen switches to the first function setting screen of FIG. 6(b). Then, the screen switches to the second function setting screen of FIG. 6(c) when the operator presses the next page key 102h. To select the sharpness function, the operator presses the sharpness setting key 103c in the second function setting screen (S1), the sharpness setting key 103c is displayed with an inverse background as shown in FIG. 13(a), which enables the operator to confirm that he has selected the sharpness function.

Figure 13B:
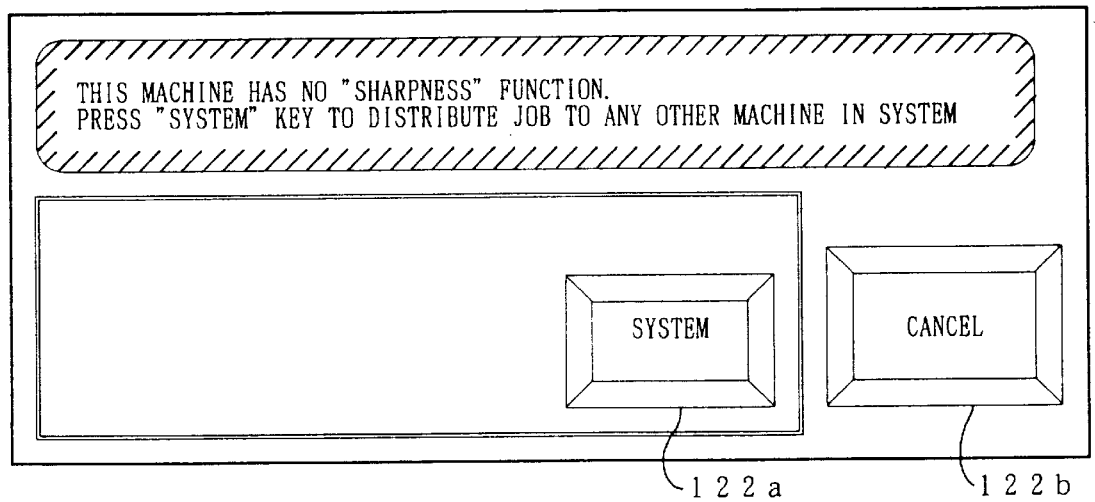
FIG. 13(b) is a front view of the display screen of the liquid crystal display apparatus when S3 of FIG. 1 is carried out.
Figure 13C:
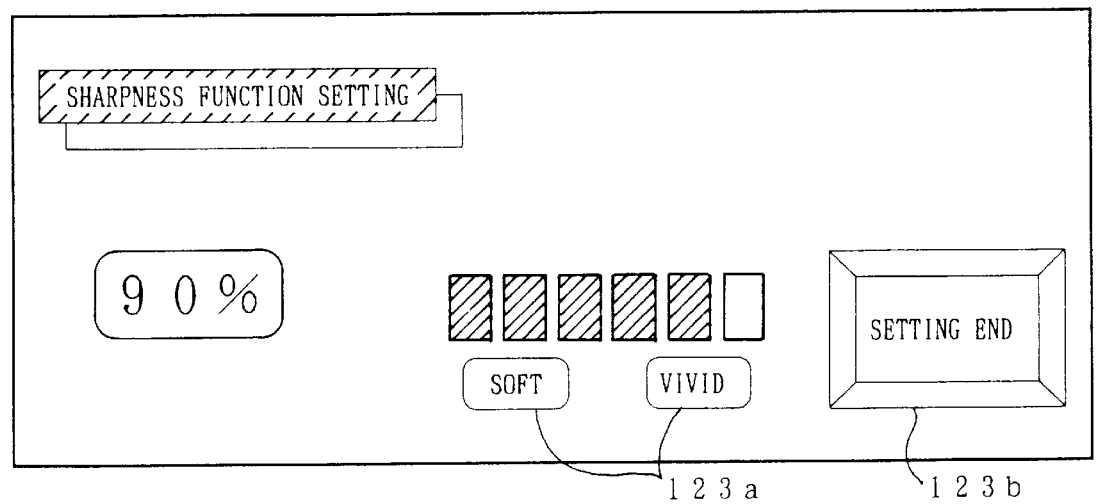
FIG. 13(c) is a front view of a sharpness setting screen of the above liquid crystal display apparatus.

Next, the PCU 74 of the digital copying machine 91 determines whether nor not the sharpness function is provided (S2). As set forth in Table 2 above, the digital copying machine 91 does not have the sharpness function. Thus, the checking result is negative in S2. Accordingly, a message "THIS MACHINE HAS NO SHARPNESS FUNCTION" is displayed in the basic screen of the liquid crystal display apparatus 1 as shown in FIG. 13(b), and directs the operator to select whether the image data should be processed by an external machine (for example digital copying machines 92 and/or 93) in the system or not (S3).

As described, since the digital copying machine 91 does not have the sharpness function, if the operator wishes to execute the sharpness function, he has to request other machines to carry out the sharpness function. However, if the operator does not wish so, he presses a cancel key 122b, upon which the CPU 74 determines that the operator does not wish to request the other machines to carry out the sharpness function (S4). Then, the set mode is cancelled (S5).

On the other hand, when the operator presses the system selection key 122a on the display screen, the PCU 74 determines that the external machine performs the sharpness function (S4). Then, the PCU 74 selects the digital copying machines 92 and 93 as the ones having the sharpness function within the system. Also, the screen on the liquid crystal display apparatus 1 shifts to the sharpness function setting screen of FIG. 13(c).

Next, the operator inputs the desired highlighting level in sharpness using a sharpness input key 123a on the display screen. Upon completing the setting, the setting end key 123b is pressed upon which the PCU 74 of the digital copying machine 91 applies the function control data for each image to the image data. Next, the PCU 74 transmits the processed image data to the digital copying machines 92 and 93 after scrambling the image data (to be 9 described later) (S6).

The above image data are transmitted from the main memory 73a of FIG. 4 to the digital copying machines 92 and 93 through an image data communication unit 81 and a modem (not shown). The image data are transmitted together with the function control data composed of a processing code indicating the requested function, namely, the sharpness function herein. As shown in FIG. 11, the transmitted image data are distributed to the digital copying machines 92 and 93 through the interface 91a, communication line 99, and interface 92a and 93a.

The image data processed herein are the data of the original image read by, for example, the scanner section 31. As previously mentioned, it is not the page memory but the line memory that the digital copying machine 91 includes. Therefore, the image data are read line by line and transferred steadily line by line.

In case that the image data are transferred through a general network, the image data may leak to an external to the network. Thus, if the original image contain confidential information, it is strongly recommended to transmit the image data thereof with great care to prevent the leakage.

Namely, since anyone can access the general network at any time, an authorized third party can easily obtain the data flowing through the network, which is known as a crime by a hacker. Therefore, it is preferable to have a preventive measure, such as scrambling the data subject to transmission through the network, so that should the third party obtain the data, he can not make any sense out of them. In the present embodiment, the transmission data are scrambled for the security reason.

Upon receipt of the scrambled image data, the digital copying machines 92 and 93 descramble the image data, and confirm the same as being the image data and function control data. Then, the digital copying machines 92 and 93 start to process the received image data using the sharpness function as requested (S7).

Next, upon completing the process of the sharpness function, the digital copying machines 92 and 93 scramble the image data. Then, the digital copying machines 92 and 93 return the received scrambled image data to the digital copying machine 91 which sent the request in a direction reverse to the previous transmission (S8).

The digital copying machine 91 descrambles the received image data (S9).

The descrambled image data from are temporality stored in the memory 73 page by page. Then, the stored image data are set to the image data output section 72, and an aforementioned sequential process is applied with respect to the image data. Thereafter, when the laser printer section 32 is ready for printing, laser is outputted as serial image data from a semiconductor laser in the laser writing unit 46. As a result, an electrostatic latent image is rewritten on the photoreceptor drum 48, and the image data are outputted onto a sheet as image (S10). In this case, a recording operation is performed in the same manner as the aforementioned digital copying machine 30.

Figure 14:
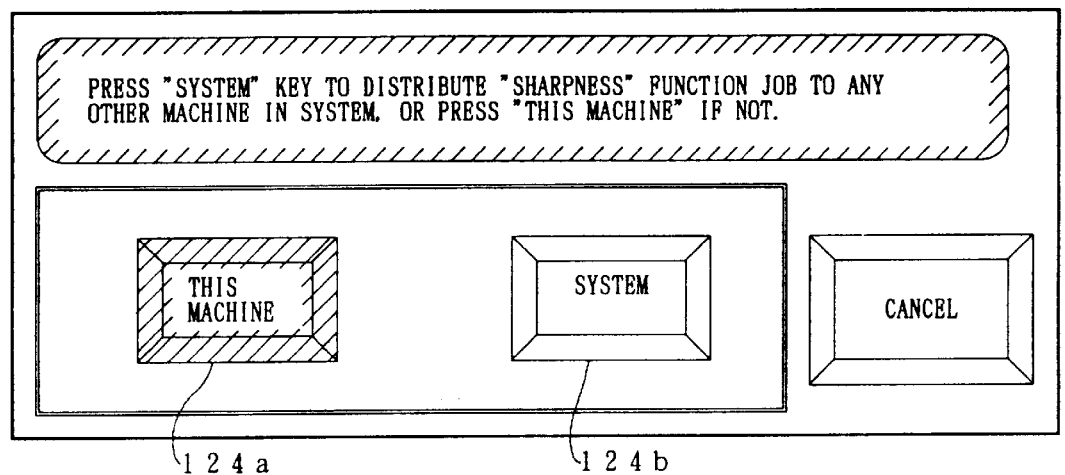
FIG. 14 is a front view showing a display screen of the liquid crystal display apparatus when S11 of FIG. 1 is carried out.

When the result of determination in S2 is YES, i.e., the "sharpness" function is provided in the digital copying machine, as shown in FIG. 14, a message "THIS MACHINE HAS A SHARPNESS FUNCTION." is displayed on the display screen of the liquid crystal display apparatus 1. Then, the operator selects if he wishes to request other apparatus (for example, digital copying machine 93) for the "sharpness" function (S11).

The clear image of the described case can be achieved, for example, by the following arrangement. The designated machine is the digital copying machine 92, and the sharpness process is performed by the image data processing section 71 of the digital copying machine 93.

When a system setting key 124b is pressed by the operator, the PCU 74 determines that the digital copying machine 93 performs a sharpness function (S12). In this case, a sequence moves back to S6 where the image data corresponding to the document image is transferred to the digital copying machine 93. Then, the image data processed by the digital copying machine 93 is outputted by the laser printer section 32.

On the other hand, if a designated machine setting key 124a is pressed by the operator in S11, the PCU 74 determines that the "sharpness" function is performed only by the designated machine (S12). Then, the sharpness process is performed by the designated machine (S13). Thereafter, the sequence moves to S10 where the processed image data are outputted by the laser printer section 32.

As described, according to the image forming system of the present embodiment, when the image editing function which is not provided in the digital copying machine 91 is selected by the operator, the requested image process can be distributed to the digital copying machines 92 and 93 connected by the interfaces 91a, 92a and 93a and the communication line 99 to perform the editing function. Therefore, it is not necessarily that digital copying machine 91 is provided with as high image editing function as the digital copying machines 92 and 93.

Figure 1:
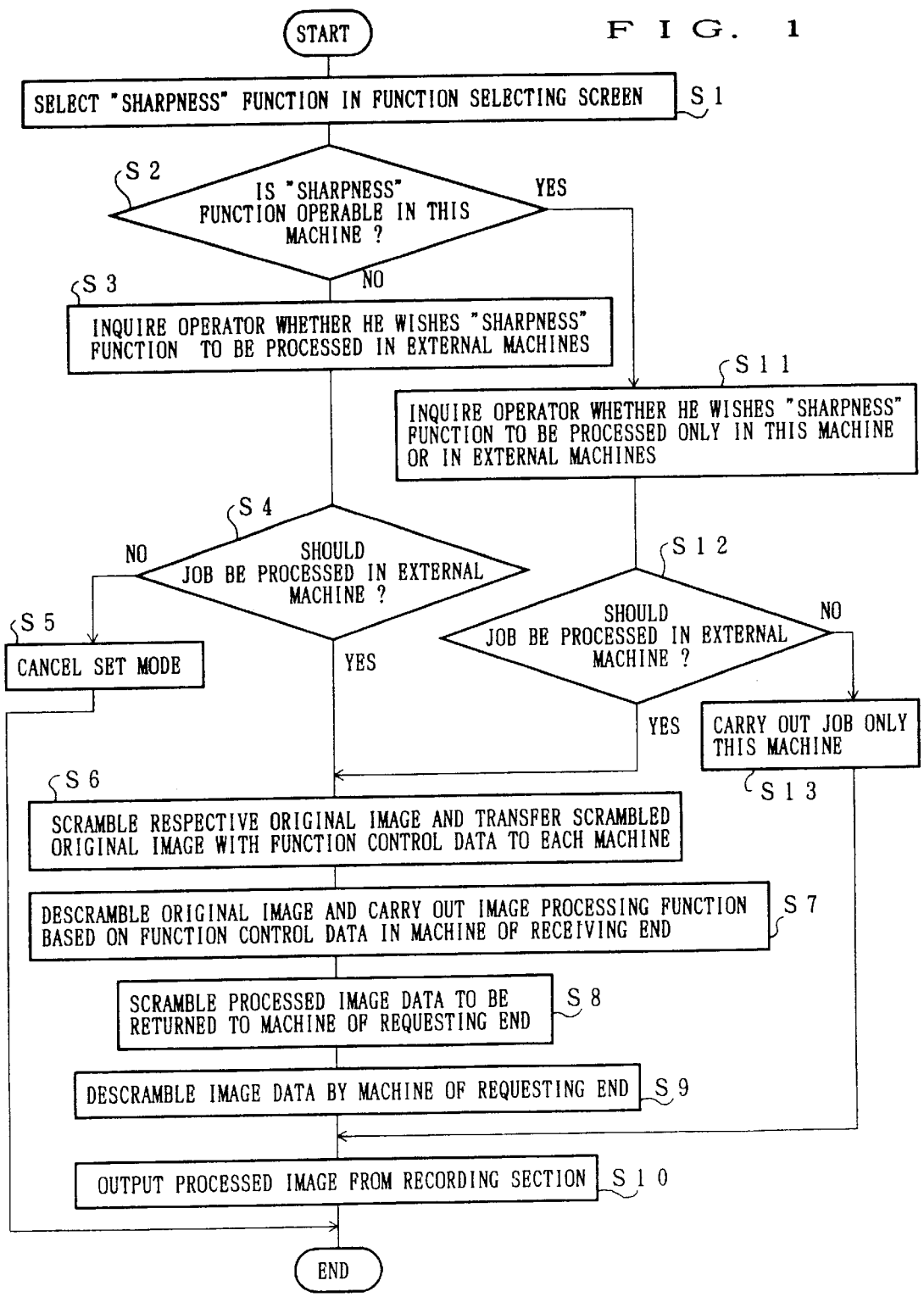
FIG. 1 is a flowchart showing an operation of an image forming system in accordance with one embodiment of the present invention.

According to an example shown in FIG. 1, the digital copying machines 92 and 93 return the processed image data to the digital copying machine 91 which sent the request (S8), and the digital copying machine 91 outputs an image (S10). Here, the operator is permitted to select the receiving end of the processed image data as desired. In such case, the digital copying machines 92 and 93 return the processed image data to the digital copying machine which sent the request, and the image is outputted from the selected machine.

In the above explanation, only the digital copying machines 91 through 93 are concerned. However, if the scanner 94 and printer 95 are combined, they can operate in almost in the same manner as a digital copying machine and can be used as such.

In this case, color image data read by the scanner 94 with a resolution of 600DPI are sent to the digital copying machine 93 to be processed. Then, the digital copying machine 93 returns the processed image data with a recording resolution of 600DPI to the printer 95 to be printed out therefrom.

As described, in the image forming system of the present embodiment, when the digital copying machine 91 reads an original image by the scanner section 31 provided in the digital copying machine 91, the image data in accordance with the original image can be obtained. The image data are, for example, composed of a plurality of pages, and the digital copying machine 91 may not have the desired image processing function such as sharpness function.

Here, by pressing the operation panel 90 by the operator, a request for a predetermined sharpness process with respect to the image data is inputted from the operation panel 90. Then, the PCU 74 selects a digital copying machine 92 or 93 which permits a predetermined image processing by the PCU 74. Furthermore, the PCU 74 transfers the image data through the interfaces 91a, 92a and 93a and the communication line 99 to the selected plurality of digital copying machines 92 and 93.

In respective digital copying machines 92 and 93 which receive the request, a predetermined image process is applied with respect to the image data by the image data processing section 71. Then, the PCU 74 of respective digital copying machines 92 and 93 return the processed image data by the PCU 74 the digital copying machines 92 and 03 through respective interfaces 91a, 92a and 93a, and the communication line 99. In the digital copying machine 91 to which the processed image data are returned, processed image data of several pages are aligned in the original page order. Then the resulting image data are outputted to the laser printer section 43. Then, the image data are visualized by the image data.

According to the described image forming system of the present embodiment, even in the case where the digital copying machine 91 does not have the image processing function requested by the operator, for example, sharpness function, the image data of plural pages are distributed into the digital copying machines 92 and 93 connected via the interfaces 91a and 92a and 93a and the communication line 99 to carry out the image processing function requested by the operator.

Therefore, it is not necessarily that the digital copying machines which constitutes an image forming system are individually provided with the image processing functions, thereby reducing the cost incurred on the operator of the digital copying machine 91.

Additionally, image data of plural pages are distributed into a plurality of digital copying machines 92 and 93 to carry out the image processing function, thereby providing a copying system which permits a time required for processing document image data of plural pages efficiently in a short period of time.

In the image forming system of the present embodiment, after the "sharpness function" is applied to image data by a plurality of digital copying machines 92 and 93, the processed image data are returned to the digital copying machine 91 which sent the request through the interfaces 91a, 92a and 93a and the communication line 99. Then, the image data are temporarily stored in the memory 73. Then, after it becomes ready for recording, the image data are sequentially outputted by the laser printer section 32.

According to the described arrangement, the need of stopping the output by the laser printer section 32 until all the document image are prepared is eliminated, thereby outputting the processed image efficiently.

Embodiment 2

Figure 15:
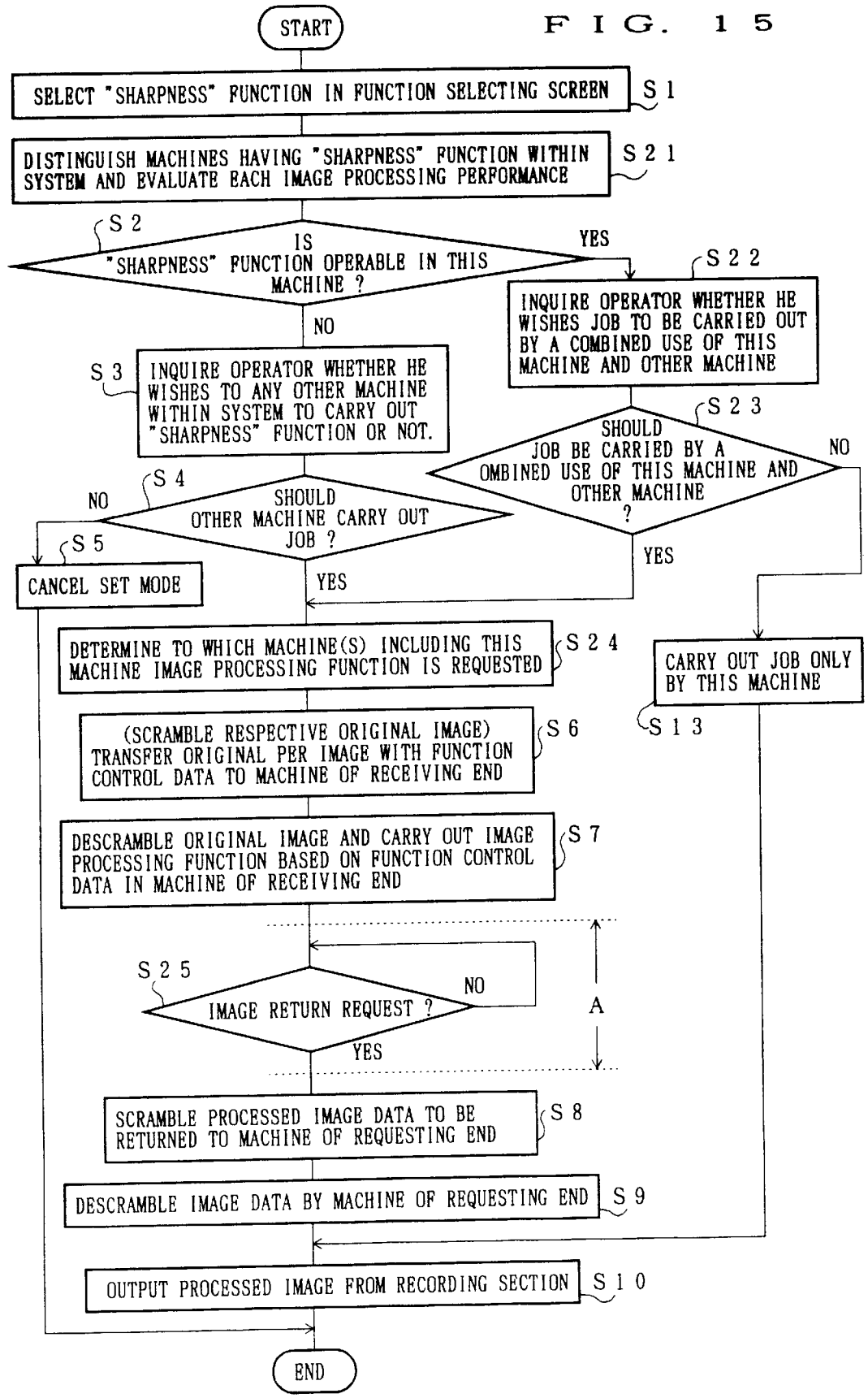
FIG. 15 is a flowchart showing an operation of an image forming system in accordance with another embodiment of the present invention.

The following description will describe one embodiment of the present invention in reference to FIG. 15. Here, members having the same function as those shown in FIG. 1 of the aforementioned embodiment will be designated by the same reference numerals, and thus the descriptions thereof shall be omitted here.

It is assumed here that in the image forming system of the present embodiment, a designated copying machine has a "sharpness" function. To be specific, the designated copying machine is the copying machine 92. Then, in the case of a document of a plurality of pages, the process of the "sharpness" function to be applied to a plurality of image data with a combined use of the designated machine and another digital copying machine will be explained in reference to the flowchart of FIG. 15. Here, the flowchart of FIG. 15 contain many processes in common with the flowchart of FIG. 1, therefore, in the present embodiment, explanations will be given for only those different from Embodiment 1.

First, in the second function selection screen of S1, the "sharpness" function is selected by the operator. Then, the PCU 74 of the digital copying machine 92 determines if respective digital copying machines 91, 92, and 93 have "sharpness" function, and determines the respective image processing performances of the digital copying machines 91, 92 and 93 (S21). Next, the PCU 74 of the digital copying machine 92 determines if the digital copying machine 92 has the "sharpness" function (S2). In this case, as the copying machine has the "sharpness" function, the result of determination in S2 is YES. In this case, the operator selects whether he wishes the "sharpness" function to be performed only by the designated copying machine or by not only the designated copying machine but also other copying machine(s) (S22).

When the PCU 74 determines that the operator wishes the "sharpness" function to be performed by only the designated copying machine but also other copying machine(s) (S23), the PCU 74 determines the machines (including the designated machine) which carry out the image processing function with respect to respective document data (S24).

Thereafter, the image data are added to the function control data for each image. Then, the image data are scrambled. Thereafter, the processed image data are transferred to the digital copying machine 93 (S6).

Then, upon receiving the image data, the digital copying machine 93 carries out the sharpness process based on the request (S7). When the image processing function has been processed, and all the processed image data are ready to be transmitted, the digital copying machine 93 returns the image data to the digital copying machine 92 (transmitting end of the image data) (S8).

In the present embodiment, the digital copying machine 93 returns the processed image data to the digital copying machine 92 in the following manner. Namely, the digital copying machine 93 does not return the processed image data immediately after the completion of the image process. When the digital copying machine 92 becomes ready to output a predetermined image data, the digital copying machine 92 requests the digital copying machine 93 to return the image data. Upon receiving the request, the digital copying machine 93 returns the image data to the digital copying machine 92.

Namely, in the first embodiment, there is an available capacity in the memory 73 of the digital copying machine 91 (first image forming apparatus). Then, the processed image data which is returned from the digital copying machines 92 and 93 (second image forking device) are stored in the memory 73 of the digital copying machine 91.

However, the memory of the digital copying machine sent a request for the image processing function may not have sufficient capacity for sorting the processed image data returned from respective copying machines. As an example of memory shortage, the following cases are possible. When the digital copying machine 93 is to return the image data processed to the digital copying machine 92, the digital copying machine 92 is in the process of other image processing function, and there remains small available capacity in the memory 73.

The arrangement of the present embodiment offers the solution to the described problem. That is, the image data processed by the digital copying machine 93 are not returned to the digital copying machine 92 immediately after the completion of the image processing function. When the digital copying machine 92 becomes ready for outputting a predetermined image data, the digital copying machine 93 returns the image data to the digital copying machine 92. Here, the PCU 74 (return adjustment means) of the digital copying machine 93 determines if the digital copying machine 93 received a request to return the image data (S25). Then, upon receiving the request, the digital copying machine 93 returns the processed image to the digital copying machine 92 (S8).

Thereafter, the image corresponding to the image data is outputted by the laser printer section 32 of the digital copying machine 92. Namely, in the digital copying machine 92, the returned processed image data per page are temporarily stored in the memory 73. Then, the PCU 74 of the digital copying machine 92 outputs the image corresponding to the image data onto the sheet page by page (S10) after realigning the image data and the image data to which the sharpness process has been applied.

The described arrangement of the image forming system of the present embodiment permits the operator to select the image processing function to be performed by the designated machine or other digital copying machine 93. Furthermore, the document image may be processed using both the designated machine and other machine(s) by distributing the document by pages.

As described, according to the image forming system of the present embodiment, the digital copying machine 92 (designated copying machine) is provided with, for example, the, "sharpness" function. Then, for example, image data of plural pages are distributed to be processed.

Here, upon pressing the operation panel 90 by the operator, a command for requesting a predetermined "sharpness" function to be applied to the image data is inputted from the operation panel 90. Then, the PCU 74 of the digital copying machine 92 selects a plurality of digital copying machines (including designated copying machine) provided with the predetermined sharpness function based on the function data. Furthermore, based on inputs made through the operation panel 90 by the operator, the PCU 74 transfers the image data to the image data processing section 71 of the digital copying machine 92 and the image data processing section 71 of the digital copying machine 93 through the interfaces 92a and 93a and the communication line 99.

In the digital copying machine 93 which receives the request, the image data processing section 71 carries out a predetermined "sharpness" function with respect to the image data. The processed image data are returned to the digital copying machine 92 of the transmitting end through the interfaces 92a and 93a by the PCU 74 of the digital copying machine 93.

In the digital copying machine 92, the returned processed image data, and the image data by the image data processing section 71 of the designated machine are realigned. Then, the image data of a plurality of pages are outputted by the laser printer section 32 as a visible image.

As described, according to the image forming system, in the case where the designated digital copying machine 92 by the operator and the digital copying machine 93 (external machine) are provided with the "sharpness" image processing function requested by the operator, image data of a plurality of pages are distributed to the designated machine 92 and the digital copying machine 93 to be processed.

Therefore, as a plurality of image data are processed by utilizing a processing section of the designated copying machine, a time required for processing the plurality of the document image data can be still reduced efficiently.

According to the digital copying machine 93 of the image forming system of the present embodiment, upon completing the process of the requested image data, if a return request is given from the digital copying machine 92, the processed image data are returned to the digital copying machine 92 by the PCU 74 (return adjustment means).

For example, in the case where the memory 73 of the digital copying machine 92 of the receiving end has small capacity, the memory 73 may not store all the processed image data which have been returned to the digital copying machine 92 from the digital copying machine 93.

In such situation, for example, in the state where the laser printer section 32 of the digital copying machine 92 becomes ready to output a predetermined image data, and the laser printer section 32 can output the received data immediately, a return request is sent to the digital copying machine 93 by the digital copying machine 92. Then, the image data returned from the digital copying machine 93 are sequentially transmitted to the laser printer section 32, thereby outputting an image by the laser printer section 32.

Therefore, even if the memory 73 in which a plurality of processed image data provided in the digital copying machine 92 of the transmitting end does not have a sufficient capacity, a desired image can be obtained in the digital copying machine 92.

In the present embodiment, the PCU 74 of the digital copying machine 92 does not specify pages of the document to be processed by the second image forming apparatus. However, the PCU 74 is permitted to control such that the document image of the page to be outputted first is processed by the designated digital copying machine 92 and the document image of the rest of the pages is processed by the second image forming apparatus such as the digital copying machine 93, etc.

As a result, a predetermined image data are processed by the image data processing section 71 of the designated copying machine, and the image is outputted by the laser printer section 32 of the designated copying machine. Then, while the image is being outputted, the original image of the following pages are processed by the image data processing section 71 of the second image forming apparatus such as digital copying machine 93, etc. As a result, in the image forming system, a time required from reading till outputting the read image can be reduced.

Embodiment 3

Figure 16:
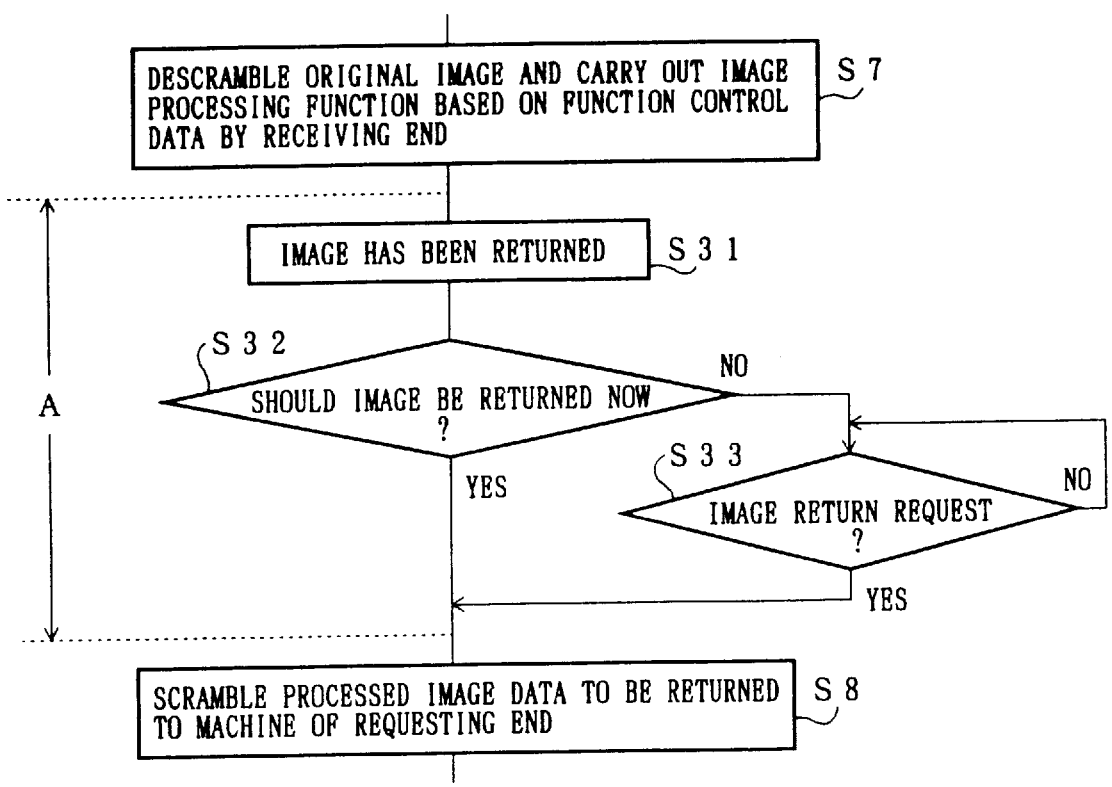
FIG. 16 is a flowchart showing an operation of an image forming system in accordance with still another embodiment of the present invention.

The following description will describe one embodiment of the present invention in reference to FIG. 16.

Here, members having the same function as those shown in the drawings which explain the aforementioned first and second embodiments will be designated by the same reference numerals, and thus the descriptions thereof shall be omitted here.

In the second embodiment, the digital copying machine 93 is in a stand-by position until an image return request is given from the digital copying machine 92. Upon receiving an image return request, the digital copying machine 93 returns the processed image data to the digital copying machine 92.

In the present embodiment, however, while the digital copying machine 93 is in its stand-by position waiting for the image return request, the digital copying machine 93 can inquire the digital copying machine 92 if the image data are to be returned.

Namely, in the image forming system of the present embodiment, the process in S25 of FIG. 15 (between S7 and S8) corresponds to the process shown in FIG. 16. To be more specific, upon completing the image process in the digital copying machine 93 (S7), the PCU 74 of the digital copying machine 93 confirms with the digital copying machine 92 which gives a request for an image process if the image data are to be returned. Then, the PCU 74 confirms the page being outputted from the digital copying machine 92 (S31). The PCU 74 of the digital copying machine 93 (discrimination means) checks if the laser printer section 32 of the digital copying machine 92 is ready to output the page of the image data to be returned to the digital copying machine 92. Namely, the PCU 74 of the digital copying machine 93 determines if it is a time for the digital copying machine 92 to return the processed page of the image data (S32). If, the result of determination is positive in S32, the PCU 74 returns the processed image data to the digital copying machine 92 immediately (S8).

However, if the result of determination is negative in S32, the PCU 74 of the digital copying machine 93, which serves as the return adjusting means, waits for an image return request from the digital copying machine 92 (S33). Then, upon receiving an image return request from the digital copying machine 92, the PCU 74 of the digital copying machine 93 returns the image data to the digital copying machine 92 (S8).

In the above example, the digital copying machine 92 requests only the digital copying machine 93 as the image forming apparatus in the image forming system for image processing. However, it may be also arranged such that the digital copying machine 92 requests not only the digital copying machine 93 but also other digital copying machine (s) in the image forming system for image processing.

In the case, where the "sharpness" function is performed with respect to the image data of certain pages by other digital copying machine prior to the digital copying machine 93, the PCU 74 of the digital copying machine 93 first confirms if the image data processed by the other image forming apparatus have been returned to the digital copying machine 92. Then, the PCU 74 is permitted to return the processed image data, i.e., the sharpened image data by the digital copying machine 93 can be returned to the digital copying machine 92.

As described, the image forming system of the present embodiment is arranged such that when the image data is being processed by the digital copying machine 92 and other second image forming apparatus prior to the digital copying machine 93, the PCU 74 of the digital copying machine 93 first confirms if the image processing by the digital copying machine 92 and the other second image forming apparatus have been completed without returning the processed image data immediately after completing the requested image processing. When the PCU 74 confirms that image data of previous pages have been processed, the PCU 74 returned the processed image data to the digital copying machine 92.

On the other hand, if the PCU 74 determines that the processing of the image data of the previous pages has not been completed, the PCU 74 sets the digital copying machine 93 in the stand-by position without returning the processed image data to the digital copying machine 92. Then upon receiving a return request from the digital copying machine 92, the PCU 74 returns the processed image data.

For example, the following situation possibly occurs: The capacity of the memory 73 of the requested digital copying machine 92 is too small to store all the processed image data returned from each image forming apparatus in the memory 73.

Even in the described situation, the digital copying machine 92 sends return requests to the digital copying machine or other image forming apparatus(s) for returning a plurality of processed image data in the order of output if necessary, for example, when the laser printer section 32 is ready to output the processed image data.

As a result, the digital copying machine 92 eliminates the need of a complicated output control with respect to a plurality of returned processed image data. This permits the system to be set back to the normal state in the event of some trouble.

Therefore, even if the memory for storing a plurality of processed image data does not have a sufficient capacity, by utilizing the image forming system of the present invention, a predetermined image data are distributed to be processed. As a result, the digital copying machine 92 permits the processed plurality of image data to be outputted in the proper page order to the digital copying machine 92 with ease.

Embodiment 4

Figure 17:
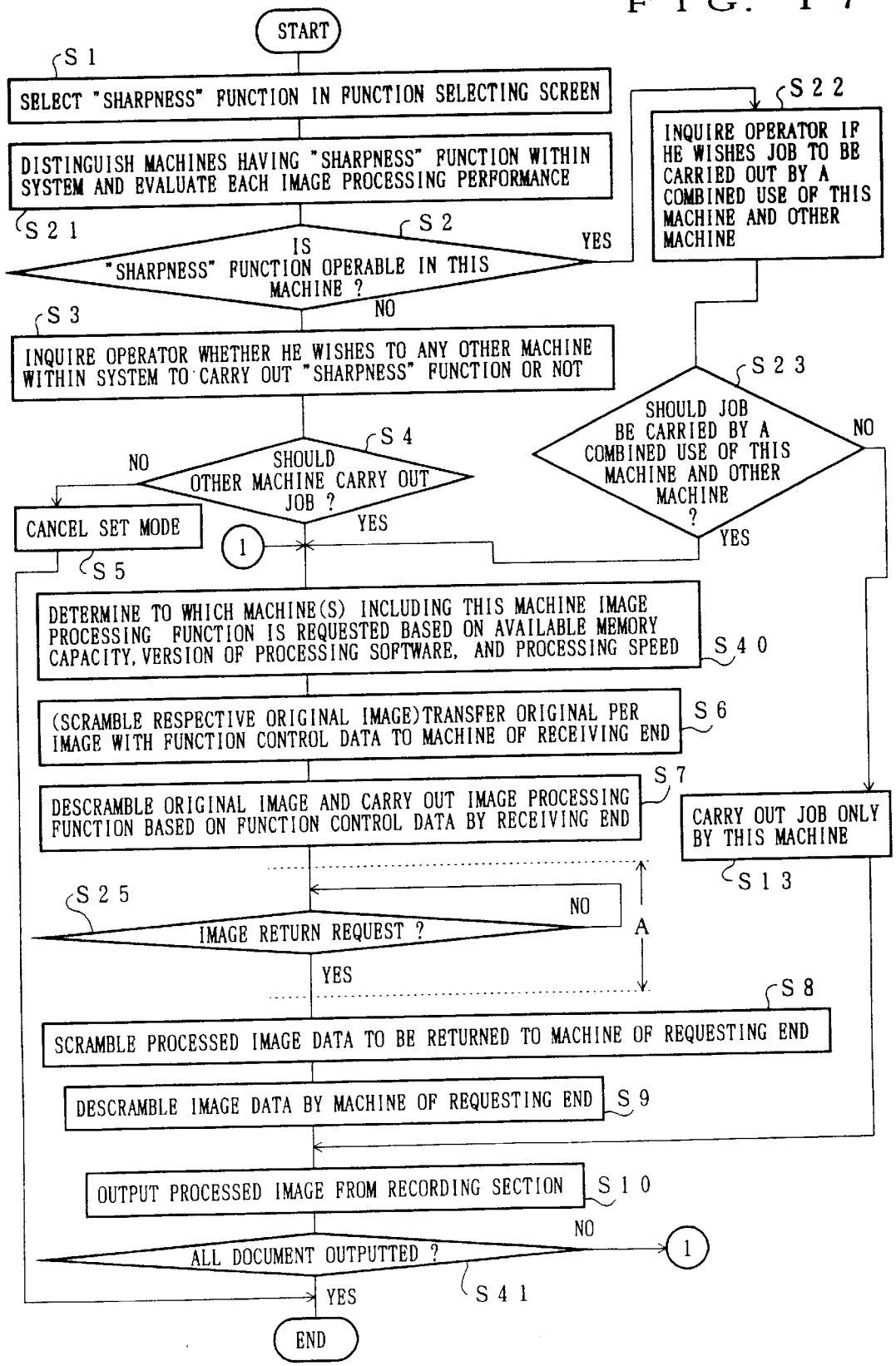
FIG. 17 is a flowchart showing an operation of an image forming system in accordance with still another embodiment of the present invention.

The following descriptions will describe still another embodiment of the present invention in reference to FIG. 17. Here, members having the same function as those shown in figures explaining the aforementioned embodiments 1 through 3 will be designated by the same reference numerals, and thus the descriptions thereof shall be omitted here.

In the image forming system of the present embodiment, as in the aforementioned embodiment 2, the image process is performed with the combined use of the digital copying machine 92 and the digital copying machine 93 in the same image forming system. In the present embodiment, as shown in FIG. 17, S40 corresponds to S24 shown in FIG. 15.

Namely, the PCU 74 of the digital copying machine 92 determines digital copying machine(s) to which the image processing is requested (including the designated digital copying machine 92) in consideration of various factors such as the available memory capacity, version of the image processing software and the processing speed of the image data processing section 71, etc. (S40). Namely, the digital copying machine(s) which enable the requested image process to be processed efficiently in a short period time is (are) selected.

After an optimal digital copying machine to which the image process is requested is determined, the PCU 74 of the digital copying machine 92 applies the function control data of each image to the image data to scramble it. Thereafter, the PCU 74 transfers the image data to the requesting end (S6). Then, upon returning the image data processed by the selected digital copying machine to the digital copying machine 92, the laser printer section 32 of the digital copying machine 92 outputs an image corresponding to the returned processed image data (S10).

This permits the digital copying machine to output the image in the its optimal order of output. Therefore, in the described system, the process with respect to a plurality of document image can be performed efficiently, and a copied document to which a predetermined image process has been applied can be outputted in a short period of time.

Namely, the digital copying machine 92 selects the following other digital copying machines: those in a stand-by position, those having a sufficient capacity of the memory 73, those provided with image processing functions of new version and those provided with high speed image processing function, etc.

Incidentally, the image processing functions have been steadily developed to meet the demand for an upper grade image processing function. Thus, the newest image processing functions can be added to the digital copying machine which newly enters into the market.

The memory which stores the image data has been developed for a larger memory and low cost. For this reason, every time the digital copying machine newly enters into the market, the memory is renewed to have a larger memory capacity.

Therefore, when the operator newly purchases the digital copying machine, and is interconnected in the image forming system, the priorities of functions among the digital copying machines within the system vary, and there exist a plurality of digital copying machines having a memory of the same capacity. Here, among the digital copying machines having the same image processing function, by requesting the image process to the copying machine having a memory of the largest capacity, the image data can be processed at high speed, and a quality image can be achieved.

Additionally, by requesting the digital copying machines which are in a stand-by position or has the high speed image processing function, or sufficiently memory capacity for processing image data, the image data can be processed in a short period of time. As a result, it is permitted to promptly copy with the operator's instructions and request.

In the present embodiment, when the processed image data is outputted in S10, the PCU 74 of the digital copying machine 92 determines if all the documents have been outputted (S41). Then, a predetermined process is completed.

In the image forming system of the present embodiment, upon completing the process of distributing the document image of a predetermined pages, the processed image data are outputted from the digital copying machine 92. Thereafter, the image data which have not yet been transferred are now transferred to each of the second image forming apparatuses, so that the requested image process can be distributed to be processed continuously.

In this case, each of the second image forming apparatuses which are requested for additional image processing has already returned the processed image data based on the previous request. Therefore, there is a still available memory capacity. Additionally, each of the second image forming apparatuses receives the residual document image data and the processed data, and performs the image processing function based on the processing data.

Namely, the digital copying machine 92 is provided with a memory sufficient for storing the image data only temporarily, not for storing all the processed image data. Additionally, in consideration of the case where the memory capacity is not sufficient, it is arranged such that the digital copying machine 92 receives further document image data and the function control data for a predetermined image processing function only after the currently processed image data have been returned.

Therefore, if the digital copying machine 93 has a memory 73 of a sufficient capacity, it is not necessarily that the digital copying machine 93 returns the processed image data to the digital copying machine 92. Namely, the digital copying machine 93 once stores the processed image data to the memory 73, and receives the following document data and the function control data and process the image data with a predetermined image processing function.

Additionally, the digital copying machine 92 of the requesting end selects the digital copying machines (second image forming apparatus) to which a predetermined image processing function is requested. Here, for example, a copying machine having an available memory capacity is selected based on the described selection conditions. The digital copying machine selects the described copying machine and gives a request for the image process to the digital copying machine. Therefore, the image data can be distributed without posing a heavy load to a specific second image forming apparatus. As a result, the entire image forming system can be operated efficiently.

As described, in the image forming system of the present embodiment, the PCU 74 of the digital copying machine 92 selects the second image forming apparatus which has a sufficient memory capacity for storing the processed image data. Then, a predetermined process is carried out by the selected second image forming apparatus such as the selected digital copying machine 93. Namely, a plurality of image data are distributed to be processed. Here, if the memory capacity of the digital copying machine 92 is small, the memory 73 of the digital copying machine is required to store the processed image data temporarily.

Here, if the memory capacity of the digital copying machine 93 for storing data is small, the processed image data cannot be stored, and the image of the remaining pages cannot be processed. However, in the arrangement of the present embodiment, among a plurality of the second image forming apparatuses, those having a sufficient memory for storing the processed image data are selected by the PCU 74 of the digital copying machine 92.

Therefore, the problem of requiring a longer time required for processing the image in the second image forming apparatus can be prevented. As a result, in the overall image forming system, a drop in operating efficiency can be prevented.

Additionally, in the image forming system of the present embodiment, the PCU 74 of the digital copying machine 92, for example, selects the second image forming apparatus having an upper grade sharpness process. Namely, the PCU 74, for example, selects the second image forming apparatus in which the processing soft of new version, or of the high speed process is selected, thereby distributing a plurality of image data to be processed to the selected image forming apparatuses.

Namely, to which of a plurality of second image forming apparatuses interconnected in the image forming system are (is) to be selected is determined in the priority order of version of the image processing software, or processing speed, etc. Therefore, the second image forming apparatus of a upper grade image processing function is given a higher priority.

As a result, the second image forming apparatus does not suffer from such problem that a longer time is required for processing the image. As a result, an improved operating efficiency can be achieved in the overall image forming system.

In the image forming system of the present embodiment, the PCU 74 of the digital copying machine 92 of the requesting end controls such that after each image forming apparatus has returned processed image data to the digital copying machine 92, a plurality of new image data are transferred to respective second image forming apparatuses so as to distribute the plurality of image data to be processed.

According to the arrangement of the present embodiment, in the case where the second image forming apparatus does not have a sufficient memory capacity, if the currently processed image data have not been returned to the digital copying machine 92, the digital copying machine 92 of the requesting end does not sent the following image data to such second image forming apparatus but sent to other second image forming apparatus. Therefore, even in the described situation, the image data can be distributed in an efficient manner, and an improved image processing function can be achieved in the image forming system as a whole.

The image forming apparatus of the present embodiment is further arranged such that after the requested image processing function has been applied to the received image data, the second image forming apparatus returns the processed image data to the first image forming apparatus. Then, the second image forming apparatus receives the following image data only after the currently processed image data have been returned to the first image forming apparatus.

In the conventional arrangement, in the case of requesting the second image forming apparatus having a small memory capacity for processing the following image data, the process may be delayed. Consequently, the overall time required for processing the image data in the image forming system becomes long. The arrangement of the present embodiment eliminates such problem and offers an image forming system of an improved efficiency.

Embodiment 5

Figure 18:
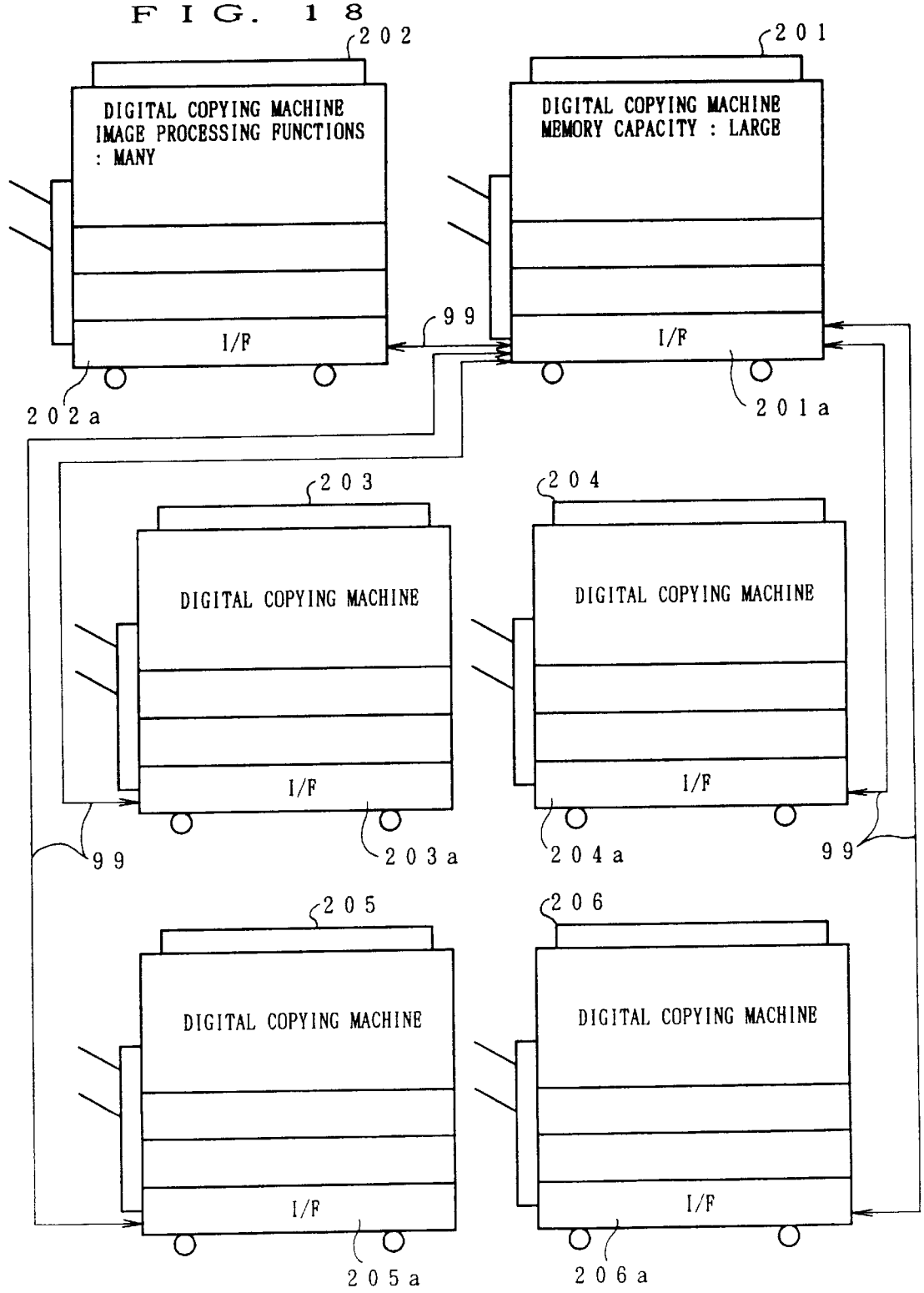
FIG. 18 is an explanatory view showing a schematic structure of an image forming system in accordance with still another embodiment of the present invention.
Figure 19:
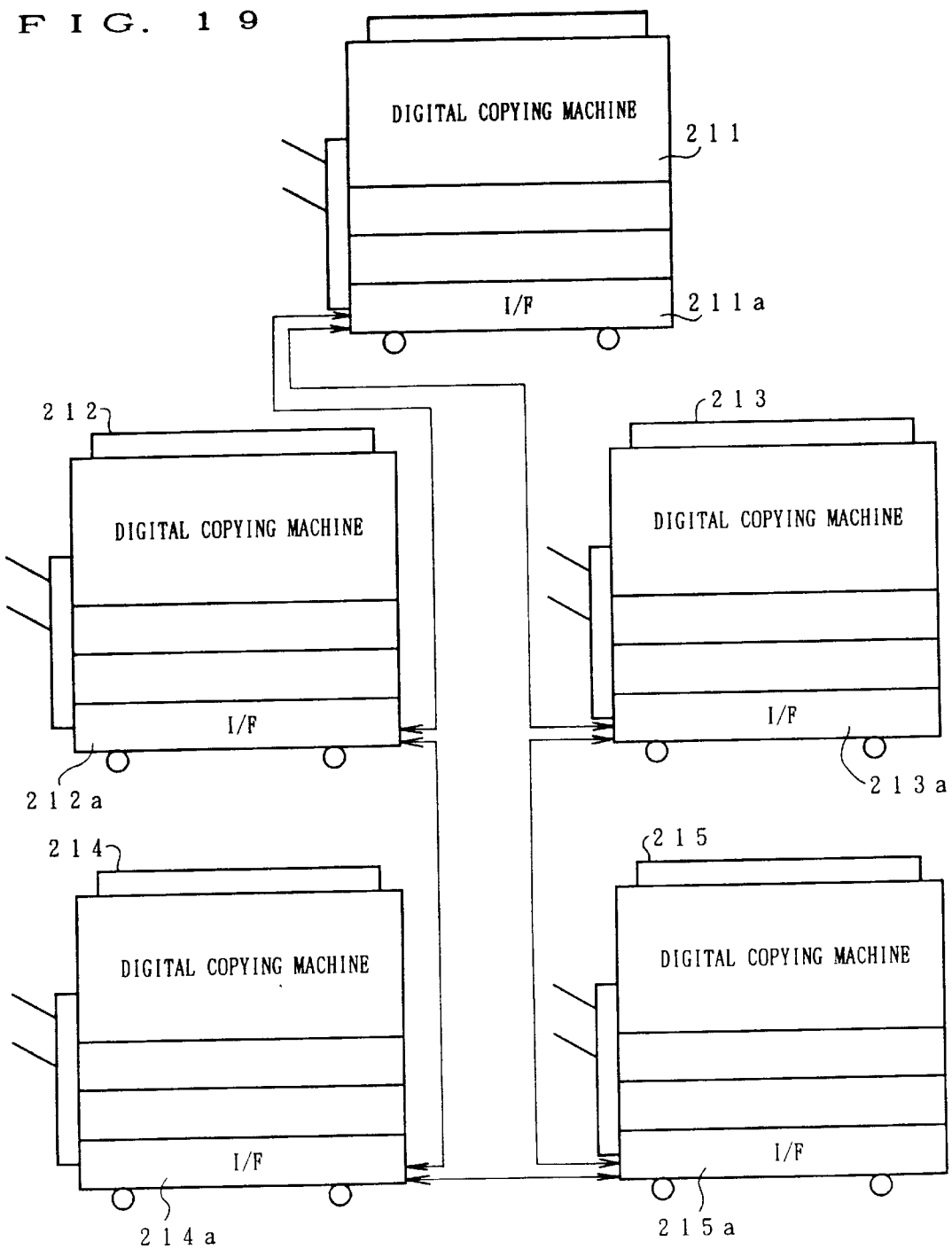
FIG. 19 is an explanatory view showing a schematic structure of an image forming system in accordance with still another embodiment of the present invention.

The following descriptions will describe still another embodiment of the present invention in reference to FIGS. 18 and 19. Here, members having the same function as those shown in the figures which explain the aforementioned embodiments 1–4 will be designated by the same reference numerals, and thus the descriptions thereof shall be omitted here.

As shown in FIG. 18, the image forming system includes, for example, six digital copying machines 201 through 206. These digital copying machines 201 through 206 have interfaces 201a–206a so as to enable them to communicate each other. The digital copying machine 201 having the memory of the largest capacity, and the digital copying machine 202 having the greatest number of image processing functions serve the main digital copying machines as the main image forming apparatuses of the image forming system.

The digital copying machine 201 serving as the second main image forming apparatus and the digital copying machine 202 serving as the first main image forming apparatus are connected so as to allow them to communicate each other through the interfaces 201a and 202a and the communication line 99. The digital copying machines 203 through 206 are respectively connected to the digital copying machine 201 via the interfaces 201a, and 203a–206a and the communication line 99 so as to allow them to communicate each other. The digital copying machines 202–206 are respectively permitted to communicate with other digital copying machines than the digital copying machine 201 via the digital copying machine 201.

In the image forming system of the present embodiment, the main digital copying machine is constituted by the digital copying machine 201 and the digital copying machine 202. Then, the main digital copying machine performs respective operations in the first embodiment. The function of the digital copying machine 202 is the same as the digital copying machine 93, for example, shown in FIG. 11. The digital copying machine 201 has fewer number of functions than the digital copying machine 93 but has a large memory capacity. The digital copying machines 203 and 204 respectively have the same function as the digital copying machine 92. The digital copying machines 205 and 206 respectively have the same as the function as the digital copying machine 91.

The digital copying machine 201 which constitutes the main digital copying machine mainly control the image data which is required to have the memory 73 of a large capacity. The digital copying machine 202 controls the image processing function to be applied to the image data. Namely, the digital copying machines 201 and 202 have different roles.

For example, in the case where a request for processing an image is given by the digital copying machine 203, the image data transmitted from the digital copying machine 203 is stored in the memory 73 of the digital copying machine 201. The image data are transferred to the digital copying machine 202 and is processed by the digital copying machine 202.

The processed image data are stored in the memory 73 of the digital copying machine 201. Thereafter, the image data are returned to the digital copying machine 203 from the digital copying machine 201. Additionally, the described control is performed by the PCU 74 of the digital copying machine 201.

As described, in the embodiment of the present embodiment, the requested process is distributed to a plurality of digital copying machines. Then, the main digital copying machine which is required to have a high function is constituted by the plurality of digital copying machines. As a result, compared with the case where the main digital copying machine is constituted by the single digital copying machine, a reduction in cost and an improved efficiency of the image forming system can be achieved.

The image forming system of the present embodiment has the following arrangement.

The image forming system includes, for example, five digital copying machines 211 through 215 as shown in FIG. 19. Further, these digital copying machines 211 through 215 have interfaces 211a through 215a which enable them to communicate each other. These digital copying machines 211–215 are connected to respective interfaces 211a–215a and the communication line 99 so as to constitute the network of a loop shape. The digital copying machines 211–215, for example, correspond to the digital copying machine 30.

The image forming system of the present embodiment is arranged such that in the case where the digital copying machines 211 through 215 do not have the requested image processing functions, they request other digital copying machine to perform the requested image processing function. To enable this, the digital copying machines 211 through 215 respectively have information with regard to the image processing function and the memory capacity of each of other digital copying machines. When requesting other digital copying machine, each digital copying machine automatically selects a digital copying machine of the requesting end. Alternatively, it may be arranged such that digital copying machines provided with the requested function are automatically displayed in each liquid crystal display apparatus 1 of the digital copying machine so that the operator can select one as desired.

The image forming system of the present embodiment is capable of performing the same operation as the image forming system of the embodiment 1. In this case, the digital copying machine requested by the digital copying machine of the requesting end for the image processing is not the described main digital copying machine but other digital copying machine provided with the image processing function.

The arrangement of the image forming system in which the main digital copying machine is not specified is effective for the case where respective digital copying machines 211–214 have different image processing functions.

Embodiment 6

The following descriptions will describe still another embodiment of the present invention in reference to FIGS. 20 through 30. Here, members having the same function as those shown in figures which explain the aforementioned embodiments 1–5 will be designated by the same reference numerals, and thus the descriptions thereof shall be omitted here.

In the image forming system of the present embodiment, a plurality of digital copying machines which serve as the image forming apparatuses and a plurality of image processing apparatuses which serve as image processing apparatuses are interconnected through a transmission equipment which serves as the communication means of the digital image data.

Figure 20:
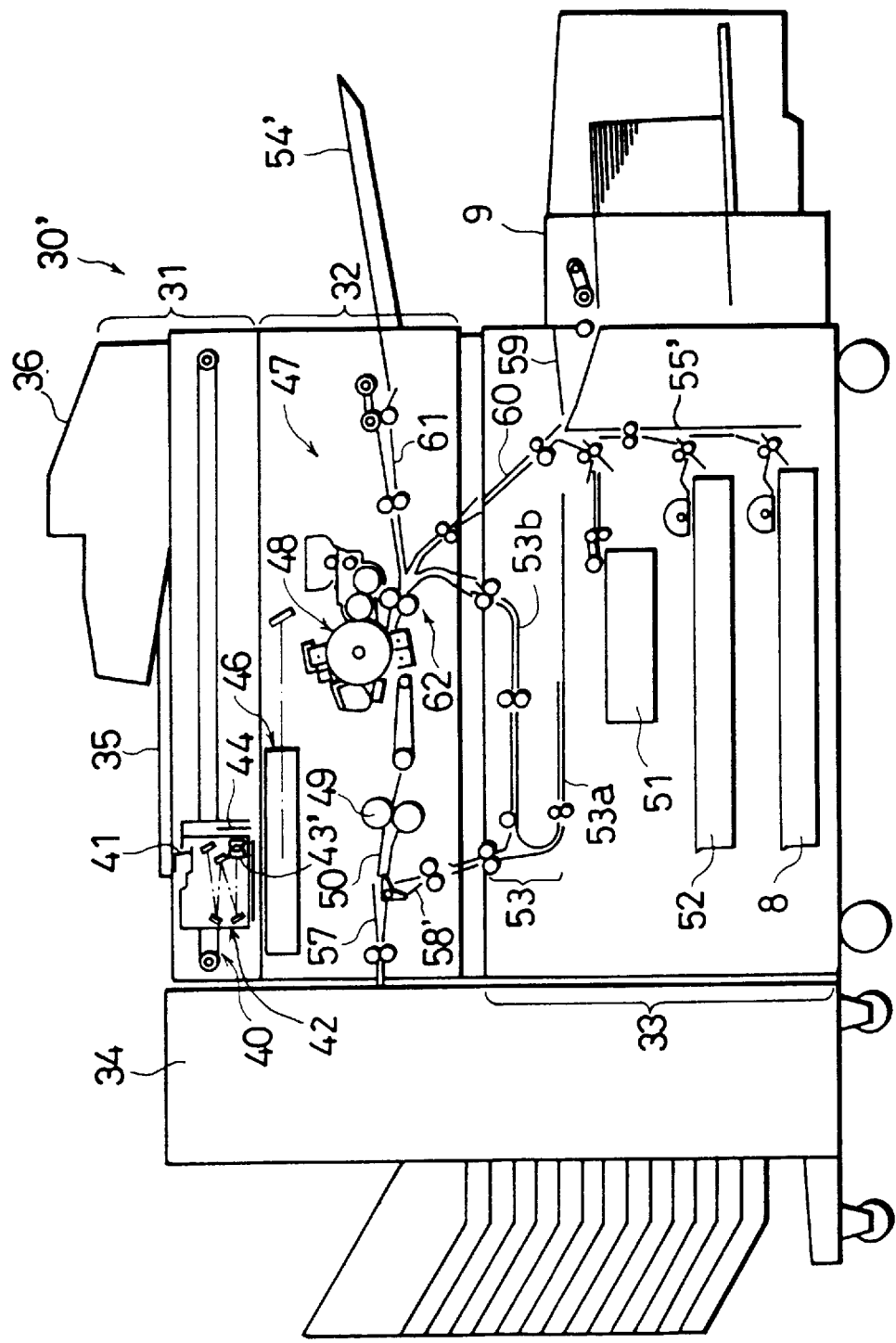
FIG. 20 is a longitudinal sectional view showing a schematic structure of a digital copying machine provided in an image forming system in accordance with still another embodiment of the present invention.

FIG. 20 is a cross-sectional view showing an entire structure of the digital copying machine 30' as one example of the digital copying machine. In the figure, the digital copying machine 30' includes a scanner unit 31, a laser printer section 32 (image output section), a multi-level feed unit 33 and a postprocessing unit 34 having a sorter.

The scanner unit 31 includes a document platen 35 (transparent glass), an RADF 36, and a scanner unit 40. The document image read by the scanner section 31 is sent to the image processing section (to be described later) as image data to be processed with a predetermined image processing function.

The scanner unit 40 includes a lamp reflector assembly 41, a plurality of reflective mirrors 42, lens 43', and a CCD 44. The reflective mirror 42 directs a reflected optical image from the document to the CCD 44. The lens 43' forms an image on the CCD 44 by converging the reflected light thereon.

The laser printer section 32 includes a manual document tray 54', a laser writing unit 46 and an electrophotographic processing section 47.

The electrophotographic processing section 47 is arranged in a known manner, that is, the same includes the photosensitive drum 48, and around which a charger, a developer, a transferring device, a separator, a cleaner, a charge remover, a fuser 49, etc. are provided. A transportation path 50 is formed in the downstream side of the fuser 49 with respect to a direction in which a sheet is transported to have an image formed thereon. The transportation path 50 branches into two paths: a transportation path 57 and a transportation path 58' that communicate with the postprocessing device 34 and the multi-level feed unit 33, respectively.

The multi-level feed unit 33 includes the first cassette 51, the second cassette 52, the third cassette 8 and the fourth cassette 9. The operator is permitted to add the fourth cassette 9 as the occasion demands. In respective cassettes of the multi-level feed unit 33, a set of sheets is stored. When the operator selects the cassette which stores the sheet of the desired size, the sheets stored in the cassette are fed from the top, and are transported to the laser printer section 32 in order.

The multi-level feed unit 33 includes a both-sided copy unit 53 and a common transport path 55'. The both-sided copy unit 53 includes a reverse transport path 53a and a both-sided/synthesis transport path 53b. The reverse transport path 53a is provided for turning a sheet over. The bothsided/synthesis transport path 53b is provided for transporting sheets from the transport path 58' to the electrophotographic processing section 47. The entrance of the both-sided/synthesis transport path 53b communicates with the entrance and discharge openings of the reverse transport path 53a.

The common transport path 55' is provided for transporting the sheets fed from the first cassette 51, the second cassette 52 and the third cassette 8 to the electrophotographic processing section 47. The common transport path 55' joins the transport path 59 from the fourth cassette 9 in a way to the electrophotographic processing section 47 and further communicate the transportation path 60. Then, the transport path 60 joints a confluence 62 of the transport path 61 which communicates the both-sided/composite transport path 53b and the manual document tray 54', and reaches the image forming position between the photoreceptor drum 48 and the transfer unit of the electrophotographic processing section 47. The confluence 62 of three transport paths is set to a position close to the electrophotographic processing section 47.

In the laser printer section 32, the image data read from the memory of the image processing section is projected as a laser beam from the laser writing unit 46. Then, an electrostatic latent image is formed on the surface of the photoreceptor drum 48 of the electrophotographic processing section 47. As a result, an electrophotographic latent image is visualized to be a toner image. After the toner image is transported from the multi-level feed unit 33 onto the transported sheet, the toner image is made permanently affixed onto the sheet by the fuser 49.

The sheet having forming thereon an image is fed to the postprocessing device 34 through the transport paths 50 and 57 from the fuser 49. Additionally, the sheet is re-transported to the electrophotographic processing section 47 through the transport paths 50 and 58' and the both-sided copy unit 53.

The arrangement of the image processing section of the digital copying machine 30' and the arrangement of the control system by the PCU 74 of the image processing unit are the same as those shown in the embodiment 1.

Figure 21:
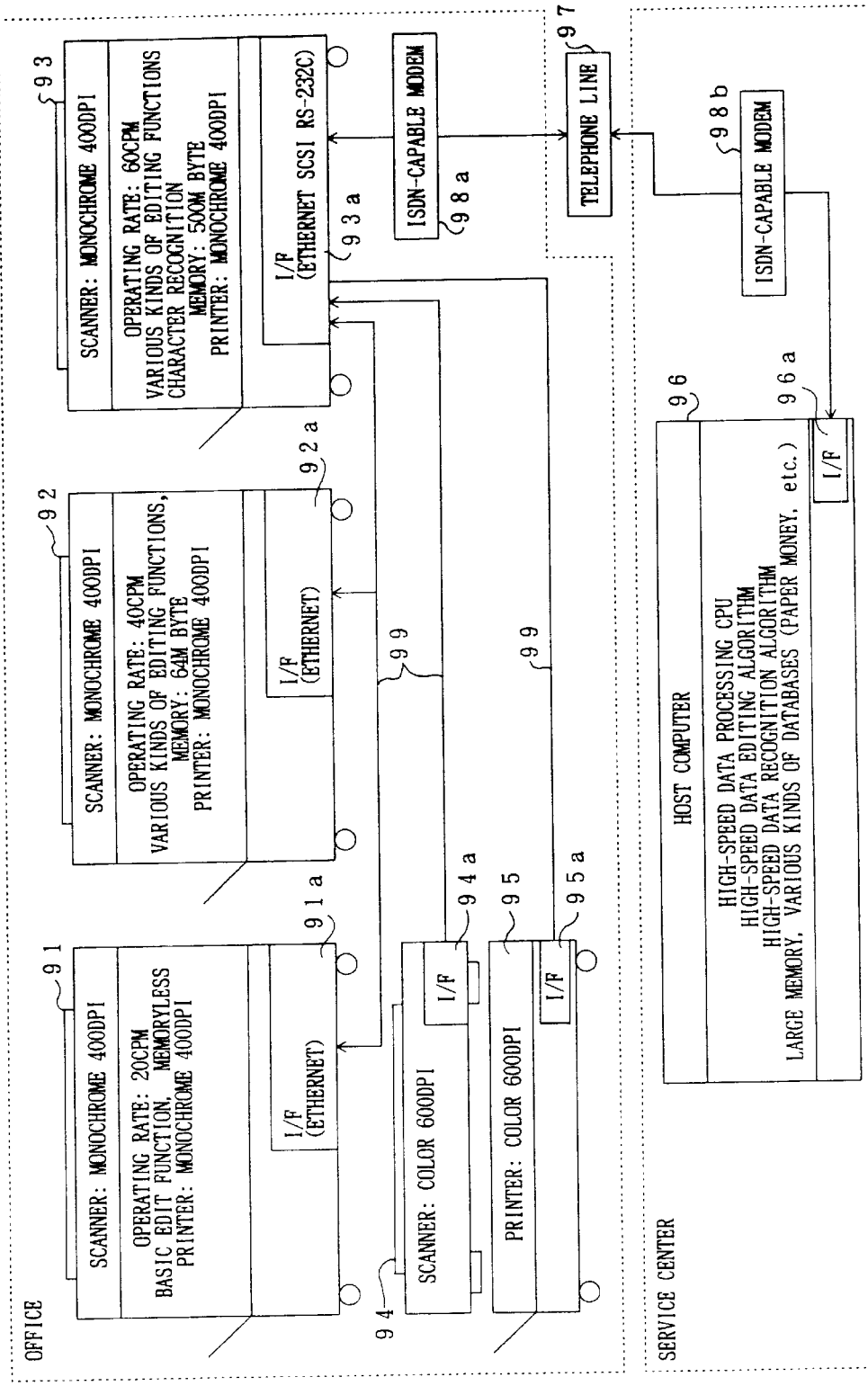
FIG. 21 is an explanatory view showing a schematic structure of the above image forming system.

The image data communication unit 81 in the present embodiment normally indicates the interface 93a in the digital copying machine 93, for example, as shown in FIG. 21. However, in the case of communicating through the communication line 99 such as a telephone line, etc., the image data communication unit 81 indicates the interface 93a having the modem 98a.

As shown in FIG. 21, an image forming system of the present embodiment includes three digital copying machines 91–93 as an image forming apparatus installed in an office, a scanner 94, and a printer 95 serving as an image forming apparatus, and a large-scale host computer 96 serving as an image processing apparatus installed in an external service center. The service center provides various kinds of data service including high-grade image processing. The host computer 96 has a function of the processing section.

The host computer 96 includes a high-speed CPU, a high-speed editing algorithm, a high-speed data recognizing algorithm, a memory with a capacity far larger than the memory 73, various kinds of databases for recognizing paper money, and an interface 96a.

The digital copying machine 93 and host computer 96 are connected to each other through their respective interfaces 93a and 96a and a telephone line 97. Note that the telephone line 97 may be replaced with any other adequate communication line, such as optical fibers. The ISDN (Integrated Services Digital Network)-capable modems (modulator) 98a and 98b are provided to the digital copying machine 93 and the host computer 96, respectively. The modems 98a and 98b convert a digitalized electronic signal into a signal which can be transmitted through the communication line 99. The modems 98a and 98b adopt the PM (Phase Modulation) method, AM (Amplitude Modulation) method, FM (Frequency Modulation) method, etc. Herein, the interfaces 91a–96a, a telephone line 97, two modems 98a and 98b and the communication line 99 form the transmitting apparatus.

The digital copying machines 91–93 and host computer 96 can transmit various kinds of data, such as control command codes and bit data represented by image contrast data, through the communication line 99. The digital copying machines 91–93 respectively have a fax function which permits commutation of the data by the communication line 99 and a printer mode for printing out the document data from a personal computer, word processor, etc.

For convenience in explanations, a single office is connected to the service center in FIG. 21; however, many number of operators' offices throughout the nation are connected to the service center in practice.

The functions of the digital copying machine depends on its price, memory capacity, and the like, and every office has different purpose and demand. Thus, the digital copying machines are not limited to the above example digital copying machines 91–93, and a great line-up of models are available.

Also, the host computer 96 is provided with a high-grade image processing functions including image edit functions and high-speed image processing. Therefore, the host computer 96 includes at least the functions provided to ordinary digital copying machine. However, the host computer 96 may omit basic functions provided to an inexpensive model. In short, the host computer 96 includes optimal functions in consideration of the functions which the service center provides.

The image forming system of the present invention permits a copying operation to be performed using a memory of a large capacity installed in the host computer 96. It is also permitted to perform a copying operation using an external memory such as a memory installed in other copying machines than the one being used.

Incidentally, the image processing functions have been steadily developed to meet the demand of constructing infrastructure or improvement in work efficiency in the information society. Thus, the newest image processing functions can be added to the digital copying machine which newly enters into the market, or the old image processing functions which have become less valuable are replaced with the new image processing functions.

Here, example image edit functions provided to the digital copying machines 91–93 and host computer 96 are set forth in Table 3 below.

TABLE 3

| IMAGE EDIT FUNCTION | MACHINE 91 | MACHINE 92 | MACHINE 93 | HOST COMPUTER 96 |
|---|---|---|---|---|
| INDEPENDENT MAGNIFICATION | ○ | ○ | ○ | ○ |
| SHARPNESS |  | ○ | ○ | ○ |
| BINDING MARGIN | ○ | ○ | ○ | ○ |
| FRAME ELIMINATION | ○ | ○ | ○ | ○ |
| CENTERING |  | ○ | ○ | ○ |
| 1-SET-2-COPY |  | ○ | ○ | ○ |
| ADDRESSED COPY |  |  | ○ | ○ |
| MULTI-SHOT |  | ○ | ○ | ○ |
| TRIMMING-MASKING |  | ○ | ○ | ○ |
| MOVING FUNCTION |  | ○ | ○ | ○ |
| SYNTHESIS FUNCTION |  |  | ○ | ○ |
| MONOCHROME INVERSION/ NETTING | ○ | ○ | ○ | ○ |
| SHADOW-OUTLINE |  |  | ○ | ○ |
| ITALIC-MIRROR IMAGE |  |  | ○ | ○ |
| REPEAT COPY | ○ | ○ | ○ | ○ |
| 2-IN-1-COPY |  |  | ○ | ○ |
| DATE-CENTER MARK |  |  | ○ | ○ |
| ENLARGED & DIVIDED OUTPUT |  |  |  | ○ |
| TRANSLATION |  |  |  | ○ |
| HIGH GRADE QUALITY |  |  |  | ○ |

As shown in Table 3, the digital copying machines 93, 92 and 91 respective have the image editing functions in grades of this order, and the host computer 96 has the image processing function of the highest grade. However, the described image forming system is effective especially under the following circumstances: The operator wishes to use the image editing function which the digital copying machines 91–93 in the office do not have, the memory 73 of the digital copying machines 91–93 does not have a sufficient capacity, and a desired image processing function cannot be used.

To be more specific, first, the image data are transferred from the office to the service center as shown in FIG. 21. Then, the transmitted image data are processed by the host computer 96 at the service center, and subsequently, the processed image data are returned to the office. As a result, even in the case where a desired process cannot be performed by a digital copying machines 91–93, the desired process can be performed by the host computer 96, and the processed image data can be outputted onto a sheet at the office.

The basic operation of the image forming system will be explained. As shown in FIG. 21, the digital copying machines 91–93 in the office and the host computer 96 are permitted to communicate each other by transmitting and receiving data through respective interfaces 91a–96a, a communication line 99 and modems 98a and 98b. Therefore, for example, a digital signal, transmitted from the digital copying machines 91 through 93, is modulated in the modem 98a on the digital copying machine 93 side, and transmitted to the host computer 96 side through the communication line 99. Then, the resulting signal is demodulated by the modem 98b on the host computer 96 side, and inputted to the host computer 96. The contents of the digital signal are control-use command codes and bit data such as density data of images.

Therefore, the host computer 96 analyzes the contents of the control-use command codes, and carries out image processing in accordance with image-editing functions that have been specified on the image data. The image data that have been processed by the host computer 96 is returned to the digital copying machine 93 through the reverse sequence to that upon transmission, and outputted onto a sheet of paper as image data, for example, by the digital copying machine 93.

Figure 22:
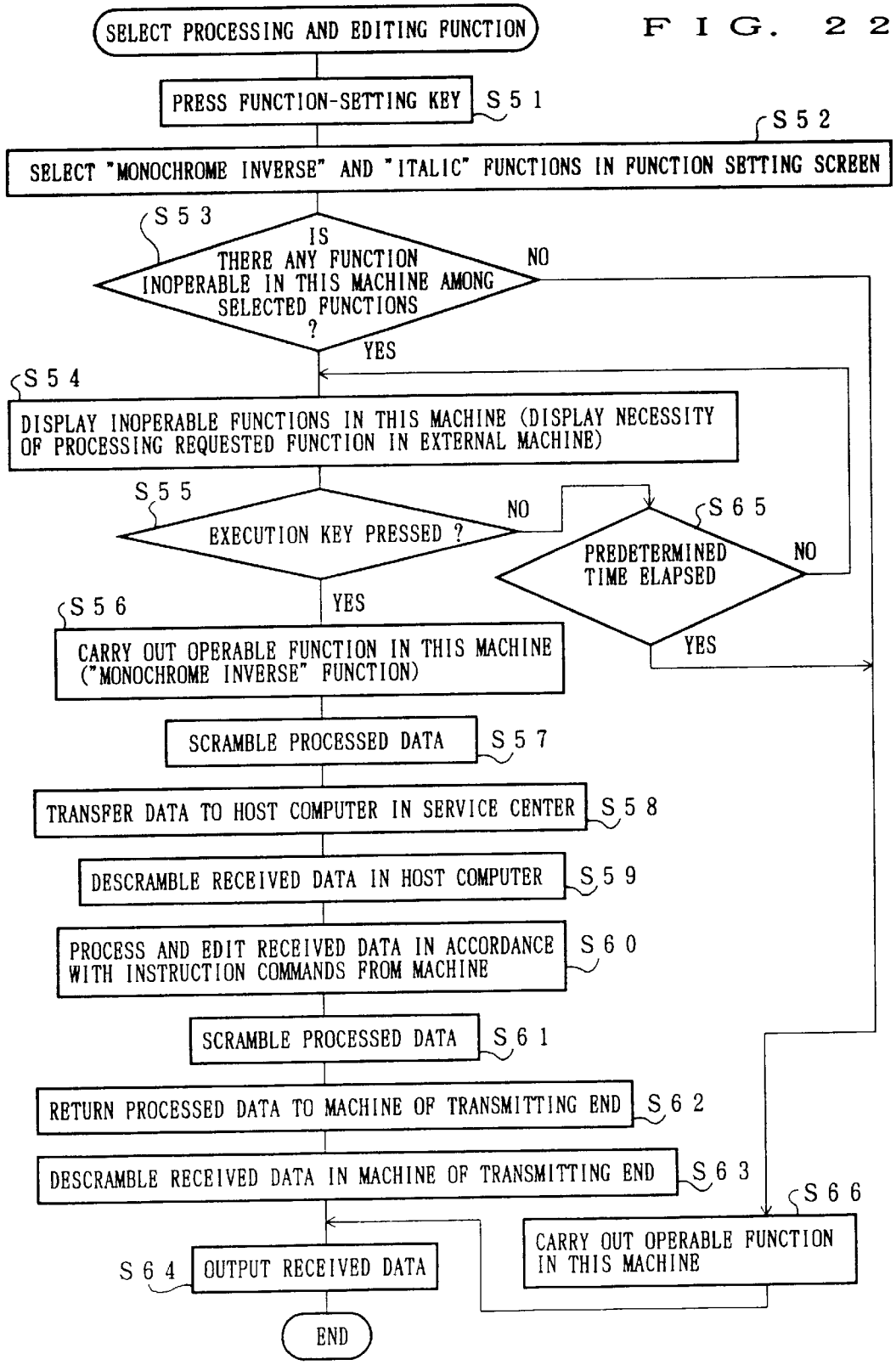
FIG. 22 is a flowchart showing an operation of the image forming system.

In the image forming system, an operation of performing an image process utilizing the image process service at the service center will be explained in detail by the flowchart of FIG. 22. Here, explanations will be given through the case of selecting the "italics" function and the "monochrome reverse". Furthermore, it is assumed that the host computer 96 performs "italics" function, and the digital copying machine 91 performs "monochrome reverse" function. Here, in each function setting screen of the liquid crystal display apparatus 1, the functions of the host computer 96 are also displayed.

In the basic screen of the liquid crystal display apparatus 1 shown in FIG. 6(*a*), when the function setting key 101a is pressed (S51), the screen of the liquid crystal display apparatus 1 is switched to the first function setting screen. Next, upon pressing the next page key 102h, the current display screen is switched to the second function setting screen shown in FIG. 6(*c*). Next, in this state, upon pressing the italic key 102b and the reverse key 102c, the display area is reversed. Namely, it is assumed in the reverse display indicates the state where the italic key 102b and the reverse key 102c are pressed.

Next, the PCU 74 of the digital copying machine 91 determines if the set function can be processed by the digital copying machine 91 (S53). In this case, the digital copying machine 91 has a monochrome reverse function but does not have an "italic" function. Therefore, the result of determination in S53 is positive. Here, on the display screen of the liquid crystal display apparatus 1, as shown in FIG. 12(b), the messages "THIS MACHINE HAS NO ITALIC FUNCTION" and "IT IS REQUIRED TO ASK THE HOST COMPUTER 96 FOR THE ITALIC FUNCTION" are displayed (S54).

When the execution key 112a is pressed on the display screen (S55), the screen of the liquid crystal display apparatus 1 is switched to the italic setting screen shown in FIG. 12(c). Next, by operating the tilt angle input key 116a on the display screen, the tilt angle can be inputted. Upon pressing a setting end key 116b, the digital copying machine 91 executes a monochrome reverse function (S56).

In this case, the image data subject to the process is the data of the document image read by the scanner section 31 of the digital copying machine 91. Additionally, the digital copying machine 91 does not include a page memory but includes a line memory only. Therefore, the image data are read line by line to be sequentially processed. Additionally, the line memory is, for example, stored in the internal section of the PCU 74, and is used in executing the operation by the PCU 74.

Next, the PCU 74 of the digital copying machine 91 scrambles the image data to which the "monochrome reverse" function is applied (S57). Then, the PCU 74 sequentially transmits the processed image data to the host computer 96 of the service center (S58). In this case, the command code, i.e., the command code for instructing the "italic" function, as well as the image data to be processed with the "italic" function are inputted to the host computer 96 through the interface 91a, the communication line 99 connecting the digital copying machine 91 and the digital copying machine 93, the interface 93a, the modem 98a, the telephone line 97, the modem 98b and the interface 96a.

On the other hand, the host computer 96 descrambles the image data transmitted from the digital copying machine 91 (S59). Then, the host computer 96 confirms the contents of process that are requested through a command code, and processes the image data with the "italic" function, to which the monochrome reverse function has been applied in accordance with the contents of the request (S60).

Upon completing the image processing with respect to the image data, the processed image data is scrambled (S61). Thereafter, the host computer 96 returns the scrambled image data to the digital copying machine 91 of the transmitting end in a direction reverse to the previous transmission (S62).

The digital copying machine 91 descrambles the transmitted data (S63), and outputs the image data onto a sheet of paper as an image (S64). This operation is carried out as explained with respect to the aforementioned digital copying machine 30.

On the other hand, in S55, if a predetermined time has elapsed before the execution key 112a is pressed (S65), the digital copying machine 91 performs only the "monochrome inverse" function which can be executed (S66), and the sequence returns to S64. Here, the predetermined time is measured by a timer provided in the PCU 74.

Assumed the selected function is the function provided in the designated copying machine (such as "monochrome reverse" function) in S53, and the selected function is executed in the designated machine (S66) Then, the sequence is switched to S64.

As described, according to the image forming system of the present embodiment, in the case where the image editing function which is not provided in the digital copying machines 91–93 in the office is requested, the image data are transmitted to the host computer 96 of the service center, and the image is edited by the host computer 96.

As a result, the digital computers 91 through 93 installed in the offices are allowed to use updated, a large variety of image-editing functions, that is, image-processing functions, installed in the host computer 96, by merely spending inexpensive communication fees. Thus, it is not necessarily that the digital copying machines 91–93 have high image editing function. Additionally, even if the respective functions of the digital copying machines 91–93 are relatively lowered, the need of purchasing new copying machines can be eliminated.

In the described example, the service center performs a paid-process. Therefore, in S55, upon pressing the execution key 112a by the operator, a request for the process is sent to the service center. Namely, with a permission of the operator of the digital copying machine 91, the service center performs a process.

Figure 23:
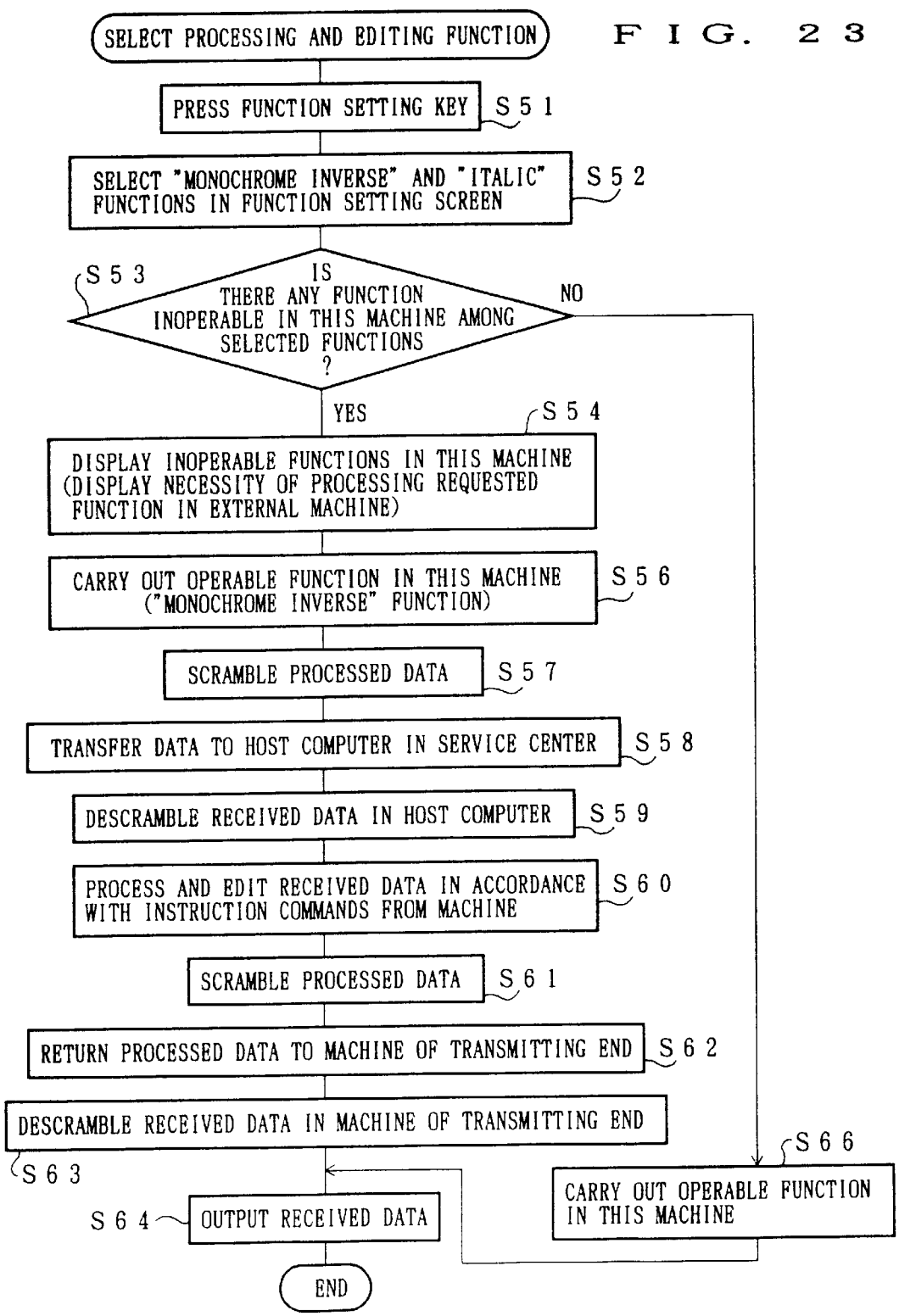
FIG. 23 is a flowchart showing another operation of the above image forming system.

However, if the process which cannot be performed by the digital copying machine 91 is selected in S53, as shown in FIG. 23, the process in S55 is skipped to directly perform the process in S56. Namely, it may be arranged such that a request for the process is sent to the service center without pressing the execution key 112a in S55.

Figure 24:
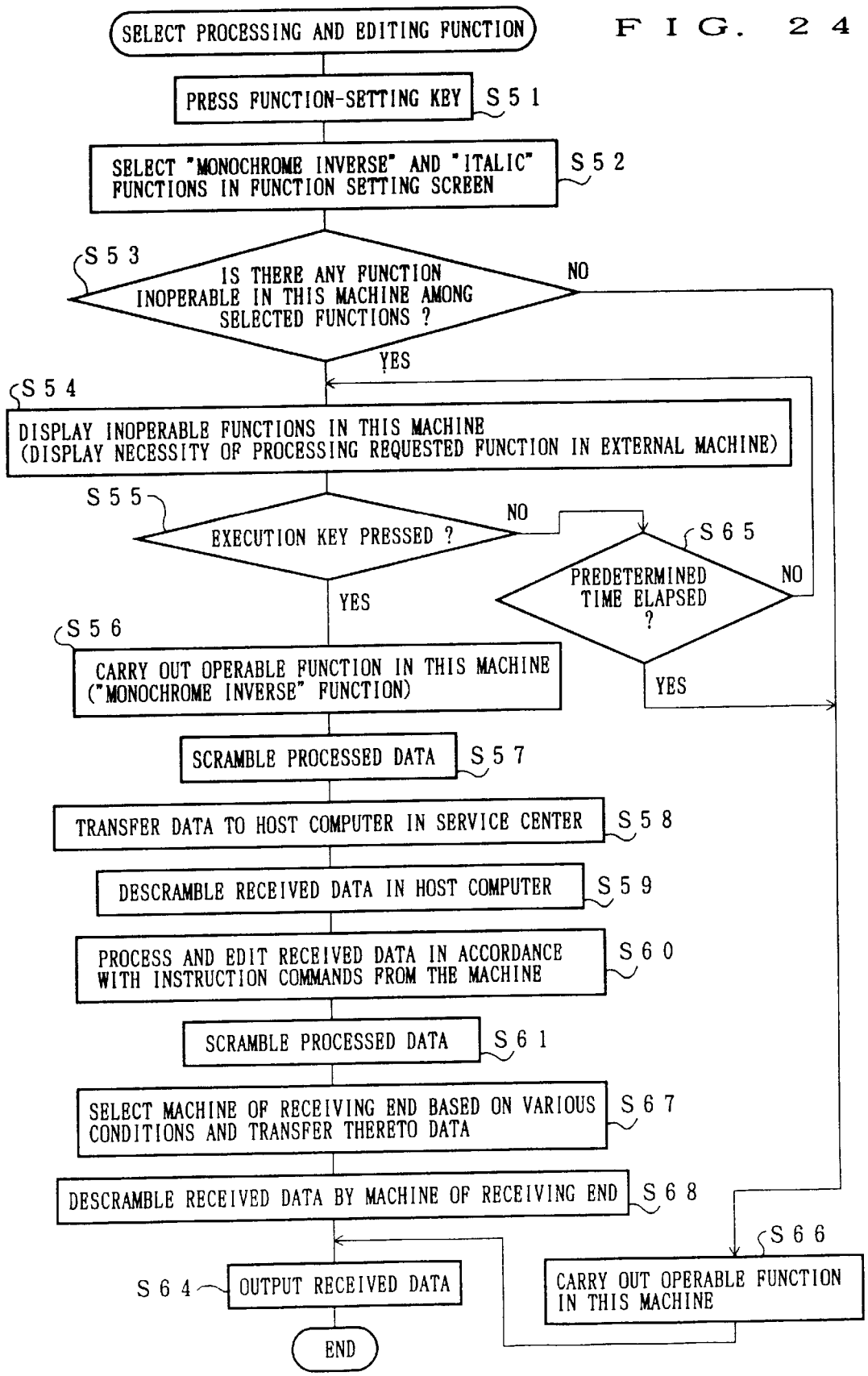
FIG. 24 is a flowchart showing still another operation of the above image forming system.
Figure 25:
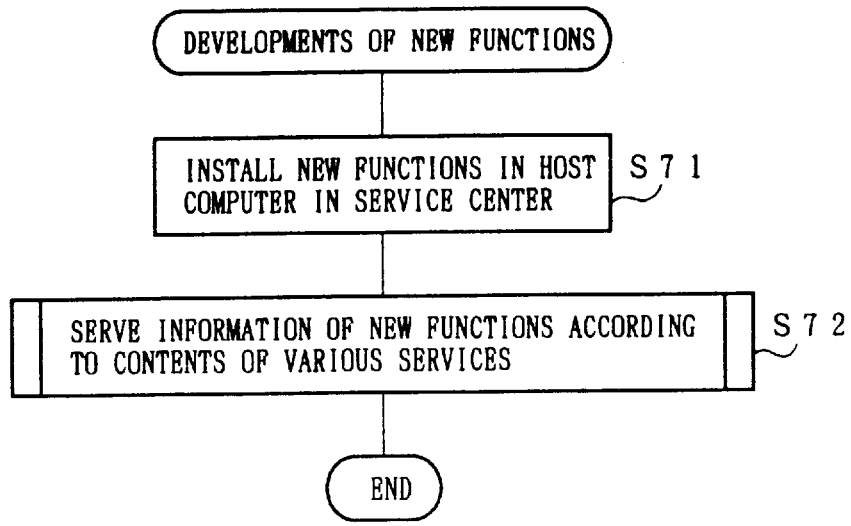
FIG. 25(a) is a flowchart showing a process of installing a new function to a host computer shown in FIG. 21.
FIG. 25(b) is a flowchart showing an operation in detail when S72 of FIG. 25(a) is carried out.
Figure 25:
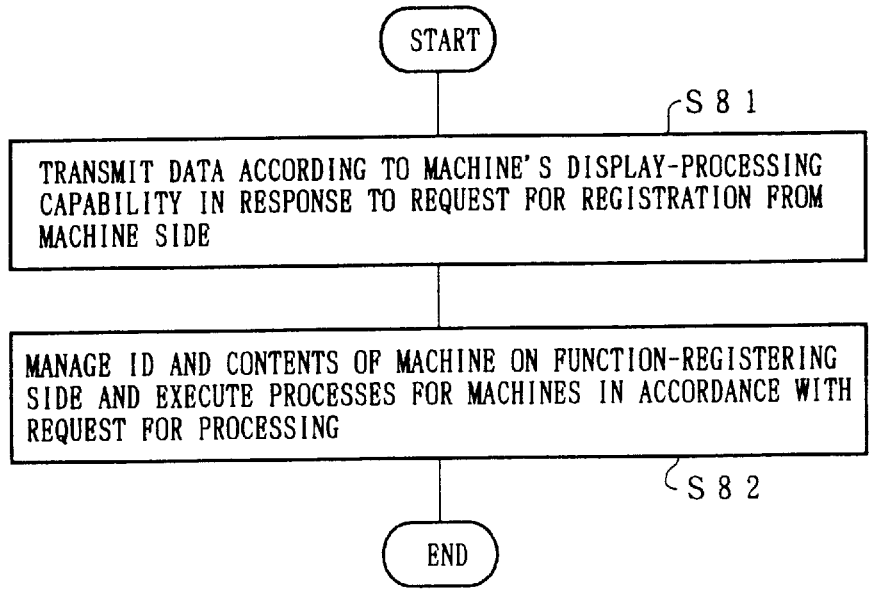

In the described example, in S62, processed image data by the host computer 96 are returned to the digital copying machine 91 of the transmitting end. Then, an image is outputted by the digital copying machine 91. However, it may be also arranged such that the image data processed by the host computer 96 are transmitted to the selected digital copying machine or the printer (S67) as shown in FIG. 24. Then, the digital copying machine or the printer descrambles the transferred image data (S68). Thereafter, the digital copying machine or the printer outputs an image.

Next, in the image forming system of the present embodiment, it is permitted to install the newly developed image processing function, i.e., the new function to the host computer 96. Therefore, the process of installing the new host computer 96 and the process of registering an office apparatus of new function will be explained in reference to the flowchart of FIG. 25(a) and FIG. 25(b). In this example, it is assumed that the new function is registered in the digital copying machine 93.

As shown in FIG. 25(a), first, the developed image processing algorithm (software) is installed in the host computer 96 in the service center (S71). Then, the host computer 96 performs the information service including new function according to the content of various services to be performed with respect to the digital copying machine 93 (S72).

FIG. 25(b) is a flowchart showing operations in S72 in detail. Here, the host computer 96 transmits the data in accordance with the display processing ability of the digital copying machine 93 to the digital copying machine 93 in response to a registration request from the digital copying machine 93 (S81). Thereafter, the host computer 96 controls the registered content of the ID (identification number) and the image processing function (image editing function). Then, the host computer 96 executes a predetermined process in response to a request from the digital copying machine 93 (S82).

The operation in S81 will be explained. First, the host computer 96 sends the content of newly installed function to the digital copying machine 93. This permits the digital copying machine 93 to select the new function. In this case, the host computer 96 sends the content of new function with the command indicating new function on top through the communication line 99. Here, the new functions are determined, for example, "translation: English→Japanese" function, "translation: Japanese→English" function, and "dictionary" function. The content of the data to be transmitted is determined by the content of storing the data in the display circuit of the liquid crystal display apparatus 1 in the received apparatus, i.e., the digital copying machine 93. For example, in the case when display character data is retained inside the external character ROM as font data, the display contents of the new function are indicated by transmitting the corresponding external character codes.

Figure 26:
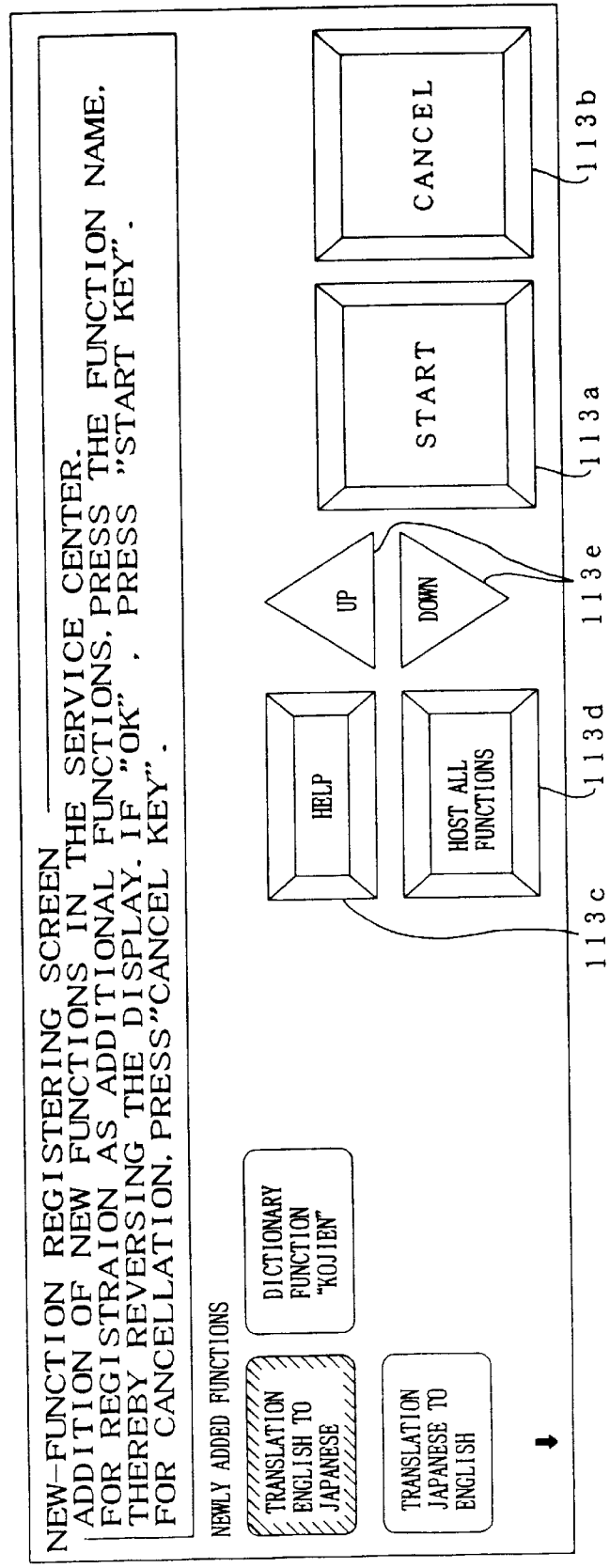
FIG. 26 is a front view showing display contents of a display screen of the liquid crystal display apparatus when S72 of FIG. 25(a) is carried out.

When the digital copying machine 93 receives the data from the host computer 96, the liquid crystal display apparatus 1 of the digital copying machine 93 becomes a function registration screen shown in FIG. 26. The described display allows the operator to confirm the new function to be registered. Then, the display area of the new function to be registered in the digital copying machine 93 is pressed by the operator, the new function is selected. Here, it is assumed that the "translation: English→Japanese" function is selected. The display area of the selected "translation: English→Japanese" function is reversed as shown in the figure. In this state, upon pressing the execution key 113a, the "translation: English→Japanese" function is registered.

The registered function is additionally displayed as translation English→Japanese setting key 103d on the second function setting screen shown in FIG. 6(c). On the other hand, in the function registration screen, upon pressing the cancel key 113b, the process in interrupted, and the registration is removed. The execution key 113a and the cancel key 113b are provided on the function registration screen. Then, even in other display screen, the key are mounted in a suitable manner.

On the function registration screen shown in FIG. 26, upon pressing the help key 113c, the liquid crystal display apparatus 1 has a screen shown in FIG. 27. To be specific, besides the display area of the new function, the brief descriptions of the function is given. FIG. 27 shows the state where the "translation: English→Japanese setting key is selected. Furthermore, on the function registration screen of FIG. 26, upon pressing the all host function display key 113d, the liquid crystal display apparatus 1 has a screen shown in FIG. 28. Namely, all the functions of the host computer 96 are displayed. On the other hand, the display area for describing various functions in the display screen of the liquid crystal display apparatus 1 is limited. Therefore, it is not permitted to display all the functions in the liquid crystal display apparatus 1 at one time. Here, by operating the scroll key 113e, all the functions can be displayed sequentially.

It may be also arranged such that the host computer 96 transmits new function data to each office, for example, periodically or whenever a new function is added. The described operation is hereinafter referred to as regular information service. Additionally, the host computer 96 permits the new function information to be transmitted to each office in a predetermined period specified by the operator. The operation is hereinafter referred to as irregular information service. By receiving such regular information service and irregular information service, the new function can be confirmed with the service center on the office side. Hereinafter, the regular information service and irregular information service will be explained in reference to FIG. 29 and FIG. 30.

Figure 29:
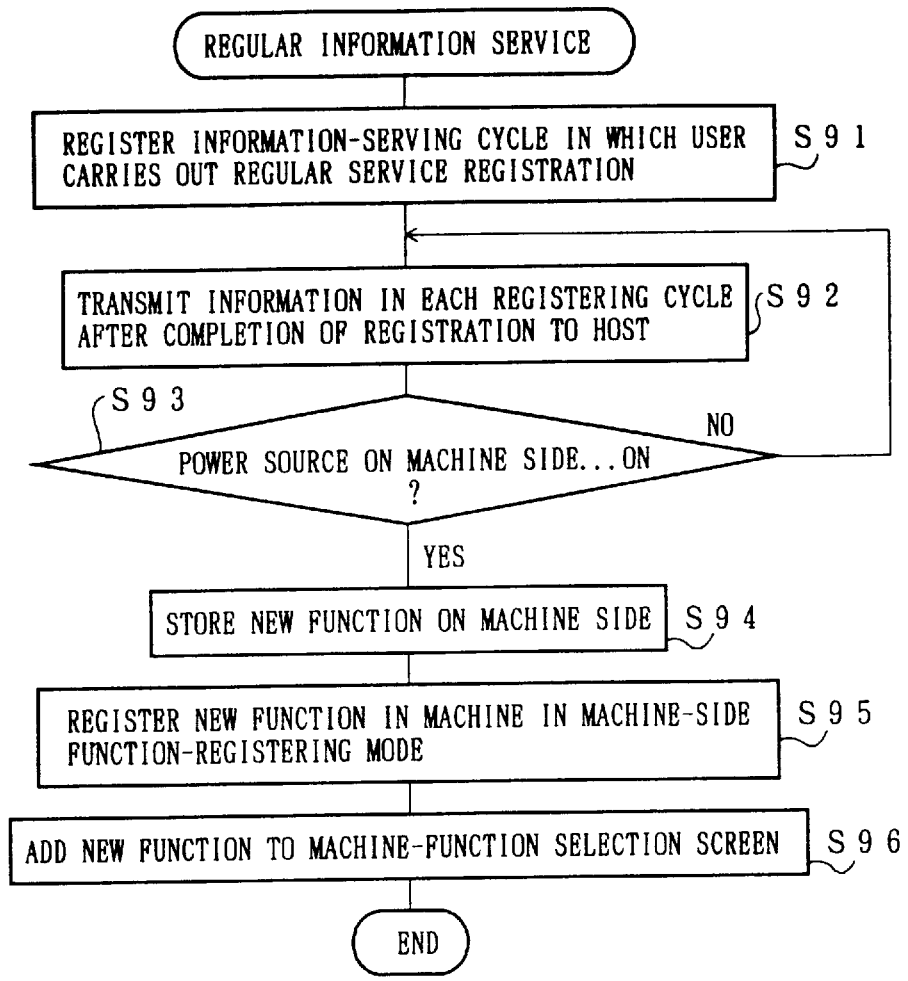
FIG. 29 is a flowchart that shows the operation of regular information service that the host computer in a service center offers to an apparatus on an office side.

FIG. 29 shows the flowchart of the regular information service to be performed by the service center. In order to allow the operator to receive the regular service, first, the operator request the host computer 96 so that the host computer 96 performs a regular information service. Then, the registration for the regular information service is made for the host computer 96 (S91). Upon registering the information supply cycle in the host computer 96, the host computer 96 first confirms that the power of an apparatus on the office side is turned on, new function information is transmitted to an apparatus on the office side by the registered cycle (S92, S93).

On the other hand, the apparatus on the office side is arranged as follows: upon receiving new function data from the host computer 96, the received new function data are stored in the memory (S94). Then, the apparatus on the office side registers the new data (S95), and the new function is added to the function selection screen (S96).

Figure 30:
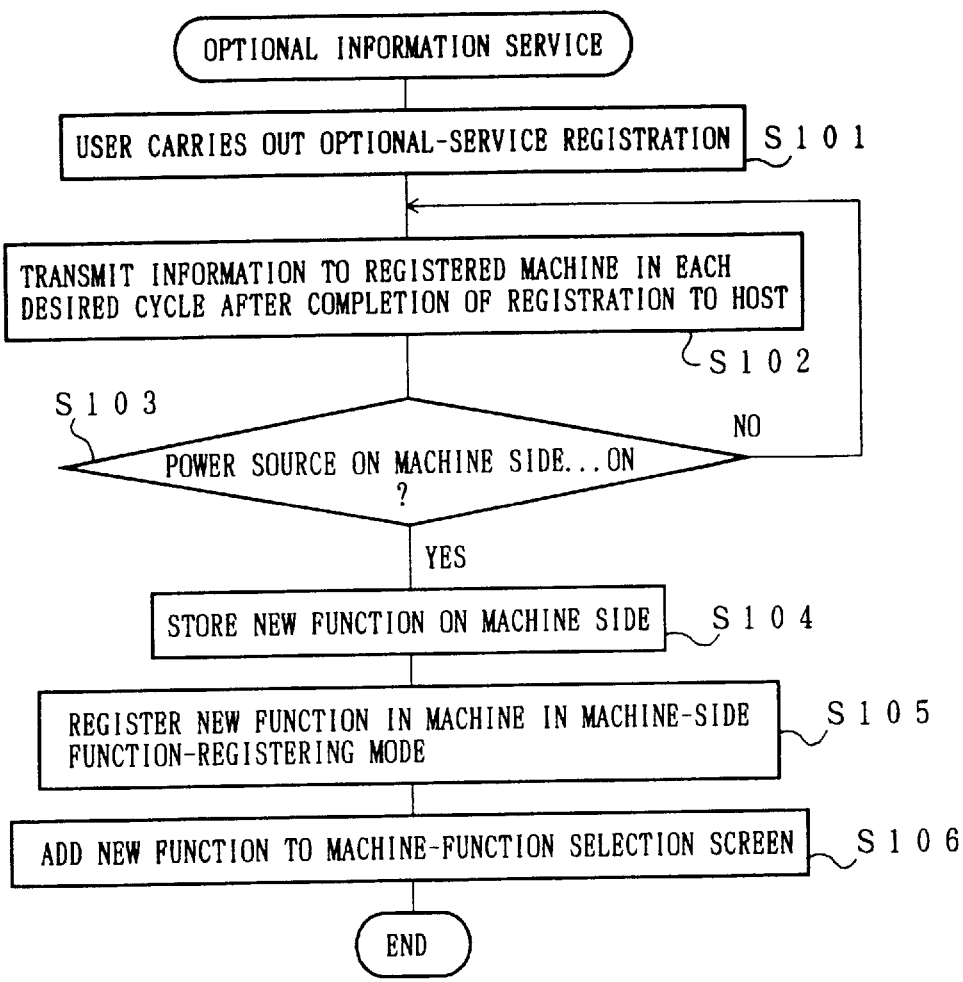
FIG. 30 is a flowchart that shows the operation of irregular information service that the host computer in the service center offers to the apparatus on the office side.

FIG. 30 shows a flowchart of the irregular information service to be performed. In order to permit the operator to receive the irregular service, first, the operator request the host computer 96 for the irregular information service offered by the host computer 96. Then, the operator registers the irregular information service in the host computer 96 (S101). Upon completing the registration, the host computer 96 confirms that the power source of the apparatus on the offices side is ON, and in the meantime, the new function information is transmitted onto the apparatus on the office side at an arbitrary cycle (S102 and S103). The respective operations of the S104 through S106 are the same as the operations of S94 and S96.

Embodiment 7

The following descriptions will describe still another embodiment of the present invention in reference to FIG. 31 through FIG. 34. Here, members having the same function as those shown in figures which explain the aforementioned embodiment 6 will be designated by the same reference numerals, and thus the descriptions thereof shall be omitted here.

The image forming system of the present embodiment is permitted to perform a copying machine utilizing an external memory. Here, an operation of the image forming system will be explained through a communication operation with the digital copying machine 92 and the host computer 96. In this case, the digital copying machine 92 is provided with an electric RDH (Recycle Document Handler).

The electric RDH function is selected by pressing the post-process setting key 101c shown in FIG. 6(a). Upon pressing the post-process setting key 10c, the post-process setting screen shown in FIG. 7(b) is displayed, as well as the electric RDH setting key 105g are displayed on the basic screen of the liquid crystal display apparatus 1.

As described, the digital copying machine 92 has a page memory of 64M bite as the memory 73. The capacity of the page memory corresponds to the capacity that permits four pages to read successively when, for example, reading the A-4 size document with 256 gray scales. Therefore, the memory 73 has a sufficient memory for temporarily storing the document image in the normal copying operation.

However, in the case of producing a plural sets of copies of the document image of 10 pages long using the electric RDH function, the page memory that is sufficient for 10 pages is required. Namely, in this case, with a simple computation, the page memory of 96M bite corresponding to 6 pages is in short.

Therefore, in the arrangement of the present embodiment, when the capacity of the page memory becomes full, the external memory selected based on conditions set by the operator (for example, the host computer 96 of a large memory capacity) is used. Then, by selecting the image data to be transferred to the external memory, the process of the electric RDH process is executed.

Figure 31:
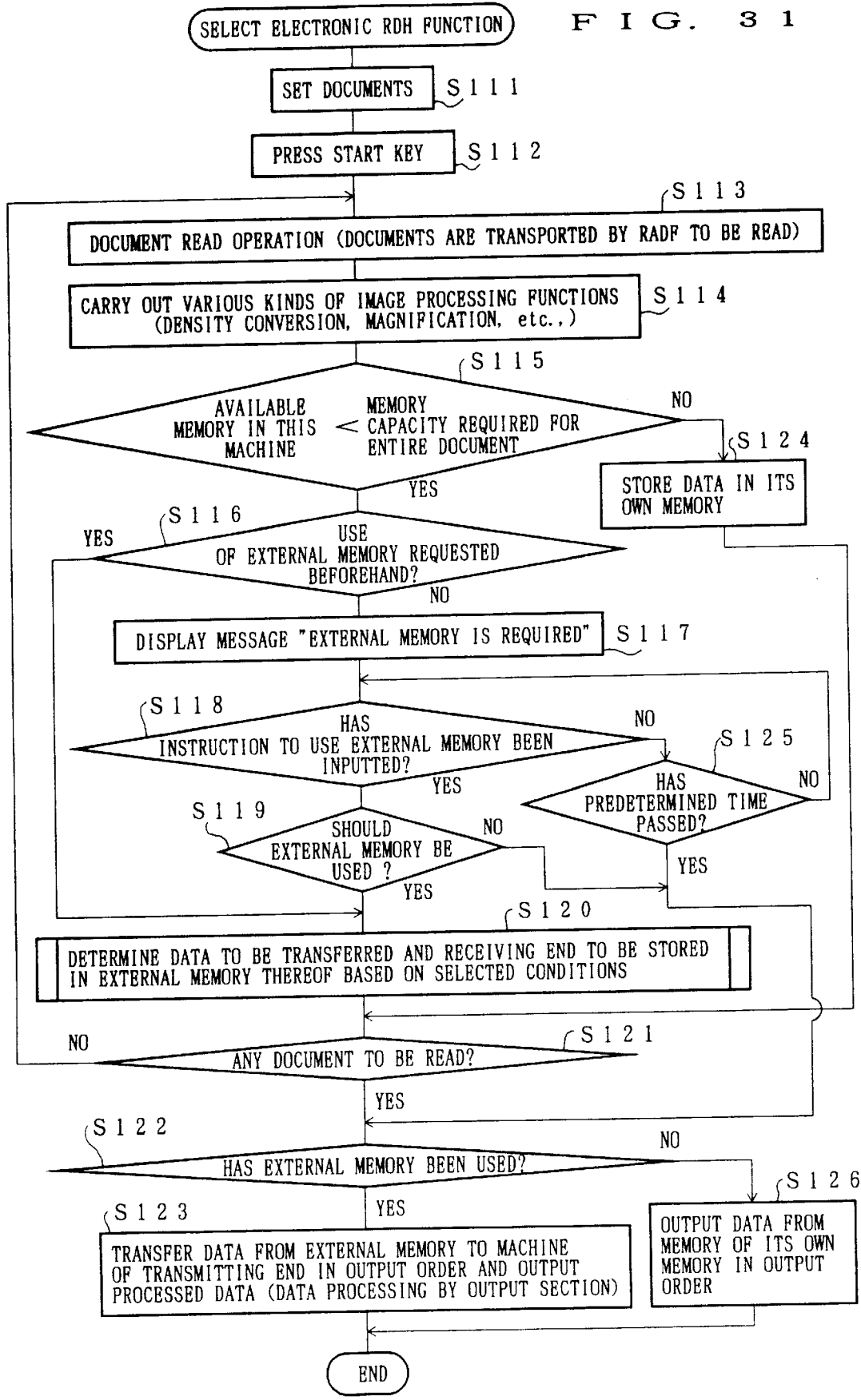
FIG. 31 is a flowchart showing an operation of the image forming system when an image process is carried out with a combined use of a main body memory and an external memory.

Here, the operation of the present embodiment will be described in reference to the flowchart of FIG. 31.

First, the electric RDH function is selected by the digital copying machine 92, and the document is set in the RADF 36 shown in FIG. 2 (S111). Next, upon setting ON the start key 15 shown in FIG. 5 (S112), the document is fed in order by the RADF 36, and the document image is read by the scanner unit 40 (S113). The resulting image data are sequentially stored in the memory 73.

Then, the image data processing section 71 performs various processes such as a magnification process based on the contrast conversion and setting (S114). Additionally, upon pressing the electric RDH setting key 105g, the external memory selection key 121a and the available memory capacity display section 121b are displayed. In the available memory display section 121b, the memory capacity (64 MB) is displayed. However, in this case, a message is not displayed.

Thereafter, while the document is being read by the scanner unit 40, the PCU 74 of the digital copying machine 92 determines if the available capacity of the memory 73 is smaller than the memory capacity required for reading the document (S115). When the PCU 74 determines in S115 that the available memory capacity of the memory 73 is smaller than the memory capacity required for reading the document, if the external memory selection key 121a is not pressed beforehand (S116), as shown in FIG. 32(a), a message "EXTERNAL MEMORY IS REQUIRED" is displayed on the display screen of the liquid crystal display apparatus 1 (S117).

Then, upon pressing the external memory selection key 121a by the operator (S118), a message shown in FIG. 32(b) is displayed on the display screen of the liquid crystal display apparatus 1. On the display screen, the external memory selection key 121a is displayed with the reversed background, which enables the operator to confirm that he has pressed the memory selection key 121a.

According to the message shown in FIG. 32(b), upon pressing the execution key 121c by the operator (S119), the image data to be transferred is selected among read image data, and the receiving end (external apparatus) to which the image data are to be transferred is determined. Thereafter, the image data are transferred to the receiving end (S120). After the transfer of the image data is started, the display screen of the liquid crystal display apparatus 1 becomes as shown in FIG. 32(c).

Here, the image data to be transferred are selected among the image data being sequentially readout, or the image data already stored in the memory 73 in accordance with the conditions specified by the operator. The receiving end is also selected in accordance with the conditions specified by the operator in the manner to be described later. Here, the image data are transferred in the aforementioned manner. Then, the received image data are stored, for example, in respective memories of the digital copying machine 93 and the host computer 96 which are the receiving ends.

Till all the documents have been read out, respective processes in S113 through S120 are repeated (S121). Thereafter, when all the document have been read out, if the external memory is used (S122), the digital copying machine 93 or the host computer 96 transfers the image data to the digital copying machine 92 in the order of output. Then, the digital copying machine 92 outputs the transferred image data and the image data read out from the memory 73 of the digital copying machine 92 on a sheet as an image (S123). In this case, the document is outputted sequentially from the last page.

The image data stored in each memory are read in the following manner. For example, when the image data are stored in the memory 73 of the digital copying machine 92, the image data are read through the data line in the digital copying machine 92. On the other hand, when the image data are stored in the memory 73 of the digital copying machine 93, the image data are read through the network provided between the digital copying machines 92 and 93. When the image data are stored in the memory of the host computer 96, the image data are read through the network and the communication line 99.

On the other hand, in S115, if the PCU 74 of the digital copying machine 92 determines that the available capacity of the memory 73 of the digital copying machine 92 is larger than the memory capacity required for reading the rest of the document, the image data are kept in the memory 73 of the digital copying machine 92 (S124), and a sequence goes to S121. Then, after carrying out the processes in S121 and S122, the image data stored in the memory 73 are outputted onto a sheet in the order of output (S126).

In S118, if a predetermined time has elapsed before the external memory selection key 121a is pressed (S125), the sequence goes to S122, and subsequently, the image data stored in the memory 73 are outputted on a sheet in the order of output (S126).

Figure 33:
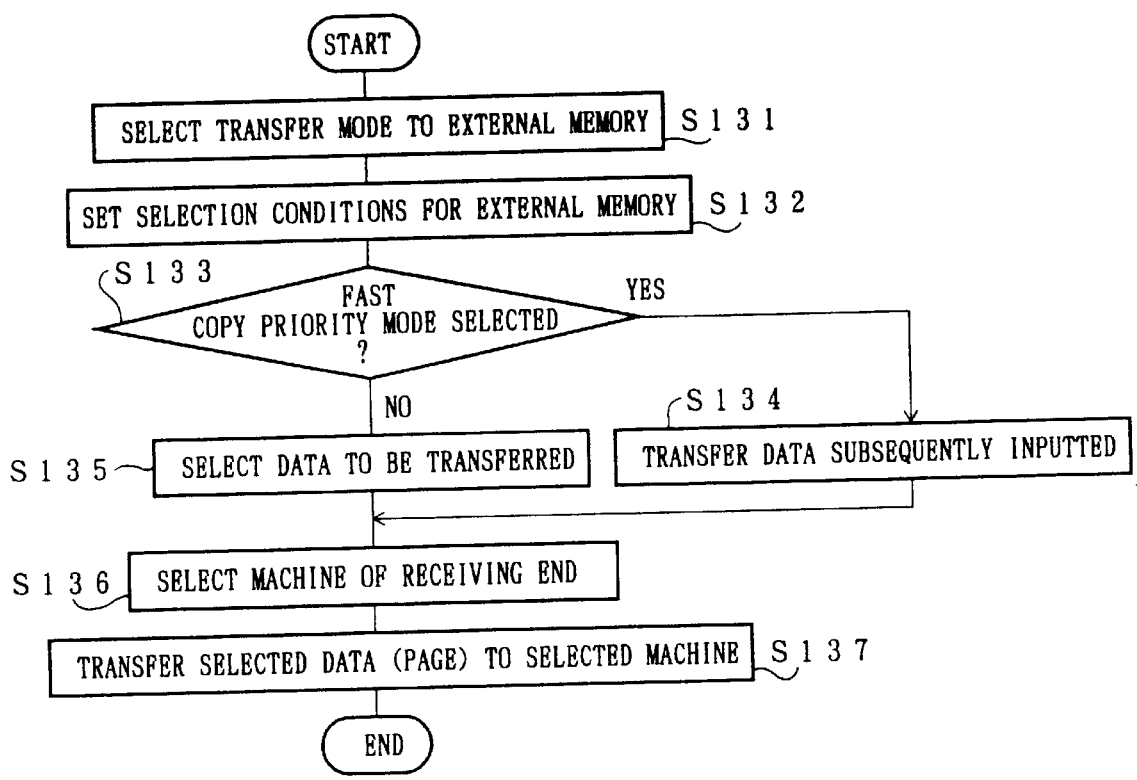
FIG. 33 is a flowchart showing an operation of selecting the data to be transmitted and the receiving end when carrying out S120 of FIG. 31.
Figure 34:
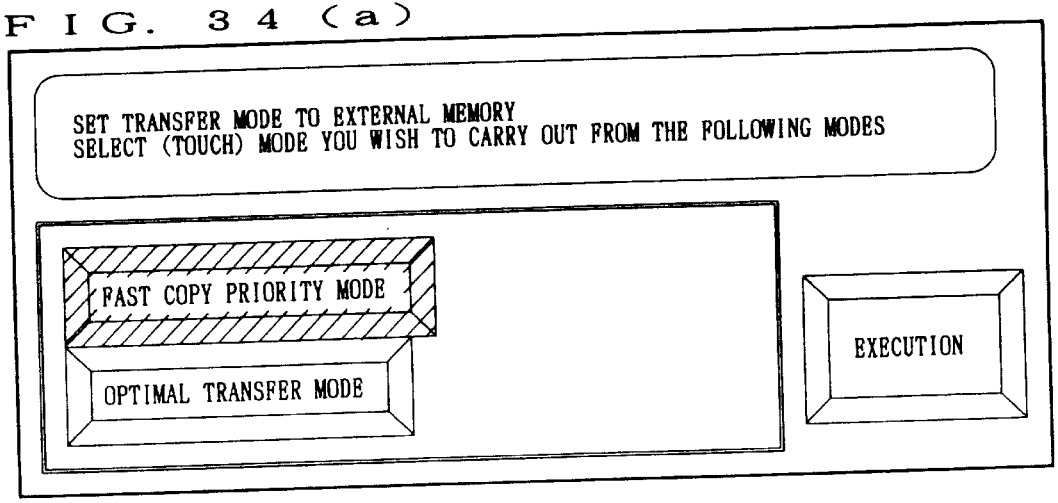
FIG. 34(a) is a front view showing a display screen of a liquid crystal display apparatus when selecting data to be transmitted when an operation shown in FIG. 33 is carried out.
FIG. 34(b) is a front view showing display contents of the display screen of the liquid crystal display apparatus when selecting the receiving end in accordance with conditions as desired by the operator.
Figure 34:
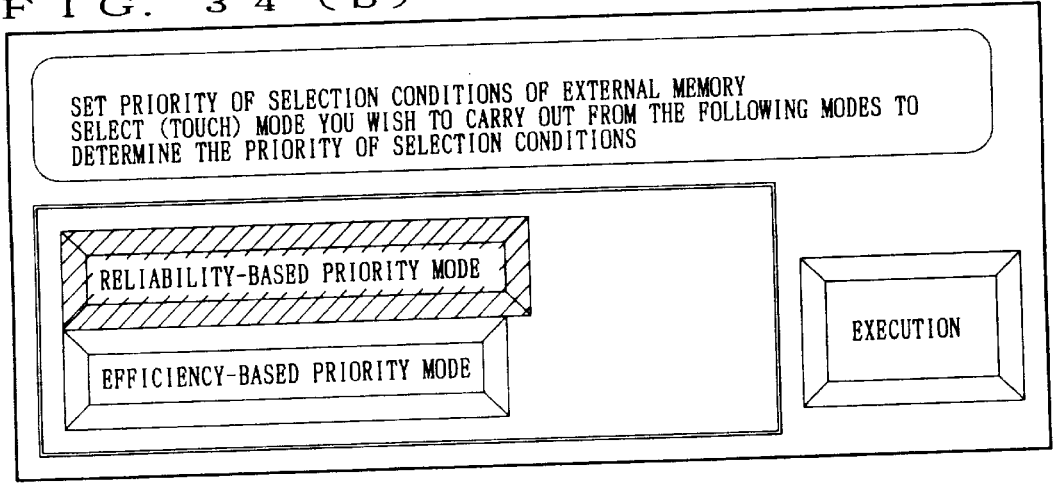

Here, in S120, the respective operations of determining the data to be transmitted and the receiving end in reference to FIG. 33 and FIG. 34.

In the digital copying machine 92 of the present embodiment, either one of the transfer modes is selected to determine the data to be transferred. The described two transmission modes are: "optimal transmission mode" and "first copy priority mode".

Normally, in S120, in order to enable the following image to be inputted promptly, an available memory is ensured immediately. Then, the page which contains less amount of data is given a priority to be transferred to the external memory. The amount of the data per page is determined based on the amount of the data in the data system of the image data. Namely, in the case where the image data are transferred as the bit map data, the page which contains a smaller amount of data required for the bit map is given a priority to be transmitted to the external memory. On the other hand, in the case where the image data are transferred as the text data, the page which contains a smaller amount of the code data is given a priority to be transmitted to the external memory. Further, in the case where the image data are transferred as the compression data, the page containing the smaller portion of the compressed part is given a priority to be transferred to the external memory.

As described, by transmitting the document in order from the page containing the smaller amount of data, the time required for transmitting the data can be minimized. For example, in the case of transmitting the image data to the host computer 96, the communication line 99 is used. In this case, by reducing the time required for the transmission, the cost incurred for the communication can be reduced.

In the case where there exist a plurality of image data corresponding to the minimum amount of data, the PCU 74 of the digital copying machine 92 makes an estimation of a change in amount of data as a result of a requested image processing function. Then, the PCU 74 selects the image data which requires least amount of time to be transmitted and received. If the data to be transmitted still cannot be determined, the image data stored in the main body first are given a priority to be stored without sending them to the external memory. Then, the following inputted data are transferred to the external memory. The described function is defined to be the optimal transmission mode.

However, the operator may desire a copying operation to be performed from the first page, rather than performing the copying operation efficiently. In this case, if a copying operation is performed in the described process, the following problem would arise. That is, the data of the first page is subject to transmission, and the data may be transferred to the external memory. As this causes a long time to be required for transferring the data when transmitting and receiving them, a significant delay occurs for the first copy.

To eliminate the described problem, the present embodiment is arranged so as to perform a copying operation in the first copy mode in the following manner. First, the data of the first page are not subject to transfer in this mode, and are stored in the main memory of the digital copying machine 92. Then, after the memory of the main body of the digital copying machine 92 becomes full, the data subsequently inputted are directly transferred to the external memory. As a result, the time required for achieving the first copy can be reduced to the minimum. The described plurality of transfer modes allows the operator to select the transfer mode in accordance with his need.

As described, the PCU 74 of the digital copying machine 92 selects the image data from the image data stored in the memory 73 which minimizes the time required for transferring the image data. Therefore, an improved efficiency in transferring the image data between the machines can be achieved. Additionally, a recording operation can be performed without delay. As a result, a stable recording operation can be performed stably and copies can be outputted at high speed.

The PCU 74 selects image data which contains a small amount per page from the image data stored in the memory 73. As a result, an available memory is ensured promptly to enable an input of the subsequent image, thereby achieving an improved efficiency in transferring the image data between machines. As a result, a stable recording operation can be performed stably and copies can be outputted at high speed.

The PCU 74 selects the image data to be transferred based on the selection conditions arbitrary set by the operator from the image data stored in the memory 73. Namely, the PCU 74 has the function as the transfer end selection means. This permits to meet the operators's demand.

Next, when the image data to be transmitted to the external apparatus are determined, it is required to determine the receiving end. In the described arrangement, as the memory of the host computer 96 satisfies the optimal condition, it is the safest to use the host computer. 96 as the receiving end. However, depending on the contents of the required process and the memory capacity, the digital copying machine 93 may be the receiving end without problems. Here, the host computer is not limited to one, and a plurality of host computers may be provided.

By selecting an apparatus (apparatuses) which satisfies (satisfy) the following condition, an appropriate receiving end can be determined. This is based on the assumption that the memory capacity of the receiving end is larger than the capacity of the data to be transferred. This eliminates such troublesome task of determining the receiving end for the image data again due to an insufficient memory capacity of the receiving end. Thus, the memory having a larger capacity than the amount of data to be transferred is to be selected.

Thereafter, the following five conditions are required:

① To select an apparatus which is ready for receiving the data which is not in operation but in a stand-by position;

② To select an apparatus in which a trouble has occurred and printing is not permitted provided that memory control/data control is effective;

③ To select an apparatus which has been used least frequently in consideration of the effects on other operators;

④ To select an apparatus of a large available memory capacity in consideration of the image data subsequently inputted; and ⑤ To select an apparatus in which a trouble (such as change in data) has occurred less frequently when transferring the image data in the past and offers a high reliability.

Under the condition ①, the image data can be written and read at high speed. Moreover, the image data can be recorded without delay. As a result, a stable recording operation can be performed stably and copies can be outputted at high speed.

Under the condition ②, the machine which is in trouble and is not in operation is selected. Such apparatus cannot function as the copying machine, but its memory can be used. Thus, the described condition ② enables an effective use of the machine in trouble.

Under the condition ③, the machine which has been used less frequently is selected as the receiving end. In this way, the possibility that the machine selected by the operator is selected also by other operator can be reduced, thereby reducing the effects on other operators to the minimum.

Under the selection condition ④, such problem that the designated machine cannot be used as the memory thereof is full can be avoided.

Under the selection condition ⑤, the possibility that the process is delayed due to some trouble, etc., can be reduced.

The data indicative of the status and performance of each of the described machines is transmitted to a memory of the machine of the receiving end (digital copying machine 92) regularly through the communication line 99 such as telephone line, etc. to be stored in the memory as a control table.

Yet, it is still possible that the operation requested by the operator may not be performed.

For example, the operator who values the reliability wishes to avoid the stoppage due to change in data and the communication trouble as much as possible. On the other hand, operator who values the speed and efficiency of the process wishes to select the machine which permits the job to be done efficiently.

Accordingly, the image forming system of the present embodiment is arranged so as to permit the operator to select the priority of the described selection conditions as desired. This enables the system to meet various demands of the operator when selecting the machine. For example, in the setting screen shown in FIG. 34(b), when "reliability-based priority model" is selected, the order of the described conditions is: ⑤ ① ③ ④ ②. On the other hand, in the case of selecting the speed-based priority mode, the order of the described conditions is: ① ② ③ ④ ⑤. The described arrangement permits the operator to select a machine which is under conditions he desires.

Next, the described process will be explained based on the flowchart of FIG. 33.

When the use of the external memory is selected in S119, first, in the display screen of the liquid crystal display apparatus 1, the screen shown in FIG. 34(a) is displayed (S131). Here, upon selecting the transfer mode in which the image data is to be transferred to the external memory, the screen shown in FIG. 34(b) is displayed (S132). Here, upon setting the selection conditions of the external memory, the process is branched according to the selected transfer mode in S131 (S133). Specifically, if the first copy-based priority mode is selected in S131, the following inputted image data are selected as the data to be transferred (S134). On the other hand, if the first copy-based priority mode is not selected in S131, namely, if the optimal transfer mode is selected, the image data which offers the highest transferring efficiency is selected as data to be transferred (S135). Then, upon determining the data to be transferred, the receiving end to which the data is to be transferred is selected based on the selection conditions of the external memory set in S132 (S136). Thereafter, the image data are transferred to the machine of the receiving end page by page (S137).

In the above explanations, the image data read from the document image is stored in the entire region of the page memory of the digital copying machine 92. However, it may be arranged such that the area corresponding to a plurality of pages of the document image in the page memory is always ensured as the memory for use in the control operation.

Embodiment 8

The following descriptions will describe still another embodiment of the present invention in reference to FIG. 35 through FIG. 38. Here, members having the same function as those shown in figures which explain the aforementioned embodiments 6 and 7 will be designated by the same reference numerals, and thus the descriptions thereof shall be omitted here.

The image forming apparatus in accordance with the present embodiment is arranged such that the host computer 96 confirms the printing function of the digital copying machine on the operator's side for the following purpose. It is assumed in the following explanations that the machine on the operator side is the digital copying machine. The digital copying machine corresponds to the described digital copying machine 30'. On the side of the operator, a plurality of different digital copying machines having different image reproducing functions are provided.

Even in the case where the host computer 96 applies a high grade image processing function with respect to the transferred image data, the digital copying machine of the requesting end may not be able to produce a quality image. Namely, the digital copying machine of the requesting end may not be able to produce copies of the original image such as photographic image in density as true as the original image by the high grade image processing function. In such case, the time and cost used in processing the image data in the host computer 96 are wasted.

Therefore, in the image forming system of the present embodiment, for example, as shown in FIG. 21, the image data are transmitted and received between the office and the service center. Specifically, for example, a predetermined machine in the office on the operator's side transfers the image data to the service center, to request the service center to process the image data with a predetermined image process function. Then, the service center transfers the processed image data to the office of the transmitting end after processing the image data with a predetermined image processing function.

In this state, the image forming system of the present invention is arranged such that the host computer 96 of the service center confirms the print function of the digital copying machine of the operator's side. Then, the host computer 96 determines if the digital copying machine of the requesting end is ready to output the processed image data as an image, and in the meantime, informs the result of determination to the digital copying machine of the requesting end. The described printing function is compared with the content of the requested image processing function by the operator. Furthermore, when the host computer 96 determines that the processed image data cannot be outputted as an image by the digital copying machine of the requesting end, the host computer 96 transfers the image data to a machine located close to the digital copying machine of the requesting end if any, to be outputted therefrom.

As a result, the digital copying machine having a desired print function is selected as the receiving end of the processed data, and a quality image can be produced by the machine.

The host computer 96 determines if the apparatus of the receiving end is suited as an apparatus for outputting the processed image based on the following criterions: the recording density of the image in the machine, the maximum paper size available in the machine, the paper size feedably set in the machine, and the conditions of the machine as to the recordability, such as conditions as to whether or not the machine is in a toner-empty state, in a jammed state, or under a regular inspection. In this case, the host computer 96 functions as a suitability judging device.

Figure 36:
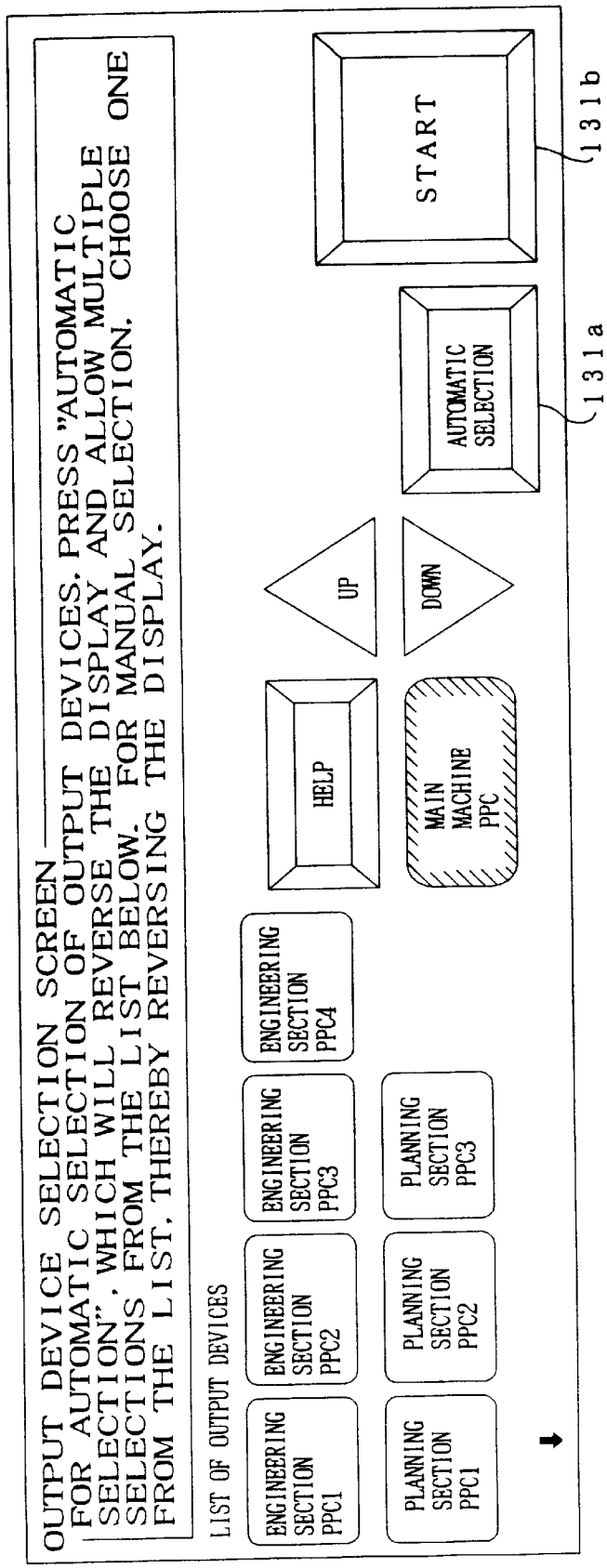
FIG. 36 is a front view showing an output device selection screen in the liquid crystal display apparatus.

Here, when each digital copying machine requests the host computer 96 for an image processing function, an output-device selection screen shown in FIG. 36 is displayed in the display screen of the liquid crystal display apparatus 1 of the digital copying machine. In the described output-device selection screen, a list of the output devices and a message are displayed, and an automatic selection mode setting key 131a and an execution key 131b are also displayed. Here, the list of the output devices indicates a list of respective digital copying machines connected to the host computer 96.

The operation of the image forming system in the automatic selection mode will be explained in reference to the flowchart of FIG. 35.

The automatic selection mode is a mode in which the host computer 96 automatically selects a digital copying machine of the receiving end to which image is to be returned. Namely, in this mode, the digital copying machine of the receiving end to which the image data is to be returned is selected automatically by the host computer 96. The described automatic selection mode is specified by pressing the automatic selection mode setting key 131a in the output device selection screen shown in FIG. 36. Upon pressing the automatic selection mode setting key 131a, the key 131a is displayed with a reversed background as shown in FIG. 37.

Figure 37:
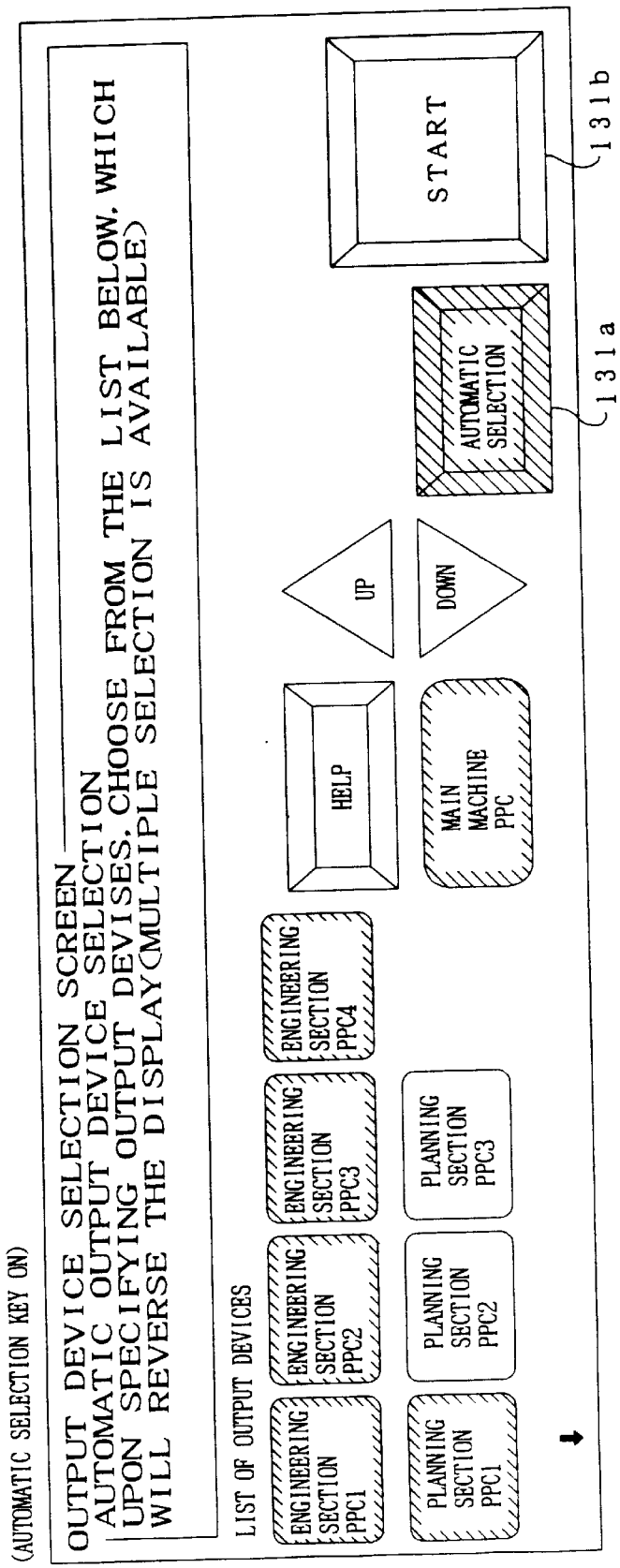
FIG. 37 is a front view showing a state of a display screen of the liquid crystal display apparatus when an automatic selection mode setting key shown in FIG. 36 is pressed.

Further, in the screen of FIG. 37, the operator can limit the selective range of the output devices. In this case, among the digital copying machines shown in the list of the output devices, the operator presses the display region of those machines that are to be included in the selective range. Then, the pressed display region is displayed with a reverse background.

Here, in the case where the selection is manually made to specify a digital copying machine to be used as the output device, the operator presses the display region of a desired digital copying machine among the digital copying machines including "designated machine PPC" from in the list of the output devices. Then, the corresponding display region of the selected digital copying machine is displayed with a reversed background, and the operator confirms that he has selected the manual mode. In this case, the image data that has been processed by the host computer 96 are returned to the specified digital copying machine in the described manner, and are outputted as an image from the digital copying machine.

Figure 35:
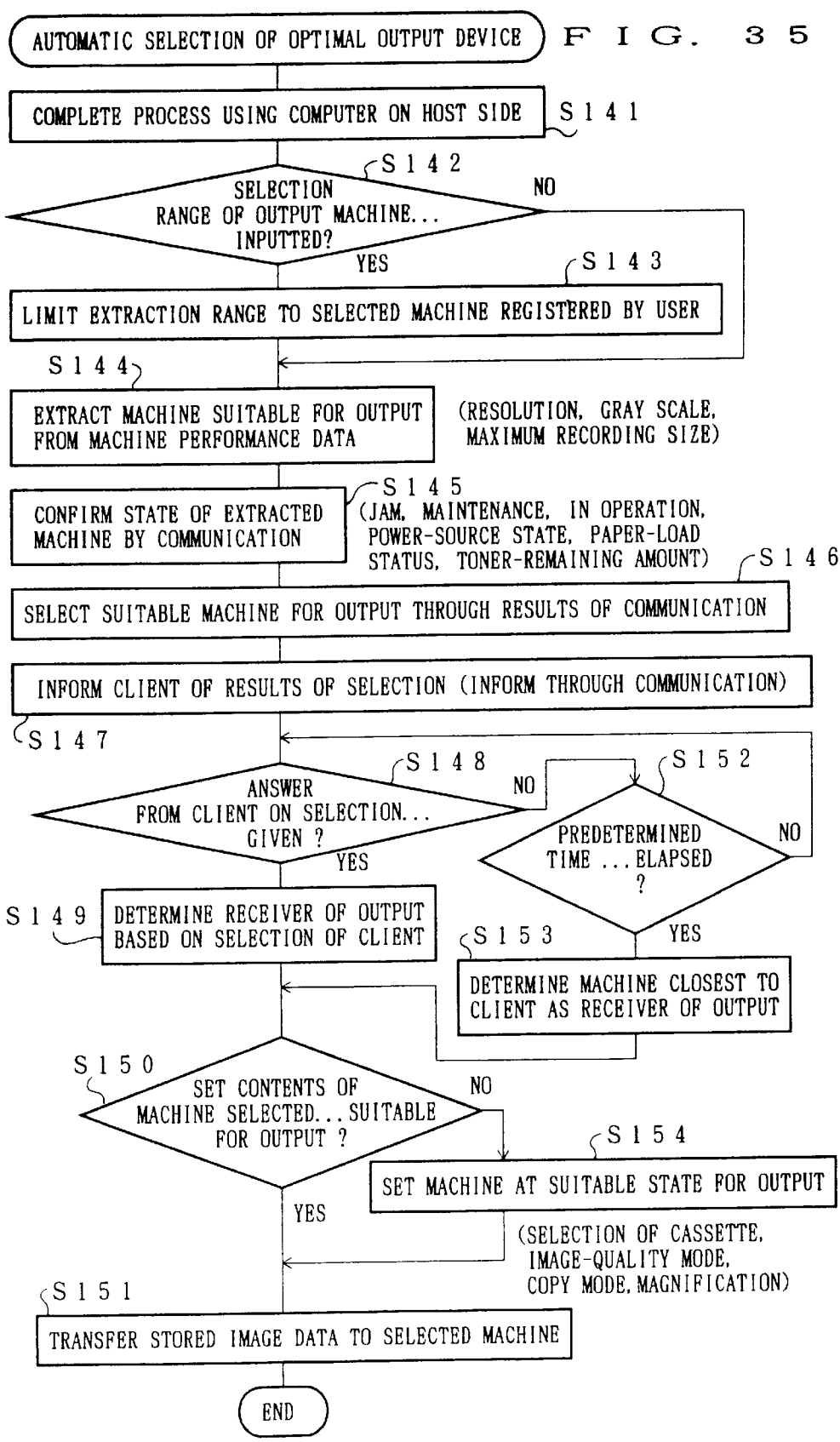
FIG. 35 is a flowchart showing an operation of selecting an output device.

In the automatic selection mode, as shown in FIG. 35, the host computer 96 first carries out the requested image processing function on the image data that has been transferred from a digital copying machine on the office side (S141). Next, the host computer 96 selects a digital copying machine to which the processed image data are to be returned. Here, the host computer 96 determines if the selective range of the digital copying machines has been inputted (S142). If the selective range of the digital copying machine has been inputted by the described manner in S142, the extractive range of the digital copying machine is specified by the host computer 96 (S143).

Next, the host computer 96 selects a digital copying machine of a receiving end in consideration of various factors such as the types of the applied image processing functions and the resolution, gray scales, and maximum recording size of digital copying machines, etc. (S144). In this case, if two or more of the machines satisfy the conditions, the host computer 96 selects these copying machines.

Further, the host computer 96 confirms if the digital copying machines selected in the described manner is ready to output an image by communicating with these digital copying machines, and excludes those machines that are not ready to output an image (S145). Those that are not ready to output an image may be in a jammed state, under a maintenance, in an operating state, or in a power-off state, or those in which the paper in the size required are in short or those in which the toner is in short.

Upon selecting a suitable digital copying machine in the described manner (S146), the host computer 96 transmits the data indicative of the results of selection to the digital copying machine of the requesting end (S147). Upon receipt of the data, the liquid crystal display apparatus 1 of the digital copying machine that received the data displays a display screen shown in FIG. 38. In the display screen, "Designated Machine PPC", "Engineering Section PPC1", "Engineering Section PPC2" and "Planning Section PPC1" as suitable digital copying machines. Further, the display region of the digital copying machine that is closest to the digital copying machine requesting for the processing is given as a flashing display. In this case, "Designated Machine PPC", which is the machine which requests for the image processing function is given as a flashing display.

Figure 38:
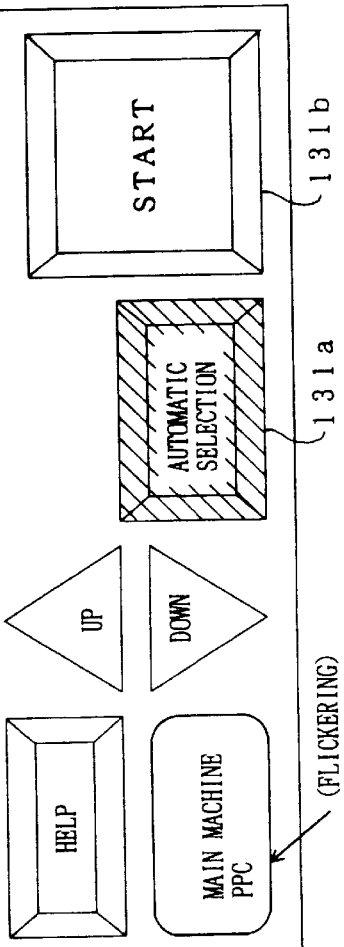
FIG. 38 is a front view showing display contents of a display screen of the liquid crystal display apparatus when S147 of FIG. 35 is carried out.

Next, in a display screen as shown in FIG. 38, a desired digital copying machine is selected by the operator among the digital copying machines shown in the list of the output devices (S148), the host computer 96 specifies the digital copying machine as a target machine to which the processed image data are to be transferred, that is, as a copying machine that is to output the image onto a sheet of paper (S149). Further, if the selection at S148 has not made within a predetermined time (S152), the host computer 96 specifies "Designated Machine PPC", which is the closest digital copying machine to the digital copying machine of the requesting end, as a target machine to which the processed image data are to be returned (S153).

Next, the host computer 96 determines if the digital copying machine selected as the receiving end of the processed image data is suited for outputting the image (S150). Here, the suitable state for outputting the image is a state wherein factors, such as the cassette, image-quality mode, copying mode and the rate of magnification, have been properly set.

If the result of the judgement is positive in S150, the host computer 96 transfers the processed image data stored in the memory to the digital copying machine selected to be the returning end (S151). On the other hand, if the result of the determination is negative in S150, the host computer 96 waits for the digital copying machine of the receiving end to be ready for output an image (S154), and transfers the processed image data to the digital copying machine (S151). As a result, in the digital copying machine to which the image data is transferred, the image is outputted onto a sheet of paper based on the image data.

Embodiment 9

Figure 39:
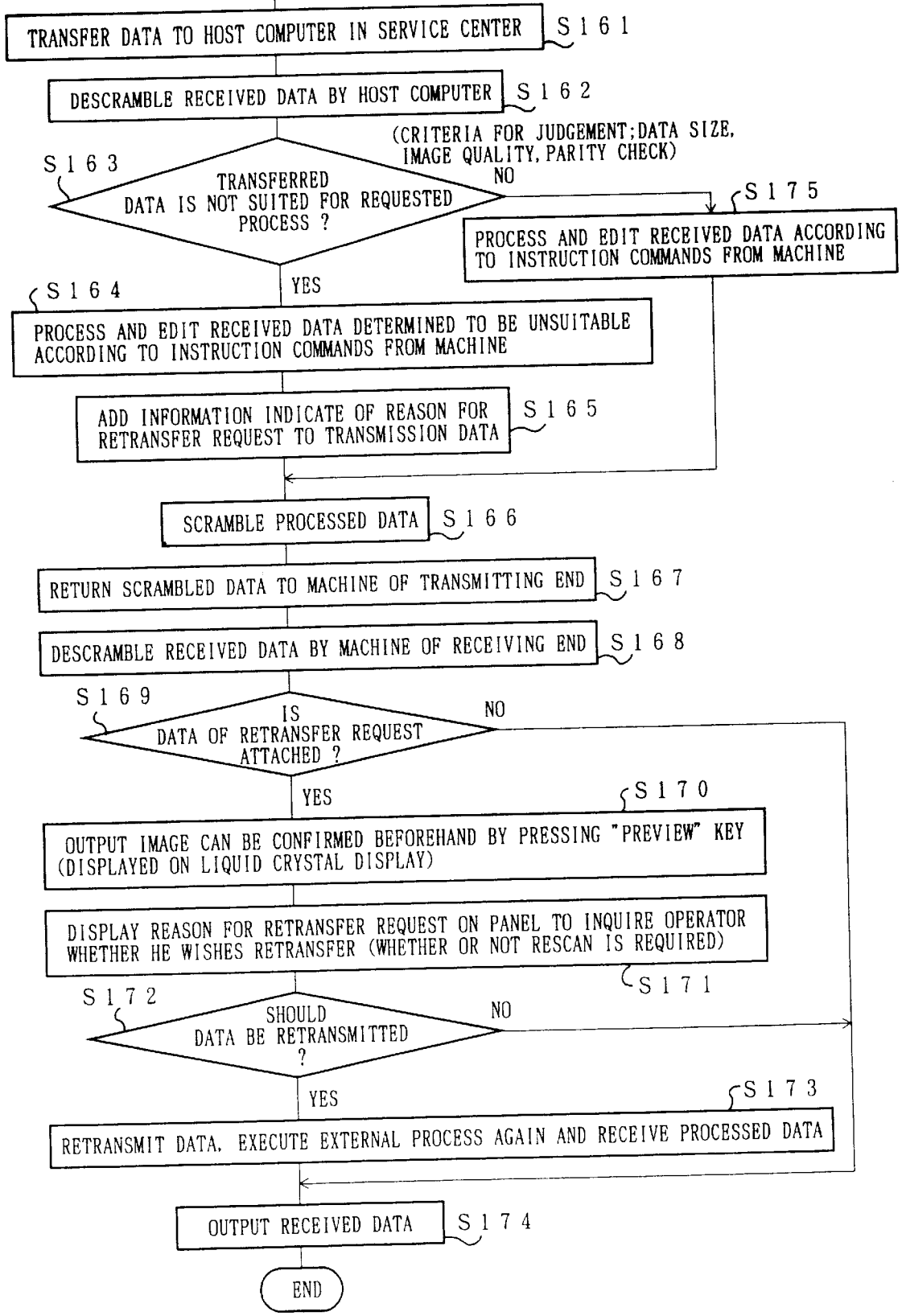
FIG. 39 is a flowchart showing an operation with regard to a retransmission process of image data in the image forming system.

The following description will discuss still another embodiment of the present invention in reference to FIGS. 39 and 40. Here, members having the same function as those shown in figures which explain the aforementioned embodiments 6–8 will be designated by the same reference numerals, and thus the descriptions thereof shall be omitted here.

In an image forming system in accordance with the present embodiment, for example, having an arrangement shown in FIG. 21, a document image is read by a scanner section 31 shown in FIG. 20. Then, the digital copying machine transfers the image data of the document to the host computer 96 of the service sensor. Here, the host computer 96 is provided with a function for determining if the image data of the document transferred from the digital copying machine is suited for the image processing function requested from the digital copying machine. Then, if the result of determination is negative, the host computer 96 requests the digital copying machine which is the transmitting end of the image data to re-transfer the image data. Namely, the host computer 96 functions as the image data suitability determining section.

This arrangement is made to prevent the following problems. The host computer 96 cannot carry out the requested image processing function due to improper image data, and the host computer 96 has to carry out a wasteful processing on unusable low-quality image data. The cases causing improper image data for the image processing are, for example, given as follows: the picture quality of a document itself to be read by the scanner section 31 is improper, the resolution of the scanner section 31 itself that reads a document image is low, the document is dislocated while being read, and the telephone line 97, which serves as a communication line, is in a bad condition and causes adverse effects such as noises, i.e., on the image data.

Next, referring to a flowchart in FIG. 39, the following description will discuss the operation of the image forming system. Here, an explanation is given by exemplifying a case wherein upon selection of the "Translation Function-"the image data are retransferred from the digital copying machine. As shown in Table 3, the "Translation Function" is not provided in digital copying machines 91 through 93, and the host computer 96 is requested for the function.

In this operation, image data to be translated, which has been read by the scanner section 31, is first transferred from the digital copying machine to the host computer 96 in the service center (S161). This operation is carried out in the same manner as the case shown in FIG. 22.

The host computer 96 unscrambles the received data (S162), and makes a judgement as to whether or not the received image data are suitable for the translation process (S163).

Next, even if the judgement is made as "unsuitable", the host computer 96 carries out the "translation" process in accordance with the request from the digital copying machine (S164). Then, the reasons for the request for retransfer of the image data are attached to the processed data as information, thereby forming return data (S165). On the other hand, if the result of determination in S163 is positive, the host computer 96 carries out the "translation" process in accordance with the request from the digital copying machine (S175), and the resulting processed image data forms return data.

Next, the host computer 96 scrambles the return data (S166), and transfers the return data to the digital copying machine of the requesting end (S167).

The digital copying machine descrambles the image data returned from the host computer 96 (S168). In this case, if the information of the request for retransfer is attached to the image data (S169), the digital copying machine receives the processed image data (S170) so as to be displayed on the liquid crystal display apparatus 1. Further, the digital copying machine displays the reasons for the request for retransfer on the liquid crystal display apparatus 1, as well as providing a display inquiring whether or not the retransfer will be made (S171). On the other hand, if the information of the request for retransfer is not attached to the image data in S169, the digital copying machine outputs the image data onto a sheet of paper as an image (S174).

As shown in FIG. 40(a), the display on the liquid crystal display apparatus 1, which is provided at S171, gives a warning as to the unsuitability of the image data for the "translation" process. Further, the reasons for the warning are classified into picture quality (processing level), data sizes and parity errors, are displayed on "WARNING LIST" There items serve as criterions for the operator to make a judgement as to the request for retransfer. Here, in FIG. 40(a), the display of data size, 90%, means that in the image data of an A-4 size document, image data that the host computer 96 has received is insufficient by 10% due to a certain trouble.

Further, a preview key 141a, a rescanning key 141b and a continuation key 141c are provided in the screen shown in FIG. 40(a).

When the preview key 141a is pressed, the processed image data, that is, the result of translation, is displayed as shown in FIG. 40(c). This is an operation of the operation panel 90 as an information confirming section. The preview key 141a is pressed when a visual confirmation of the image quality level (processing level) is desired prior to the decision as to whether or not the output is carried out. In the screen shown in FIG. 40(c), the quality of the output image can be confirmed over its entire region by scrolling the screen using a U-key 141d, a D-key 141e, an R-key 141f and L-key 141g. When, upon completion of the confirmation, the confirmation key 141h is pressed, the screen is returned to the one shown in FIG. 40(a).

Further, after the process of S171, when the rescanning key 141b is pressed by the operator (S172), the scanning of the original image is resumed by the scanner section 31 in the digital copying machine, and the resulting image data that is to be "translated" is again transmitted to the host computer 96. Thus, the host computer 96 carries out the "translation" process on the image data, and returns the processed image data to the digital copying machine that has transmitted the image data, in the same manner as the aforementioned first operation.

Next, the digital copying machine receives the returned image data, and carries out the same processes as described earlier (S173). As a result of this operation, a display shown in FIG. 40(b) is provided on the liquid crystal display apparatus 1. In this display screen, the data size, 100%, is given in the "WARNING LIST" thereby indicating that no problem is basically raised in outputting the processed image data. However, with respect to the process level (OCR recognition rate), a display is left as a CHECK screen since the compromise criterion is different depending on the operators.

Thereafter, the digital copying machine outputs the returned image data as a copied image (S174). In contrast, if the continuation key 141c is pressed at S172, the digital copying machine outputs the image data that was first returned as a copied image at S174, without retransferring the image data to the host computer 96.

As described above, when an image processing is requested by the operator, the present image-forming system not only carries out the image processing in accordance with the request, but also makes a judgement as to whether or not the image data are suitable for the requested image processing, and if the result of determination is negative, it requests the retransfer of the image data. This makes it possible to obtain a desired image accurately and positively.

In the described preferred embodiment, the image forming system is arranged such that upon receiving a return request from the host computer 96, the digital copying machine retransfers the image data to the host computer 96 based on the key input made by the operator, i.e., the determination made by the operator. However, it may be also arranged such that in response to the re-transmission request from the host computer 96, the digital copying machine, for example, automatically carries out a re-scan, and re-transmits the resulting image data to the host computer 96. In this arrangement, the respective operations in S170 and S171 shown in FIG. 39 can be omitted.

Furthermore, explanations have been given through the case where the digital copying machines 91–93 serve as apparatus of the operator side which transmits and receives the image data with the host computer 96. However, for example, a combination of the scanner 94 with the printer 95 may function as the digital copying machine. Therefore such combination may communicate with the host computer 96 like the digital copying machines 91–93.

In this arrangement, the image data read by the scanner 94 is transferred to the host computer 96. The host computer 96 carries out a requested image processing function with respect to the transferred image data, and transferred the processed image data to the printer 95. Then, the printer 95 prints out the transferred image data.

The host computer 96 is also permitted to apply a predetermined image processing function with respect to the inputted image data, and return the processed image data to the printer 95 to be printed out. Thus, only the printer 95 may be arranged so as to communicate with the host computer 96.

As described, an image forming system in accordance with the present invention is arranged so as to include at least one digital copying machine serving as an image forming apparatus, a host computer 96 as an external memory device, a transmission apparatus for interconnecting them to allow them to communicate each other by transmitting and receiving image data, wherein the digital copying machine includes the scanner unit 31 for reading an image to be converted into the image data, the memory 73 for storing the read image data, the laser printer section 32 for forming a visible image based on the image data, the operation panel 90 for inputting an instruction with regard to the order of processing the image data, and the PCU 74 which serves as a control section for controlling the memory capacity of the memory 73 and determining the image data to be transferred in accordance with the purpose specified by the operator. The described arrangement is further arranged such that when the amount of the inputted image data exceeds the memory capacity of the memory 73 of the digital copying machine, the PCU 74 transfers the image data of the excessive amount to other digital copying machine or the external memory device through the transmission equipment to be stored therein.

According to the described arrangement, the image data to be transferred between the designated digital copying machine and other digital copying machine or the image processing apparatus can be selected as desired by the operator. This enables the system to meet various demands of the operator.

As described, the image forming system of the present invention is further arranged such that the digital copying machine includes the priority order memory means which stores a plurality of selection conditions for transferring the image data and the priority order to the selective conditions that can be set as desired by the operator, wherein when the remaining memory capacity of the memory 73 that is available for storing the image data is smaller than the maximum amount of image data to be read, the selection conditions in accordance with the selected priority order is selected from the image data stored in the memory, thereby determining the image data to be transferred to other digital copying machine or the image processing apparatus.

As the described arrangement permits the priority order, based on which a plurality of selection conditions are applied, to be changed for selecting the image data to be transferred, an optimal image data for the data to be transferred can be selected as the operator desires.

As described, another image forming apparatus in accordance with the present invention is arranged so as to include at least one digital copying machine serving as an image forming apparatus, a host computer 96 as an external memory device, a transmission apparatus for interconnecting them to allow them to communicate each other by transmitting and receiving image data, wherein the digital copying machine includes the scanner unit 31 for reading an image to be converted into the image data, the memory 73 for storing the read image data, the laser printer section 32 for forming a visible image based on the image data, the operation panel 90 for inputting an instruction with regard to the order of processing the image data, and the PCU 74 which controls the memory capacity of the memory 73 and controls such that when the remaining memory capacity of the memory 73, available for storing the image data is smaller than the maximum amount of image data to be read for the image size, the image data to be subsequently inputted are transferred to the external memory device 73.

According to the described arrangement, the front portion of a sequential output image data is stored in the memory 73 of the digital copying machine side, the time required for outputting an image can be reduced.

As described, another image forming apparatus in accordance with the present invention is arranged so as to include at least one digital copying machine serving as an image forming apparatus, a host computer 96 as an external memory device, a transmission apparatus for interconnecting them to allow them to communicate each other by transmitting and receiving image data, wherein the digital copying machine includes the scanner unit 31 for reading an image to be converted into the image data, the memory 73 for storing the read image data, the laser printer section 32 for forming a visible image based on the image data, the operation panel 90 for inputting an instruction with regard to the order of processing the image data, and the PCU 74 which controls the memory capacity of the memory 73 and controls such that when an amount of image data to be inputted exceeds the memory capacity of the memory 73 of the digital copying machine, the external memory device to which the image data of the excessive amount are transferred in accordance with the usage specified by the operator is determined, and transfers the image data in an excess amount of the memory capacity to the external memory device through the transmission apparatus to be stored therein.

According to the described arrangement, as the PCU 74 determines the external memory device to which the image data in an excess amount are to be transferred in accordance with the usage specified by the operator, the external memory device can be selected as desired by the operator.

As described, the image forming system is arranged so as to include the PCU 74 for detecting the operation state of the external memory device and priority order memory means for setting a plurality of selection conditions of the external memory device to which the data is to be transferred and storing a plurality of priority orders of the selection conditions from which an optimal order can be selected as desired by the operator, wherein in the case of transferring the image data to the external memory device, the PCU 74 applies the selection condition in accordance with the priority order selected by the operator with respect to the detected operation state to determine the external memory device to which the image is to be transferred.

According to the described arrangement, the external memory device to which the image is to be transferred is determined based on both the operation state of each external memory device detected by the PCU 74 and the priority order of the selection conditions with respect to the external memory device desired by the operator. Therefore, an optimal operation condition of the image forming apparatus in which the operator's needs can be reflected most at the time of using the image forming apparatus can be achieved in accordance with operating state of each external memory device.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image forming system, comprising:
a plurality of image forming apparatuses; and
a transmission apparatus for interconnecting said plurality of image forming apparatuses to allow them to communicate with each other by transmitting and receiving image data;

wherein at least one of said plurality of image forming apparatuses serves as a first image forming apparatus which includes:

an image recording section for forming a visible image based on the image data;

an input section for inputting an instruction with regard to an image processing function to be performed by said first image forming apparatus; and a transmission-side control section for storing function data indicative of types of image processing functions provided in each of said plurality of image forming apparatuses, selecting a plurality of image forming apparatuses provided with a selected image processing function based on an instruction from said input section for requesting a predetermined image processing function to be applied to the image data and the function data so as to distribute thereto the image data to be processed, and transferring the image data to the selected plurality of image forming apparatuses through said transmission apparatus, and further realigning a plurality of processed image data returned from other image forming apparatus to said image recording section; and some of said plurality of image forming apparatuses excluding said first image forming apparatus serve as second image forming apparatuses, each second image forming apparatus including:

a processing section for processing the image data with the predetermined image processing function; and a processing-side control section for supplying the image data inputted through said transmission apparatus to said processing section and returning the image data processed by said processing section to said first image forming apparatus through said transmission apparatus.

2. The image forming system as described in claim 1, wherein:

each of said plurality of second image forming apparatuses includes return adjusting means for returning the processed image data to said first image forming apparatus, upon receiving a return request from said first image forming apparatus when the image data has been processed with a requested image processing function.

3. The image forming system as described in claim 1, wherein each second image forming apparatus further includes:

determination means for determining if a process of the image data being carried out in other image forming apparatus in ahead of the second image forming apparatus has been completed when the image data has been processed with a requested image processing function; and return adjusting means which returns the image data to said first image forming apparatus when a result of determination by said determination means is positive, while sets said first image forming apparatus in a standby position without returning the image data to said first image forming apparatus when the result of determination by said determination means is negative.

4. The image forming system as defined in claim 1, wherein:

said processing-side control section in said second image forming apparatus controls such that the image data processed by said processing section are sequentially returned to said first image forming apparatus through said transmission apparatus, and said transmission-side control section controls such that said recording section sequentially outputs returned image data.

5. The image forming system as set forth in claim 1, wherein:

said transmission-side control section in said first image forming apparatus controls such that a second image forming apparatus having enough memory for storing the processed image data is selected among the second image forming apparatuses provided with the predetermined image processing function so as to distribute thereto a plurality of image data to be processed.

6. The image forming system as defined in claim 1, wherein:

said transmission-side control section in said first image forming apparatus controls such that a second image forming apparatus provided with an upper grade image processing function is selected among said second image forming apparatuses provided with a predetermined image processing function so as to distribute a plurality of image data to be processed.

7. The image forming system as defined in claim 1, wherein:

said transmission-side control section in said first image forming apparatus controls such that a plurality of new image data are transferred to said second image forming apparatuses after said second image forming apparatuses have returned all the processed image data to said first image forming apparatus.

8. The image forming system as defined in claim 1, wherein:

said processing-side control section in said second image forming apparatus controls such that said second image forming apparatus receives a plurality of new image data transferred from said first image forming apparatus after said second image forming apparatus has transferred all the processed image data to said first image forming apparatus.

9. The image forming system as defined in claim 1, wherein:

said transmission-side control section in said first image forming apparatus controls such that the image data are transferred to said second image data apparatus after scrambling the image data.

10. The image forming system as defined in claim 1, wherein:

said processing-side control section in said second image forming apparatus controls such that the image data processed by said processing section are scrambled, and the scrambled image data are returned to said first image forming apparatus through said transmission apparatus.

11. The image forming system as defined in claim 1, wherein:

said second image forming apparatus includes a first main image forming apparatus and a second main image forming apparatus respectively having memory sections for storing the image data; and said processing-side control section in said first main image forming apparatus controls such that the image data transmitted from said first image forming apparatus are once stored in the memory section and then transferred to said second main image forming apparatus to be processed therein, and further the image data processed in said second main image forming apparatus are once stored in the memory section, and then transferred to said first image forming apparatus.

12. The image forming system as defined in claim 1, wherein:
said plurality of image forming apparatuses are connected in a loop through said transmission apparatus.

13. An image forming system, comprising:
a plurality of image forming apparatuses; and
a transmission apparatus for interconnecting said plurality of image forming apparatuses to allow them to communicate with each other by transmitting and receiving image data;
wherein at least one of said plurality of image forming apparatuses serves as a first image forming apparatus which includes:
a first processing section for processing the image data with a predetermined image processing function;
an image recording section for forming a visible image based on the image data;
an input section for inputting an instruction with regard to the image processing function to be performed by said first image forming apparatus;
a transmission-side control section for storing function data indicative of types of image processing functions provided in each of said plurality of image forming apparatuses including said first image forming apparatus, selecting a plurality of image forming apparatuses provided with a selected image processing function based on an instruction for requesting a predetermined image processing function to be applied to the image data and the function data from said input section so as to distribute the image data to be processed, and transferring the image data respectively to said first processing section of the selected first image forming apparatus and said second image forming apparatus through said transmission apparatus while realigning the processed image data by said first processing section of said first image forming apparatus and the processed image data returned from said second image forming apparatus to be supplied to said image recording section; and
said second image forming apparatus includes:
a second processing section for processing the image data with a predetermined image processing function; and
a processing-side control section for supplying the image data inputted through said transmission apparatus to said second processing section and returning the image data processed by said second processing section to said first image forming apparatus through said transmission apparatus.

14. The image forming system as described in claim 13, wherein:
each second image forming apparatus includes return adjusting means for returning the processed image data to said first image forming apparatus, upon receiving a return request from said first image forming apparatus when the image data has been processed with a requested image processing function.

15. The image forming system as described in claim 13, wherein said second image forming apparatus further includes:
determination means for determining if the image data being processed in other image forming apparatus in ahead of the second image forming apparatus has been completed when the image data has been processed with a requested image processing function; and
return adjusting means which returns the image data to said first image forming apparatus when a result of determination by said determination means is positive, while sets said first image forming apparatus in a standby position without returning the image data to said first image forming apparatus when the result of determination by said determination means is negative.

16. The image forming system as defined in claim 13, wherein:
said processing-side control section in said second image forming apparatus controls such that the image data processed by said processing section are sequentially returned to said first image forming apparatus through said transmission apparatus, and
said transmission-side control section controls such that said recording section sequentially outputs returned image data.

17. The image forming apparatus as set forth in claim 13, wherein:
said transmission-side control section in said first image forming apparatus controls such that a second image forming apparatus having enough memory for storing the processed image data is selected among the second image forming apparatuses provided with the predetermined function so as to distribute thereto a plurality of image data to be processed.

18. The image forming system as defined in claim 13, wherein:
said transmission-side control section in said first image forming apparatus controls such that a second image forming apparatus provided with an upper grade image processing function is selected among said second image forming apparatuses provided with the predetermined function so as to distribute thereto a plurality of image data to be processed.

19. The image forming system as defined in claim 13, wherein:
said transmission-side control section in said first image forming apparatus controls such that image data to be outputted first is processed by said first processing section of said first image forming apparatus, and other image data are transferred to said second image forming apparatus to be processed by said second processing section thereof.

20. The image forming system as defined in claim 13, wherein:
said processing-side control section in said first image forming apparatus controls such that a plurality of new image data are transferred to said second image forming apparatus after said second image forming apparatus has returned all the processed image data to said first image forming apparatus.

21. The image forming system as defined in claim 13, wherein:
said transmission-side control section in said second image forming apparatus controls such that said second image forming apparatus receives a plurality of new image data transferred from said first image forming apparatus after said second image forming apparatus has returned all the processed image data to said first image forming apparatus.

22. The image forming system as defined in claim 13, wherein:
said transmission-side control section in said first image forming apparatus controls such that the image data are transferred to said second image data apparatus after scrambling the image data.

23. The image forming system as defined in claim 13, wherein:

said processing-side control section in said second image forming apparatus controls such that the image data processed by said second processing section are scrambled, and the scrambled image data are returned to said first image forming apparatus through said transmission apparatus.

24. The image forming system as defined in claim 13, wherein:

said second image forming apparatus includes a first main image forming apparatus and a second main image forming apparatus respectively having memory sections for storing the image data; and said processing-side control section in said first main image forming apparatus controls such that the image data transmitted from said first image forming apparatus are once stored in the memory 'section and then transferred to said second main image forming apparatus to be processed therein, and further the image data processed in said second main image forming apparatus are once stored in the memory section, and then transferred to said first image forming apparatus.

25. The image forming system as defined in claim 13, wherein:

said plurality of image forming apparatuses are connected in a loop through said transmission apparatus.

26. An image forming system, comprising:

at least one image forming apparatus;

at least one image processing apparatus; and a transmission apparatus for allowing them to communicate with each other by transmitting and receiving data, wherein each image processing apparatus includes:

a first memory section for storing image data inputted through said transmission apparatus, and each image forming apparatus includes:

an image take-in section for taking-in an original document image as image data;

a second memory section for storing the image data taken in by said image taken-in section;

an input section for inputting an instruction with regard to the image processing function to be performed by said image forming apparatus;

a processing section for processing the image data with a predetermined image processing function;

an image recording section for forming a visible image based on the processed image data; and a control section for controlling a memory capacity of said second memory section, said control section controlling such that when an amount of image data to be inputted exceeds the memory capacity of the second memory section, image data in an excess amount of the memory capacity are transferred to other image forming apparatus or image processing apparatus through said transmission apparatus.

27. An image forming system, comprising:

at least one image forming apparatus;

at least one image processing apparatus; and a transmission apparatus for allowing them to communicate with each other by transmitting and receiving data, wherein each image processing apparatus includes:

a first memory section for storing image data inputted through said transmission apparatus, and each image forming apparatus includes:

an image take-in section for taking in an original document image as image data;

a second memory section for storing the image data taken in by said image taken-in section;

an input section for inputting an instruction with regard to the image processing function to be performed by said image forming apparatus;

a processing section for processing the image data with a predetermined image processing function;

an image recording section for forming a visible image based on the processed image data; and a control section for controlling a memory capacity of said second memory section, said control section controlling such that when an amount of image data to be inputted exceeds the memory capacity of said second memory section, the image data to be transferred are selected in accordance with an object specified by an operator, and the selected image data are transferred to other image forming apparatus or image processing apparatus through said transmission apparatus.

28. The image forming system as recited in claim 27, wherein:

said control section selects the image data to be transferred among image data stored in said second memory section in such a manner that a transmission time is reduced.

29. The image forming system as recited in claim 27, wherein:

said control section selects image data containing a small amount of data per page as the image data to be transferred among the image data stored in said second memory section.

30. The image forming system as recited in claim 27, wherein:

said control section selects image data to be transferred based on arbitrary selection conditions set by the operator among the image data stored in said second memory section.

31. The image forming system as set forth in claim 27, wherein said image processing apparatus further includes:

a processing section for processing transferred image data with a predetermined image processing function; and output determination means for determining if processed image data can be outputted appropriately by comparing an image output capacity of said image recording section of said image forming apparatus with image processing contents requested by the operator, wherein when a result of determination by said output determination means is negative, the image data are transferred to an appropriate apparatus located close to said designated image forming apparatus, if any, to be outputted therefrom.

32. The image forming system as set forth in claim 27, wherein said image processing apparatus further includes:

a processing section for processing transferred image data with a predetermined image processing function; and processing determination means for determining if said processing section is capable of processing the transferred image data with the predetermined image processing function, wherein when a result of determination by said processing determination means is negative, said processing determination means requests the image forming apparatus of a transmitting end of the image data to transmit the image data again.

33. An image forming system, comprising:

at least one image forming apparatus;

at least one image processing apparatus; and a transmission apparatus for allowing them to communicate with each other by transmitting and receiving data, wherein each image processing apparatus includes:
- a first memory section for storing image data inputted through said transmission apparatus, and each image forming apparatus includes:
- an image take-in section for taking in an original document image as image data;
- a second memory section for storing the image data taken in by said image taken-in section;
- an input section for inputting an instruction with regard to the image processing function to be performed by said image forming apparatus;
- a processing section for applying a predetermined image process to said image data;
- an image recording section for forming a visible image based on the processed image data; and
- receiving end selection means for controlling a memory capacity of said second memory section, said receiving end selection means controlling such that when an amount of image data to be inputted exceeds the memory capacity of said second memory section, other image forming apparatus or image processing apparatus is selected in accordance with an object specified by the operator, and a predetermined image data are transferred to the selected apparatus through said transmission apparatus.

34. The image forming system as set forth in claim 33, wherein:

said receiving end selection means selects an apparatus including a memory section which has a sufficient capacity for storing the image data to be transferred.

35. The image forming system as set forth in claim 33, wherein:

said receiving end selection means selects an apparatus in a stand-by position, which permits transmission and receiving of image data.

36. The image forming system as set forth in claim 33, wherein:

said receiving end selection means selects an apparatus in its stoppage due to an occurrence of trouble, which is still capable of performing a memory control and a data control.

37. The image forming system as set forth in claim 33, wherein:

said receiving end selection means selects an apparatus which has been used less frequently.

38. The image forming system as set forth in claim 33, wherein:

said receiving end selection means selects an apparatus having a large available capacity of said memory section.

39. The image forming system as set forth in claim 33, wherein:

said receiving end selection means selects an apparatus in which a trouble has occurred less frequently.

40. The image forming system as set forth in claim 33, wherein:

said receiving end selection means selects an apparatus based on a priority of the selection conditions defined by the operator.

41. The image forming system as set forth in claim 33, wherein said image processing apparatus further includes:

a processing section for processing transferred image data with a predetermined image processing function; and output determination means for determining if processed image data can be outputted appropriately by comparing an image output capacity of said image recording section of said image forming apparatus with image processing contents requested by the operator, wherein when a result of determination by said output determination means is negative, said processed image data are transferred to an appropriate apparatus located close to said designated image forming apparatus, if any, to be outputted therefrom.

42. The image forming system as set forth in claim 33, wherein said image processing apparatus further includes:

a processing section for processing transferred image data with a predetermined image processing function; and processing determination means for determining if said processing section is capable of appropriately processing the transferred image data with the predetermined image processing function, wherein when a result of determination by said processing determination means is negative, said processing determination means requests the image forming apparatus of a transmitting end of the image data to transmit the image data again.

* * * * *